United States Patent [19]

Nadan

[11] Patent Number: 5,321,750

[45] Date of Patent: * Jun. 14, 1994

[54] RESTRICTED INFORMATION DISTRIBUTION SYSTEM APPARATUS AND METHODS

[75] Inventor: Joseph S. Nadan, New York, N.Y.

[73] Assignee: Market Data Corporation, New York, N.Y.

[*] Notice: The portion of the term of this patent subsequent to Aug. 25, 2009 has been disclaimed.

[21] Appl. No.: 880,582

[22] Filed: May 8, 1992

Related U.S. Application Data

[63] Continuation-in-part of Ser. No. 698,231, May 6, 1991, Pat. No. 5,142,576, which is a continuation of Ser. No. 590,525, Sep. 27, 1990, abandoned, which is a continuation of Ser. No. 307,731, Feb. 7, 1989, abandoned.

[51] Int. Cl.[5] ............................................. H04N 7/167
[52] U.S. Cl. ........................................ 380/20; 380/10; 358/86; 358/147
[58] Field of Search ......................... 380/10, 14, 20, 23, 380/49, 50; 340/711, 717, 825.26, 825.27; 358/83, 84, 85, 86, 142, 145, 144, 147; 364/408, 918.7, 918, 918.8; 395/425, 600, 725

[56] References Cited

U.S. PATENT DOCUMENTS

| | | | |
|---|---|---|---|
| Re. 31,863 | 4/1985 | Saylor et al. | 358/141 |
| Re. 32,326 | 1/1987 | Nagel et al. | 358/83 |
| Re. 32,776 | 11/1988 | Saylor | 358/142 |
| 3,586,767 | 6/1971 | Morchand | 178/5.6 |
| 3,611,294 | 10/1971 | O'Neil et al. | 340/825.26 |
| 3,647,949 | 3/1972 | Closs et al. | 178/5.6 |
| 3,801,961 | 4/1974 | Coombe | 340/154 |
| 4,129,748 | 12/1978 | Saylor | 178/69.1 |
| 4,135,213 | 1/1979 | Wintfield | 358/142 |
| 4,148,066 | 4/1979 | Saylor | 358/127 |
| 4,199,656 | 4/1980 | Saylor | 178/66.1 |
| 4,361,898 | 11/1982 | Poignet et al. | 340/711 |
| 4,371,871 | 2/1983 | Adams | 340/717 |
| 4,388,489 | 6/1983 | Wigan et al. | 178/3 |
| 4,404,551 | 9/1983 | Howse et al. | 340/711 |
| 4,525,779 | 6/1985 | Davids et al. | 364/200 |
| 4,531,184 | 7/1985 | Wigan et al. | 364/200 |
| 4,555,781 | 11/1985 | Baldry et al. | 370/60 |
| 4,600,921 | 7/1986 | Thomas | 455/2 |

(List continued on next page.)

OTHER PUBLICATIONS

Brochure entitled, "An Introduction to TRIARCH TM 2000," copyright 1989 Rich, Inc.

(List continued on next page.)

Primary Examiner—Tod R. Swann
Attorney, Agent, or Firm—Davis Hoxie Faithfull & Hapgood

[57] ABSTRACT

A system for securely providing restricted display information having an encoder-transmitter for transmitting selected update data using information identification codes as enabling reception keys and a plurality of uniquely identified decoder-receivers for receiving the update data for display on a video screen. Authorized decoders are provided with enable reception keys so that subsequently transmitted data having an information identification code matching a reception key at a decoder-receiver may be received for subsequent display on the video screen. Symbolic signaling is used so that enabling a decoder-receiver with a reception key also provides display coordinate information for displaying the update data in the proper relative display location for the video screen of that enabled decoder, so that the update data subsequently transmitted is displayed using that display coordinate information. Tile messaging and cellular micrographic transmission techniques are used to reduce the volume of data transmitted to changed display information (update data), wherein cells of characters are transmitted as one byte of data and cells of pixel data are transmitted a plurality of bytes of data. Each decoder-receiver may have a plurality of video screens separately and uniquely identified such that encoded update data and other messages are transmitted for specific video screens. The system includes multiplexing display information and television signals from different sources and transmitting the multiplexed signals to the decoder-receivers for selectively displaying different combinations of display information and/or television signals on different video screens.

150 Claims, 36 Drawing Sheets

U.S. PATENT DOCUMENTS

| | | | |
|---|---|---|---|
| 4,677,434 | 6/1987 | Fascenda | 340/825.7 |
| 4,745,559 | 5/1988 | Willis et al. | 364/408 |
| 4,750,135 | 6/1988 | Boilen | 340/719 |
| 4,751,640 | 6/1988 | Lucas et al. | 364/408 |
| 4,829,569 | 5/1989 | Seth-Smith et al. | 380/10 |
| 3,875,329 | 4/1975 | Nagel | 178/6.8 |
| 3,889,054 | 6/1975 | Nagel et al. | 178/6.8 |
| 3,909,818 | 9/1975 | Dalke et al. | 340/324 |
| 4,032,972 | 6/1977 | Saylor | 358/142 |
| 4,042,958 | 8/1977 | Saylor et al. | 358/141 |
| 4,054,911 | 10/1977 | Fletcher et al. | 358/141 |
| 4,064,490 | 12/1977 | Nagel | 364/200 |
| 4,099,258 | 7/1978 | Parsons | 340/825.7 |
| 4,104,681 | 8/1978 | Saylor | 358/141 |
| 4,120,003 | 10/1978 | Mitchell et al. | 358/142 |

OTHER PUBLICATIONS

Brochure entitled, "TRIARCH TM 2000 Trading information architecture," (undate).

Product information on "TRIARCH 2000 Workstantion Cluster Server (Color)," copyright 1989 Rich, Inc.

Product information on "Rich Video Switch (RVS)," copyright 1989 Rich, Inc.

Joseph S. Nadan et al., "Trading Information System Requirements: An-Overview," IEEE Communications Society-New York Sectio.

Seminar Proceedings on "Management and Maintenance of Communicatiobs Networks," Dec. 4, 1986.

Data Pro Technology Report 743-101 "Transmission Control Protocal/Internet Protocol" (TCP/IP) Mar. 1990.

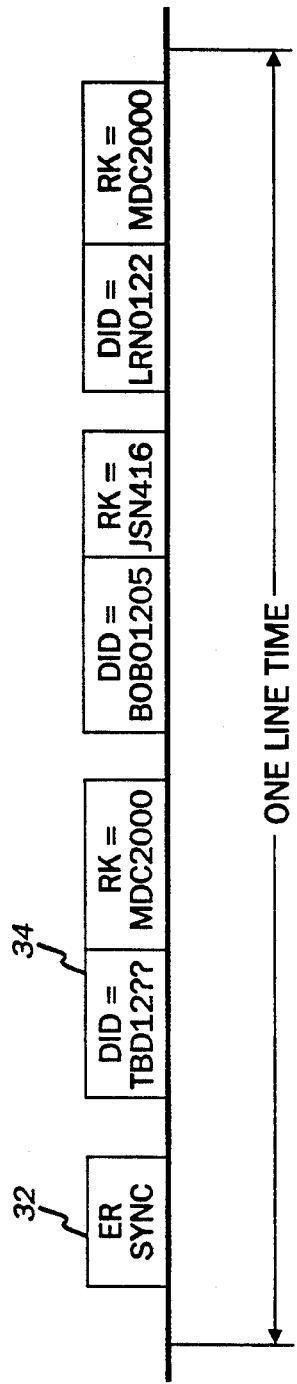
FIG. 3A - ENABLE RECEPTION
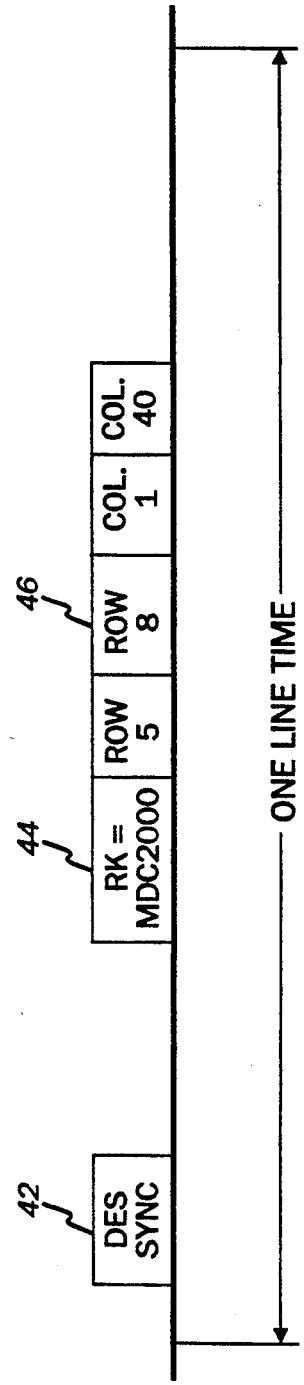
FIG. 3B - DATA ENABLE SEQUENCE

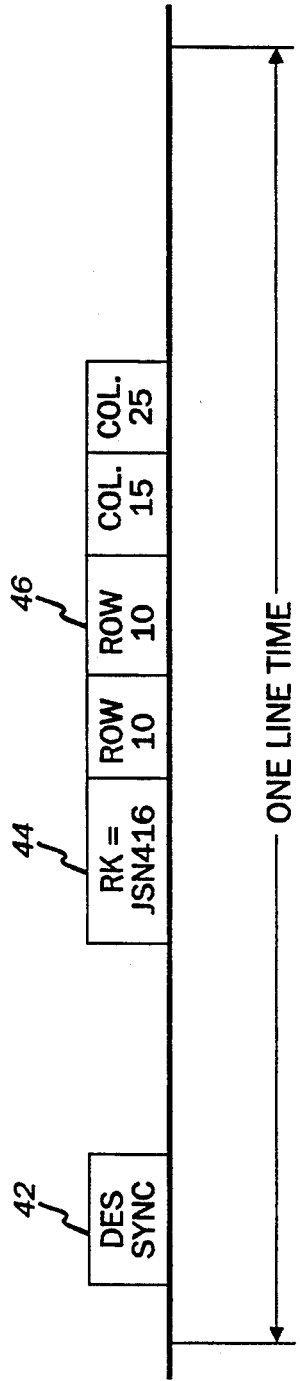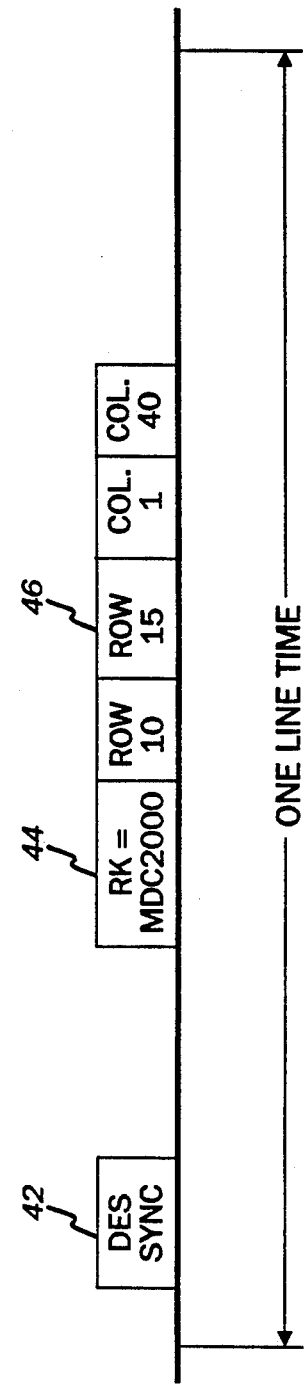

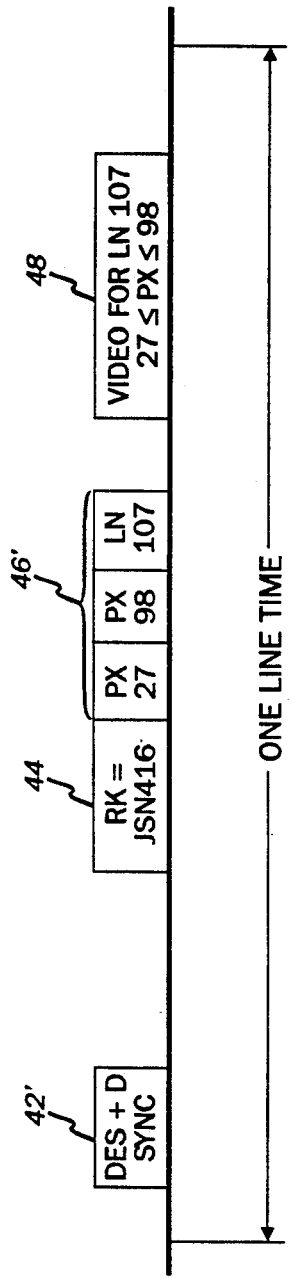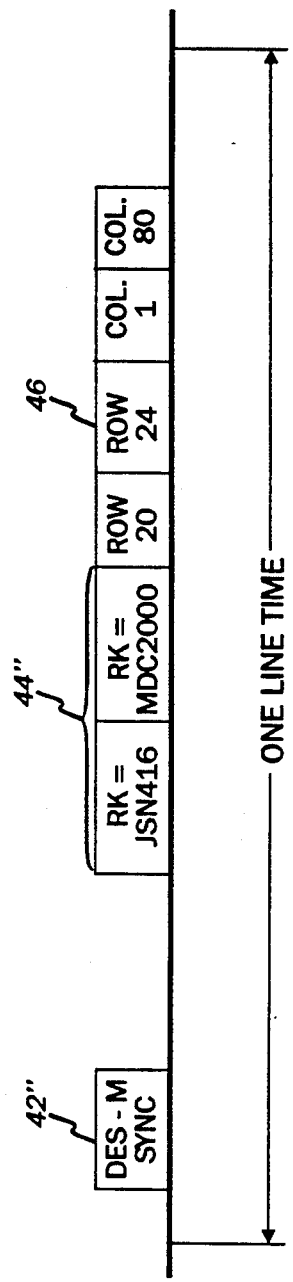

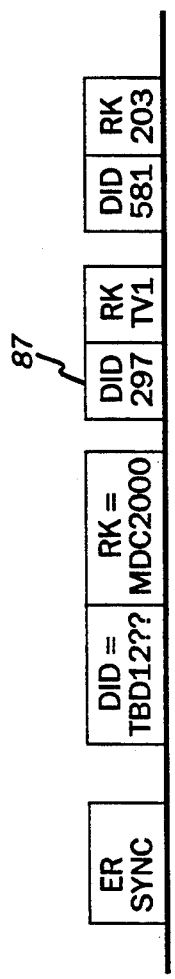
FIG. 8A - ENABLE RECEPTION MESSAGES
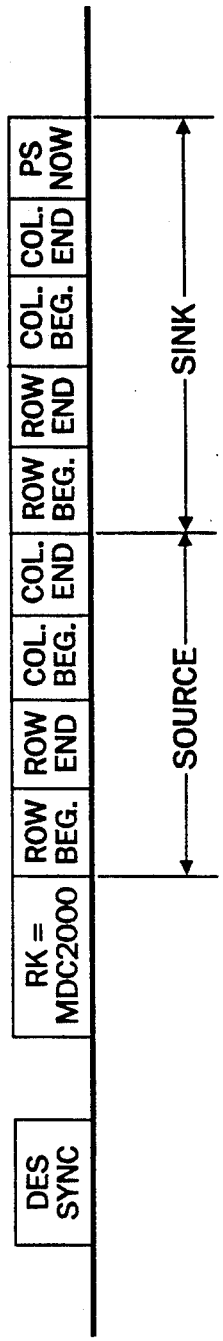
FIG. 8B - DATA ENABLE SEQUENCE FOR NON-REALTIME VIDEO (E.G. FINANCIAL INFORMATION)
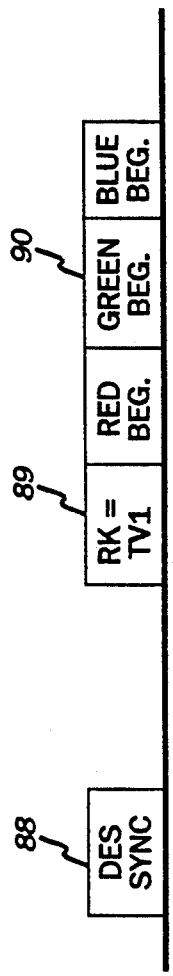
FIG. 8C - DATA ENABLE SEQUENCE FOR REALTIME VIDEO (E.G. TV)

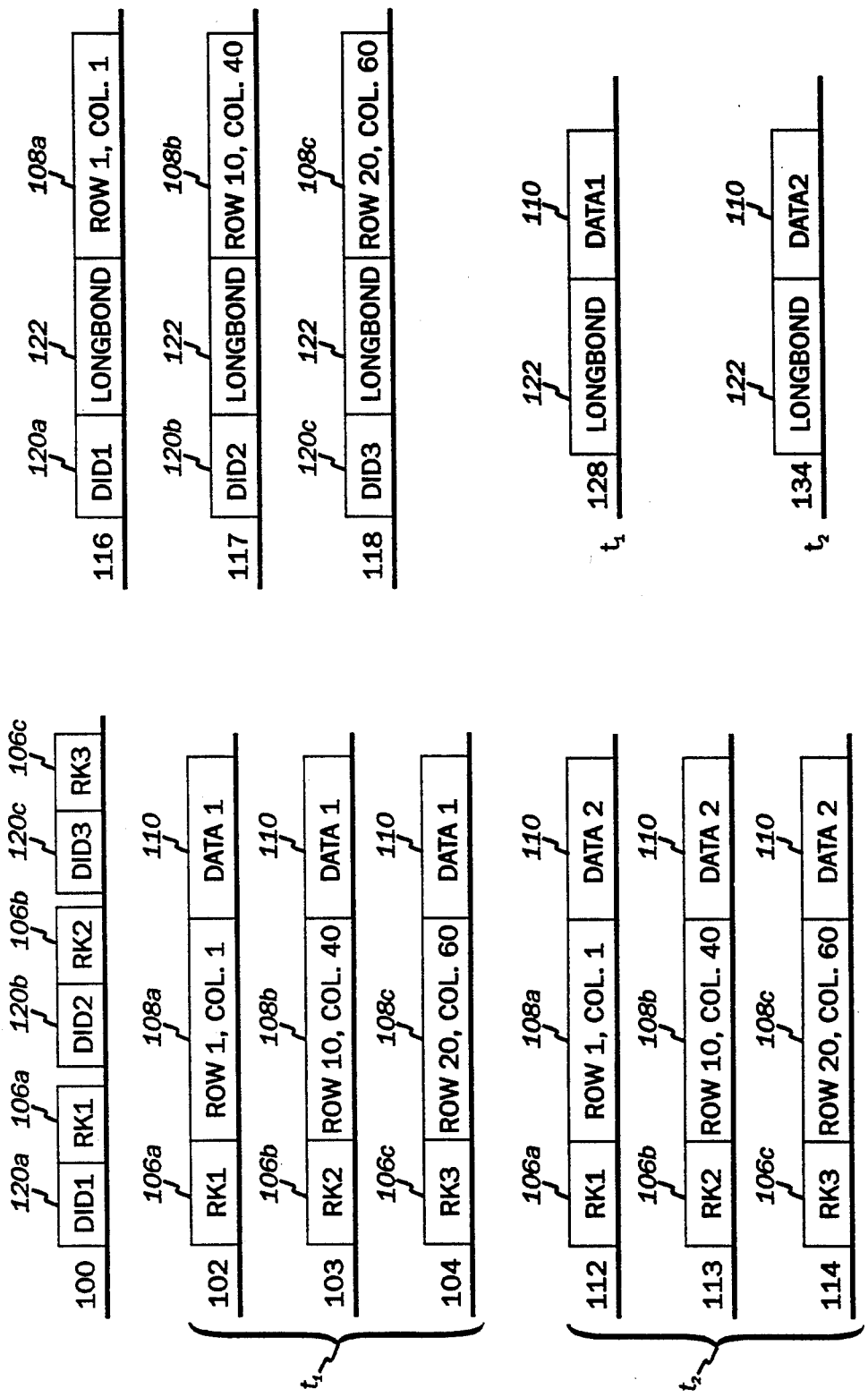

| | | | | | | | |
|---|---|---|---|---|---|---|---|
| $T_1$ | 11/15 | 9:00 EST | ((C) 1990 MKT DATA CORP · TULLETT & TOKYO FX) | | | | 16251 |
| | !SPT! | STERLING ! | YEN ! | D MARK ! | CA $ ! | AU $ ! | F FRANC ! |
| | : | 8:50 EDT : | 8:51 EDT : | 8:51 EDT : | 8:49 EDT : | 8:51 EDT : | 8:48 EDT |
| | CUR: | 1.8114· 18 : | 150.40· 43 : | 1.6221· 26 : | 1.1509· 12 : | 0.7826· 32: | 5.4370· 80 |
| $T_2$ | STG | | 0.3670 | 0.3402 | 0.4756 | 0.4322 | 0.1015 |
| | YEN | 272.49 | | 92.71 | 130.68 | 117.76 | 27.66 |
| | D M | 2.9390 | 1.0786 | [ CROSS RATES ] | 1.4095 | 1.2701 | 0.2984 |
| | CA$ | 2.0852 | 0.7852 | 0.7095 | | 0.9012 | 0.2117 |
| | AU$ | 2.3140 | 0.8492 | 0.7873 | 1.1097 | | 0.2349 |
| | FF | 9.8506 | | 3.3516 | 4.7239 | 4.2370 | |
| $T_3$ | [ | | | [ TELERATE GLOBAL FINANCIAL MARKET NEWS ] | | | PAGE 14 |
| $T_4$ | 08:33 | JAPAN'S 2-YR GOV'T NOTES AVERAGE PRICE 99.94 YEN | | | | | ·· |
| | 07:55 | THE KL TIN CASH MARKET CLOSED 2 SEN/KG UP ON SELLERS' RESERVE | | | | | ·· |
| | 07:54 | JAPANESE GOV'T BONDS DECLINE IN TOKYO | | | | | 9756 |
| | 07:36 | FEATURE "WHY THE BUNDESBANK WILL LIKELY TIGHTEN LATER IN "90" | | | | | 17435/9 |
| | 07:25 | SPOT GOLD IS SLIGHTLY EASIER AT $370.50 IN THE FAR EAST | | | | | ·· |
| | 07:22 | GOV'T DECIDES TO RAISE JAPAN'S ODA '91 BUDGET BY 9.7 PC. | | | | | ·· |
| | 07:20 | BOJ GOVERNOR SEES NO COLLAPSE OF PRICE STABILITY | | | | | 33583 |

| | | | | | | | |
|---|---|---|---|---|---|---|---|
| $T_1$ | 11/15 | 9:00 EST | ((C) 1990 MKT DATA CORP · TULLETT & TOKYO FX) | | | | 16251 |
| | !SPT! | STERLING ! | YEN ! | D MARK ! | CA $ ! | AU $ ! | F FRANC ! |
| | : | 8:50 EDT : | 8:51 EDT : | 8:51 EDT : | 8:49 EDT : | 8:51 EDT : | 8:48 EDT |
| | CUR: | 1.8114· 18 : | 150.40· 43 : | 1.6221· 26 : | 1.1509· 12 : | 0.7826· 32: | 5.4370· 80 |
| $T_5$ | H·L· | 1.8125-067 · | 150.60-975 · | 1.6280-215 · | 1.1538-508 · | 0.7830·815 · | 5.4455·340 |
| $T_3$ | [ | | | [ TELERATE GLOBAL FINANCIAL MARKET NEWS ] | | | PAGE 14 |
| $T_4'$ | 08:33 | JAPAN'S 2-YR GOV'T NOTES AVERAGE PRICE 99.94 YEN | | | | | ·· |
| | 07:55 | THE KL TIN CASH MARKET CLOSED 2 SEN/KG UP ON SELLERS' RESERVE | | | | | ·· |
| | 07:54 | JAPANESE GOV'T BONDS DECLINE IN TOKYO | | | | | 9756 |
| | 07:36 | FEATURE "WHY THE BUNDESBANK WILL LIKELY TIGHTEN LATER IN "90" | | | | | 17435/9 |
| | 07:25 | SPOT GOLD IS SLIGHTLY EASIER AT $370.50 IN THE FAR EAST | | | | | ·· |
| | 07:22 | GOV'T DECIDES TO RAISE JAPAN'S ODA '91 BUDGET BY 9.7 PC. | | | | | ·· |
| | 07:20 | BOJ GOVERNOR SEES NO COLLAPSE OF PRICE STABILITY | | | | | 33583 |
| | 07:13 | AUST SHAREMARKET CLOSES ALL ORDS 1590.8. DOWN 0.7 POINTS | | | | | 22837 |
| | 07:09 | DLR BREACHES 150 YEN MARK AT END OF TYO TRADING:AT 150.11 YEN | | | | | 33577 |
| | 07:06 | AUD CONFINED TO TIGHT BAND IN DISINTERESTED TRADE, NOW 0.7820 | | | | | 39377 |
| | 07:05 | GO'T DECIDES TO RAISE JAPAN'S ODA '91 BUDGET BY 9.7 PC | | | | | ·· |
| | 07:02 | AUST DOMESTIC MARKETS CLOSE UNCHANGED AHEAD OF TRADE DATA | | | | | 39378 |

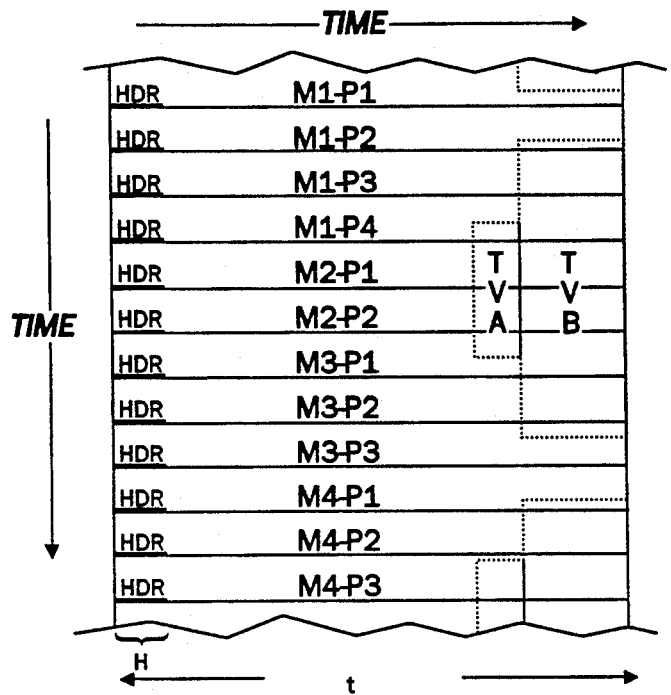
FIG. 21
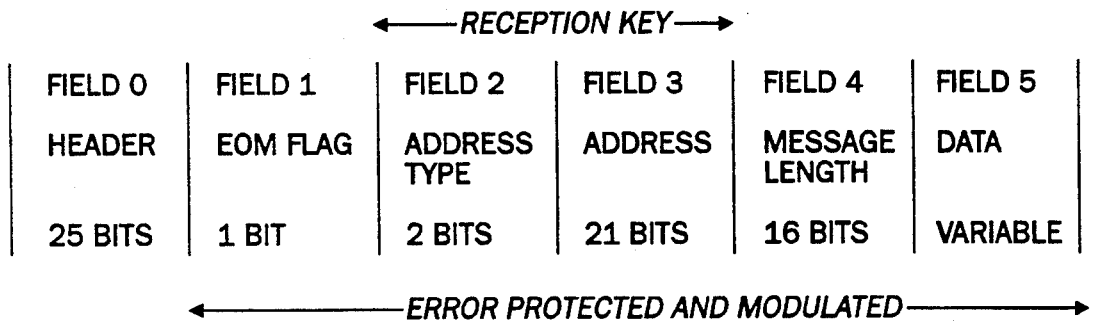
FIG. 22
| FIELD 0 | FIELD 1 | FIELD 2 | FIELD 3 | FIELD 4 |
|---|---|---|---|---|
| RECEPTION KEY | MESSAGE LENGTH | MESSAGE SEQUENCE NUMBER | COMMAND | DATA |
| 3 BYTES | 2 BYTES | 1 BYTE | 1 BYTE | VARIABLE |
FIG. 23

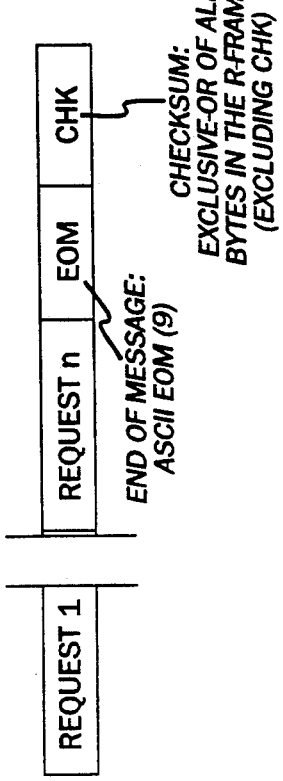
FIG. 24C
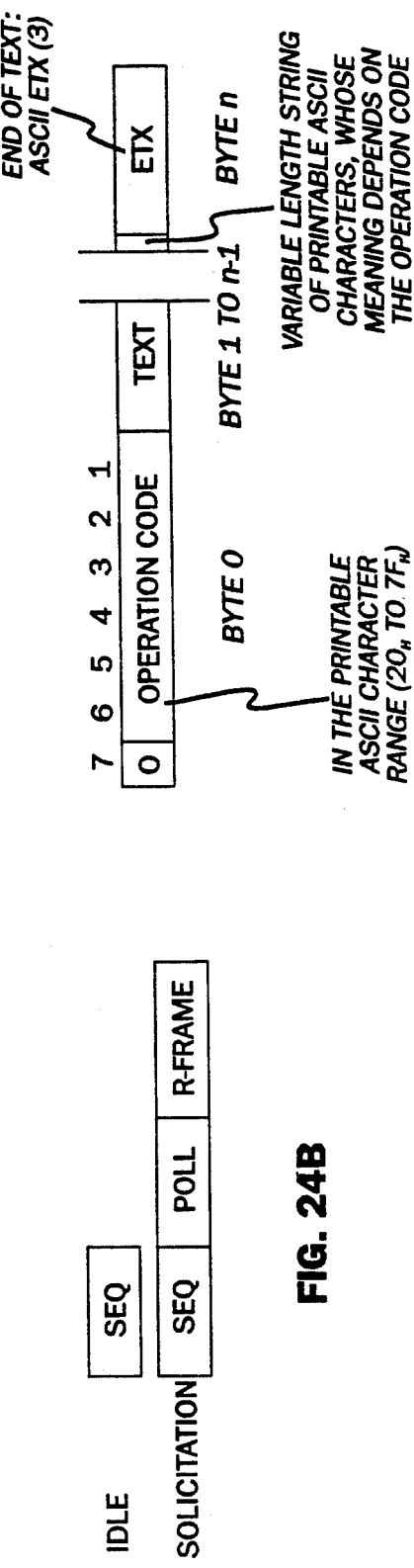
FIG. 24D
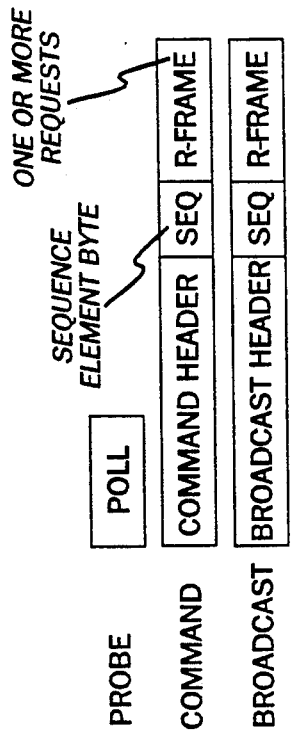
FIG. 24A
FIG. 24B

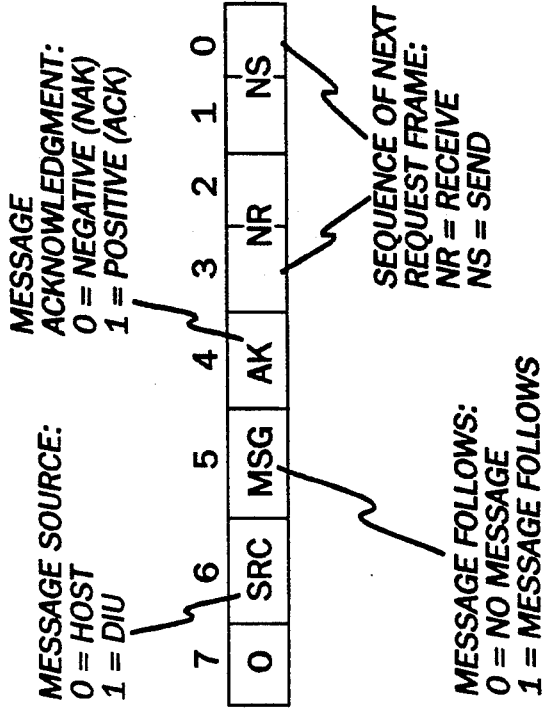
FIG. 24G
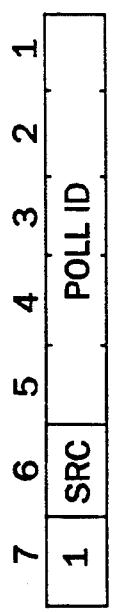
FIG. 24E
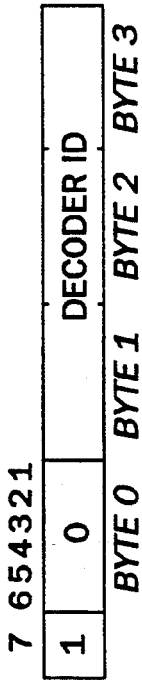
FIG. 24F
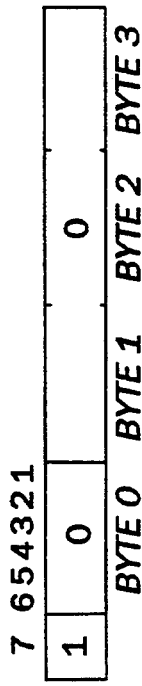

RESTRICTED INFORMATION DISTRIBUTION SYSTEM APPARATUS AND METHODS

CROSS-REFERENCE TO RELATED APPLICATIONS

This is a continuation-in-part of copending and commonly assigned U.S. patent application Ser. No. 698,231, filed May 6, 1991, now issued as U.S. Pat. No. 5,142,576, which is a continuation of U.S. patent application Ser. No. 590,525, filed Sep. 27, 1990, now abandoned, which is a continuation of U.S. patent application Ser. No. 307,731, filed Feb. 7, 1989, now abandoned.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The subject invention relates to the distribution of information and, more particularly, for distributing this information in a secure and restricted manner to a plurality of users.

BACKGROUND OF THE INVENTION

Applicant and other related companies are in the business of distributing realtime financial market information to various clients who use this information to carry on their business. When a client subscribes for this service, an agreement is entered into in which the client indicates what information is desired and how many video screens will be displaying the information. Based on these parameters, a fee is assessed to the client and the information then is transmitted to the client.

Typically, this financial market information is transmitted to clients as one or more pages or records that may be displayed on a video screen, portions of which, from time to time, are updated to reflect changes in the market information. Various clients subscribe to view different specific groups of these pages and/or records.

An early method of distributing market information was based upon the transmission of a single page of real time digital information over a single telephone line. Page-oriented information (ROW #, COL #, CHARACTER STRING) was sent from the information vendor's computer over a telephone network to a controller, provided by the information vendor, located at the client site. The page-oriented information was subsequently converted to video by a video generation unit within the controller. The video output was then connected to a video screen by a single coaxial cable.

Each full page was repeatedly transmitted in video at a field rate for realtime display, similar to that of a television transmission. However, once the video signal was produced, there was nothing, except the personal integrity of the client, to prevent the client from connecting any number of video screens to a video distribution amplifier connected to the controller, driving a larger number of video screens above and beyond the number stated in the agreement. This practice dilutes the revenues to which the information vendor would ordinarily be entitled.

This architecture was costly and unreliable because of the large amount of hardware needed to place financial information on a large number of trading desks. For example, if a client's trading room had thirty traders, each trader needed his own single-user system resulting in thirty keyboards, thirty controllers with thirty internal video generation units, thirty telephone cables, thirty modems, thirty coaxial video cables, and thirty video screens to receive and display the required financial information.

This technology also limited the screen presentation format to what was provided by the information vendor. When traders were only interested in one or two fields of information on a screen, they would have to display the entire page of information. If they wanted to look at one or more fields of information on a second screen at the same time, an entire additional single-user system would be required. Further, when two traders wanted to look at the same page, they would either have to have two separate single-user systems or the video information would be redistributed to a "slave" video screen making it difficult for the information vendor to know how many video screens were connected to a given controller and hence how many people were viewing their information. This made billing difficult and usually created a process of surprise client-site visits that left both information vendor and client unhappy.

The development of multi-user systems reduced the amount of required hardware and enabled users to share resources and view common information. In multi-user systems, each trader had one keyboard and several video screens. Through the use of video switching techniques, thirty traders could share perhaps ten or fifteen controllers and contend for their use. Since many traders are part of a trading group that uses essentially the same financial market information, the probability of blocking (not having a controller available to fulfill a new page request) was small.

Such multi-user systems helped reduce costs by reducing the number of controllers, keyboards, and system cabling, but did not solve either the billing problems or allow the user to customize screen presentation formats.

Later, single telephone line, multi-page distribution systems were developed which reduced the required number of telephone lines. The information syntax for these multi-page sources was slightly modified to (PAGE #, ROW #, COL #, CHARACTER STRING). Users of such systems also could create composite pages (fields from different pages displayed simultaneously on one video screen) and calculate and insert additional value-added information (e.g., bond yield to maturity). By doing so, customized output display pages could be created showing only the information and value-added calculations the user wanted to see.

Users developing value-added applications based upon page oriented data had to assign a symbolic name to an information field located at a specific display location of the input source page. When the information vendor changed the presentation format of the information (i.e., the location of a specific data element), as often happens when financial instruments are either added or deleted, the value-added application had to be modified. To overcome this difficulty, and to supply basic information without display parameters, the information vendor created record-oriented sources using the syntax (SYMBOLIC NAME, CHARACTER STRING). Examples of such a system are the Reuters Integrated Data Network and the Telerate TIQ Feed.

Despite the foregoing advances in the field of electronic financial information distribution systems, current systems still allow video screens to be added and/or moved freely without either the information vendor's knowledge or consent. Further, each video screen must be connected by its own single-video "home-run" cable, i.e., a cable that typically runs for hundreds of feet between the trading floor where the video screen is located and the equipment room where either a controller, video switch output, or a host computer is located.

SUMMARY OF THE INVENTION

An object of the present invention is to provide a system capable of securely providing restricted information.

A further object of the present invention is to provide a system which is capable of uniquely identifying each of the video screens authorized to display information, to restrict this information to only these individual video screens, to identify which of the information these video screens are to display, and to present only authorized information on each and every video screen; unauthorized video screens would only present unintelligible transmogrified versions of the information.

It also is a object of the present invention to provide a financial information distribution system that is capable of taking inputs simultaneously from both multiple information page and/or record-oriented input sources (e.g. video, digital and/or live television) and a multitude of keyboards, to create a multitude of different output displays for concurrent display on a multitude of video screens all interconnected by a single cable, such that the video screens may contain different combinations of portions of different input sources of information.

It is a further object of the present invention to provide a financial information distribution system in which each video screen has a unique display identification code that is used to authorize viewing and/or to permission what input source information each individual video screen will be capable of displaying at any given time.

It is a another object of the present invention to facilitate the ability to provide each user's video screen(s) with a customized output display.

It is yet another object of the present invention to reduce the cost of transmitting and displaying financial market updates to numerous users.

It is further object of the present invention to provide a single host computer device to support a plurality of users and an even larger plurality of video screens for securely distributing restricted information to one or more authorized video screens simultaneously. It is another object to allow rapid response to user requests to view new or additional source of information.

It is another object to provide for distributing information in a tile format whereby each user can assign a location on that user's video screen for display of the tile, and the same display information may be displayed on different locations on different video screens and simultaneously updated. It is another object to support a larger video screen to provide for displaying tiles from a plurality of information input sources simultaneously.

Applicant has recognized that usually only small portions of the input page or record source information change over a small time, for example the time corresponding to one field time of displayed video. It is, therefore, necessary to transmit only the information which is changing as update data and then to store this update data, along with the unchanged data, in a memory at the video screen for subsequent display.

It is, therefore, another object to preprocess video signals to identify the changed display information to be displayed prior to inputting the video information into a display information distribution system, thereby minimizing the amount of channel bandwidth necessary to distribute the information.

It is another object of the invention to provide for preprocessing digital and analog video signals for display information and television signals. It is another object to provide for preprocessing composite and non composite video signals. It is yet another object to provide a switchable device that can process information in color and monochromatic video signals.

It is another object of the invention to provide a modular residual video converter device that can be constructed as a small printed circuit assembly so that one assembly is used for each source of video signals and several assemblies can be combined onto a single printed circuit board for ease of packaging and expansion.

It is another object of the present invention to improve the efficiency and messaging capacity of an information distribution system by converting incoming video signals having successive frames of display information to digital video messages identifying the pixel changes from one frame to the next.

Applicant also has recognized that users typically want to view only a portion of a full page or record of source information provided by the vendor and therefore use several video screens displaying different sources of information so that the information they wish to view is concurrently displayed on multiple screens.

With these facts in mind, the above objects are achieved in a system for securely providing restricted information, wherein the system includes an encoder for encoding update data for updating various tiles (i.e., portions of pages or records) of display information, and a plurality of decoders for decoding said update data and generating said various output displays on video screens, characterized in that said encoder comprises means for generating a first data stream, said first data stream including respective sets of one or more unique display identification codes identifying each video screen and one or more information identification codes for each of said tiles, said sets being indicative of the tiles, i.e., each particular portion of display information, each video screen of each client or user is authorized to receive; means for generating a sequence of second data streams, each of said second data streams including one of said individual information identification codes, coordinates of an area in a relevant video screen that is to display update data for the portion of display information, and the respective update data; and means for transmitting said first data stream followed by said sequence of second data streams; and in that each of said decoders comprises a video screen; means for identifying the relevant video screen with one of said unique display identification codes; means for recognizing said one unique display identification code and for storing the information identification codes in the associated set with said one unique display identification code; means for retrieving said display coordinates of the update data corresponding to each of said stored information identification codes; means for storing said update data at the related coordinates for subsequent display on the video screen; and means for selectively displaying said stored updated display information on the video screens.

In accordance with a preferred embodiment, the encoder (also referred to as a transmitter) is a microprocessor based device that transmits a high bandwidth digital and/or analog signal over a single coaxial cable. The encoder manages communications between a host computer and the plurality of decoders (also referred to as receivers), caches those particular portions of display information that are being viewed on video screens, and stores symbolic data elements. All data changes and/or specific instructions sent to any one or all of the decoders originates in an application running on the host computer, and is transmitted via a digital-video (DV) bus from the encoder to the decoder(s). A delta-modulation type of communication protocol is used to greatly reduce the amount of transmitted information. Unlike a video switch environment, in which almost the same information is transmitted sixty times a second, only display screen changes are signaled.

Display changes are transmitted by tile messaging, i.e., transmitting the portion of the page or record of display information that contains the changed display information within a tile of horizontally and vertically contiguous cells. Each tile is given an information identification code and has corresponding data such that authorized users of the data are enabled with the corresponding information identification code as a symbolic name or reception key for identifying the particular tile by its symbolic name or reception key and receiving and retrieving the update data. Further, the tile may be given a default size and display location on a video screen, a user-defined size and display location, or both, such that the transmitted data is mapped into any user-defined location as it is stored for display on the video screen. Some of the transmitted data may not be stored or displayed when the user-defined tile is smaller than the transmitted tile.

The cost associated with transmitting the same data for different tiles (pages or records) of information can be greatly reduced in accordance with the present invention, by initializing the location of an individual data field, through the use of a message identifying (i) the information identification code for a particular source page or record of display information, (ii) the information identification code for the specific information field through the use of a symbolic name of a tile containing the individual data field, and (iii) a location in which the data of the data field are to appear on the particular tile. After this initialization, the information identification code for the symbolic name can be transmitted along with data, without any display coordinate information, and each initialized video screen that displays the data associated with the symbolic name is updated simultaneously through the use of this single data message and previously provided display coordinates.

Each decoder receives at least all transmitted messages for its video screens and stores the information to be displayed, i.e., the screen image, in an internal picture store memory. Each decoder selects out and processes only those messages on the DV bus that are directed to its video screens or to the decoder. Thus, each decoder may have more than one video screen and a unique display identification code for each video screen. Each video screen has a unique identification code that supports permissioning of restricted display information to be viewed and is capable of displaying simultaneously either color or monochromatic text and/or pixel based graphics, as well as live TV pictures. In addition, the decoder can detect and directly pass through unencoded video signals to its video screens.

Commercially available keyboards and mice may be provided to send information request signals via the decoder to a control bus connecting the plurality of decoders to the encoder or host computer and to define tile size and display locations. The keyboard optionally may include an internal LCD display.

A residual video converter (RVC) device allows both view-only and interactive video sources to be utilized on the system. The RVC device accepts one or more video inputs, converts them into a DV bus message format containing only video screen changes suitable for transmission to the decoders over the DV bus, and directly interfaces with the encoder. Thus, the encoder may transparently pass the RVC output signals at appropriate times.

A television feed converter (TFC) device allows realtime television sources to be utilized on the system. The TFC device accepts one or more television inputs, converts them into a format suitable for transmission to the decoders over the DV bus, and directly interfaces with the encoder. The encoder may transparently pass the television signals at appropriate times.

In addition, market display information may be brought into the system via a commercially available Digital Interface Board (DIB) device. On larger systems, the DIB device also may be configured to manage the control bus. The DIB device also allows for authorized individuals to gain remote access to the system, for example, by use of passwords. For example, the information vendor may use the interface remotely to "authorize" clients to use and/or view predefined subsets of their source information (e.g., to increase the number of authorized video screens). The vendor also is able to gather utilization statistics from each client site which is useful for marketing and/or billing purposes. The operator of the system may use the interface remotely to provide routine software maintenance and upgrades, modification of existing composite page definitions, downloading of new composite pages and periodic monitoring of system performance. The client system administrator may use the remote interface to log onto the system from home or any other remote location.

One advantage of the present invention is that it is sufficiently flexible to adapt for use as any of a stand-alone system in a small system environment having only a digital data feed which the encoder distributes to a plurality of decoders, an enhancement to an existing system having a video switching system and user interface hardware such that the encoder output is connected to a single shared input and passed to one or more outputs on the video switch to the plurality of users, a work station, and a large system including, for example, separate machines for providing value-added calculations.

DESCRIPTION OF THE DRAWINGS

With the above and additional objects and advantages in mind as will hereinafter appear, the invention will be described with reference to the accompanying drawings, in which:

FIG. 3A shows a diagram representing a characteristic first data stream, and FIGS. 3B, 3C, 3D, 3E and 3F show diagrams representing characteristic sequences in the second data streams, all in the first embodiment of the invention;

FIG. 8 shows a diagram representing the transmitted first data stream, and FIGS. 8B and 8C show diagrams representing the second transmitted data stream in the second embodiment of the invention;

FIG. 11A, 11B and 11C illustrates the transmission of enable reception messages, enable reception and initialization messages, initialization messages, and data enable sequences to produce the displays illustrated in FIGS. 12A, 12B and 12C illustrating symbolic signaling;

FIGS. 14A and 14B are illustrations of composite pages of display information;

FIG. 21 is a diagram of a packet messaging sequence including packets of varying length;

FIG. 22 is a diagram illustrating packet fields;

FIG. 23 is a diagram illustrating message fields;

FIG. 24A, 24B, 24C, 24D, 24E, 24F, 24G are diagrams of control bus messaging signals;

DESCRIPTION OF THE PREFERRED EMBODIMENT

As noted above, the object of the present invention is to distribute information. This information is transmitted over, for example, telephone lines and converted on the client site into video signals similar to those for television reception. The information subscribed to takes the form of pages or records of market data, various portions of which are updated from time to time to reflect changes in the market, and subsequently presented on a video screen.

Figure 1:
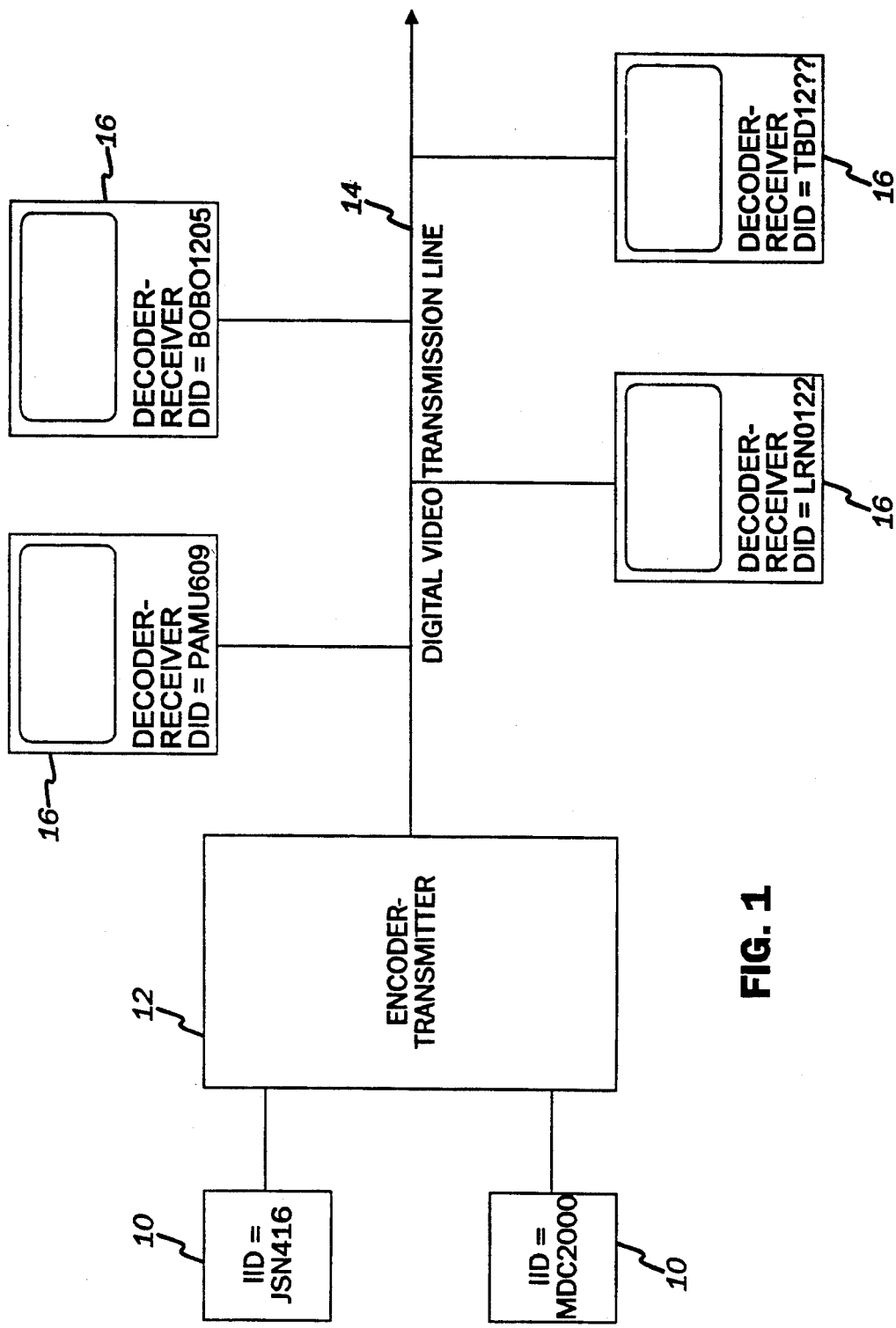
FIG. 1 is a block diagram of a system according to the invention.

In a first embodiment of the invention, the signals representing the market information are being transmitted asynchronously, that is, there are no set characteristic times (e.g., television field or frame rates) to restrict the transmission. As shown in FIG. 1, one or more portions of source information 10 of market data are each given individual information identification (IID) codes, for example, "JSN416" and "MDC2000" These portions 10 are then . applied by an encoder-transmitter 12 to a digital video transmission line 14. Decoder-receivers 16 are shown connected to the transmission line 14 for receiving and displaying the encoded portions 10. As shown, each decoder receiver 16 has a unique display identification (DID) code, for example, "PAMU0609" "BOB01205" "LRN0122" and "TBD12??".

Figure 2:
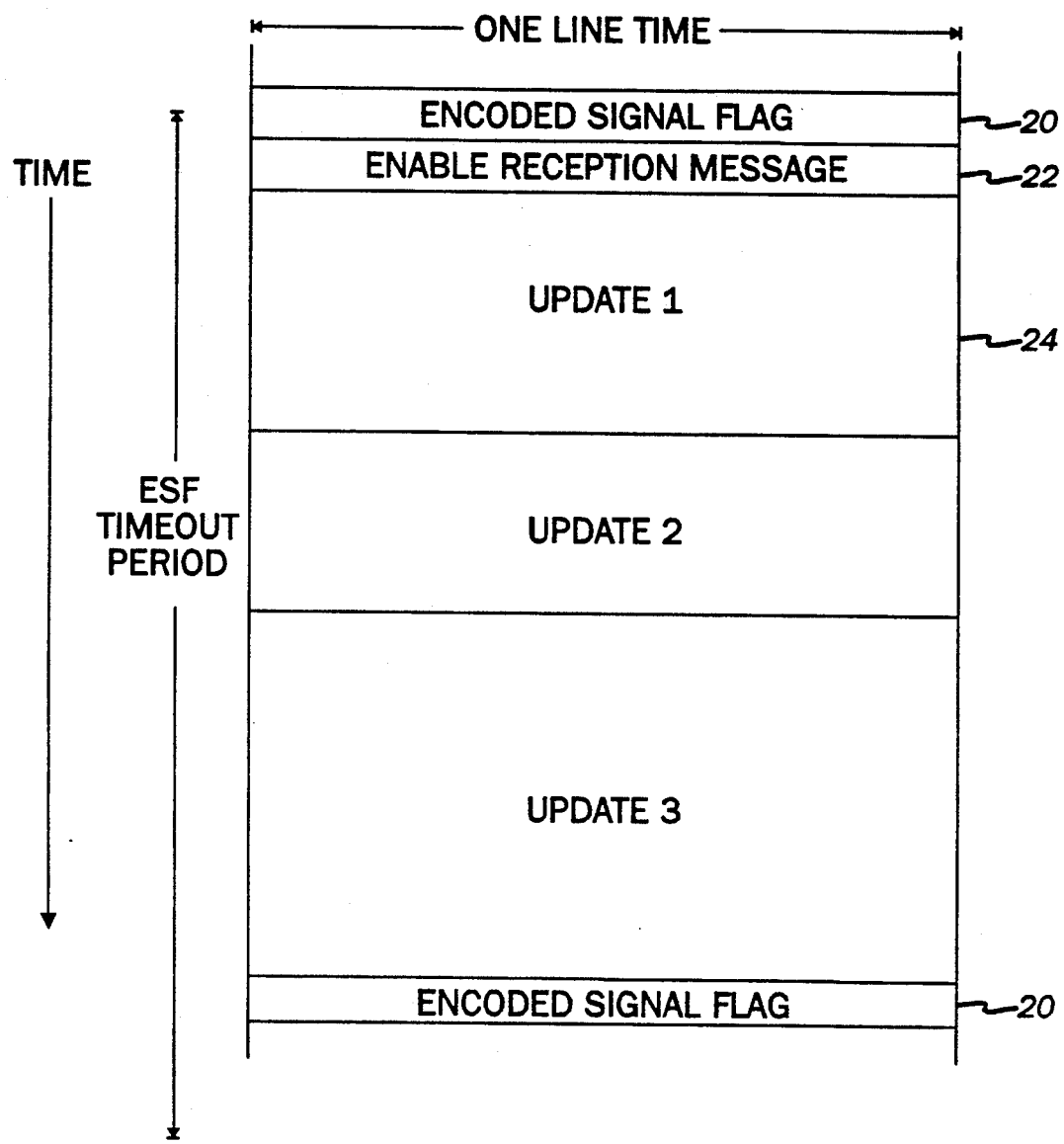
FIG. 2 is a diagram representing the transmitted first data stream and the sequence of second data streams in a first embodiment of the invention.

FIG. 2 shows a diagram representing the digital video signals transmitted over the digital video transmission line 14. As shown in FIG. 2, a first line 20 of the transmission includes an encoded signal flag indicating to the decoder-receivers 16 that the following information is encoded data. The exact form of the flag is unimportant since the information contained is just one bit. The line or lines 22 contain enable reception messages. The lines 24 following the enable reception message lines 22, contain the various data updates 1, 2 and 3.

Enable reception messages are used to provide information identification (IID) codes or reception keys (RK) to decoders. The terms "information identification codes" and "reception keys" are used interchangeably. Decoders use reception keys to identify the portions of information that are to be displayed on specifically identified video screens. FIG. 3A shows a representative enable reception (ER) message line 22 in detail. An ER synchronizing signal 32 is sent indicating the ensuing transmission of enable reception messages and enabling decoders to synchronize to the transmission. The ER sync signal 32 is followed by display identification code (DID) - reception key (RK) sets 34, each of which includes at least one of the unique DID codes and at least one of the IID codes as a reception key (RK) for which the video screen identified by the decoder-receiver DID is authorized to display. In the example shown, the sets are the DID/RK pairs TBD12??/MDC2000, BOB01205/JSN416 and LRN0122/MDC2000 and indicate that the video screen connected to the decoder-receiver having the DID code TBD12?? is authorized to display update data for the source information corresponding to RK MDC2000, screen DID BOB01205, RK JSN416; and screen DID LRN0122, RKMDC2000. It should be noted that in the example, the video screen for the decoder-receiver having DID TBD12?? is not authorized to display update data for the source information corresponding to RKs JSN416 and MDC2000. The enable reception message continues for as many lines (each including an ER synchronizing signal 32) and includes as many sets 34 as are required to associate each of the authorized video screens, by their decoder-receiver DIDs, with one of the (many) subscribed-to groups or portions of source information by their information identification codes/RKs.

Figure 4:
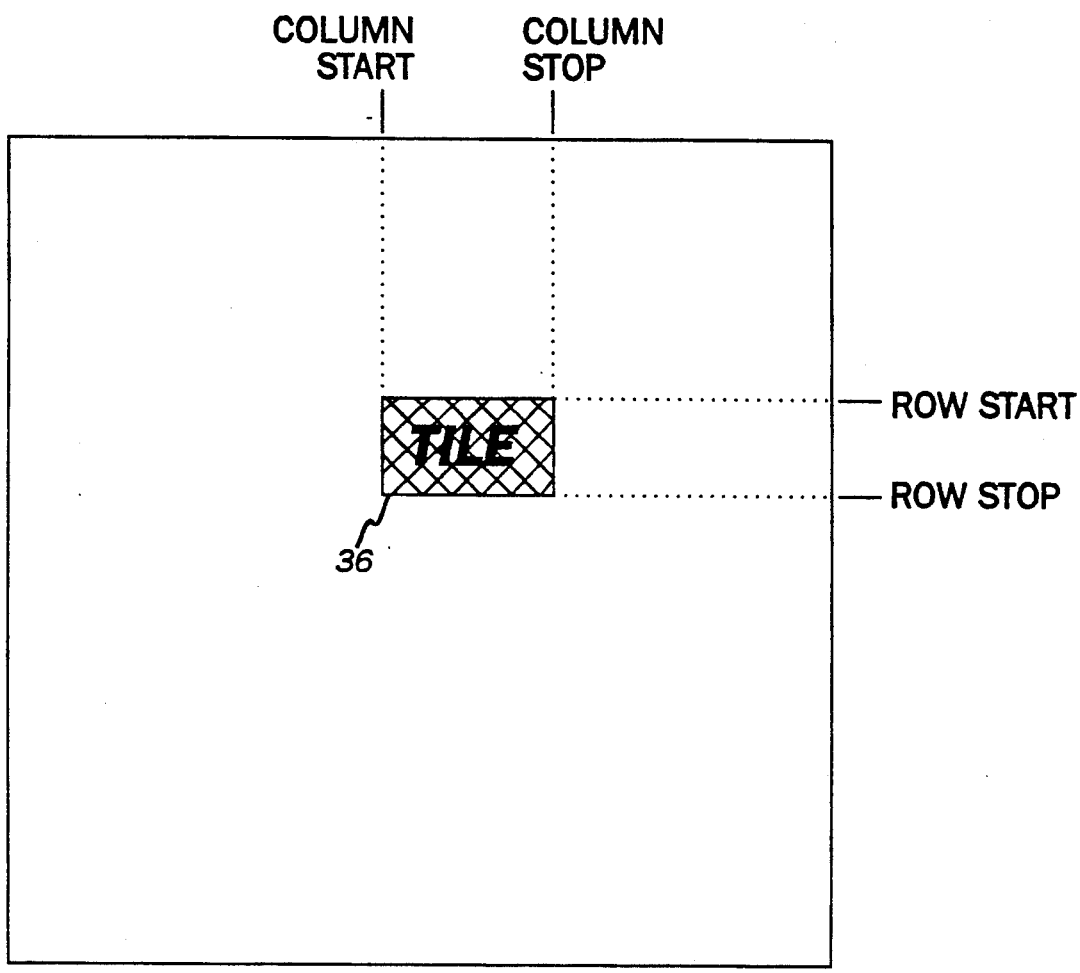
FIG. 4 shows a video screen having a sample market information page thereon in which a block of data to be updated is shown in cross-hatch.

The process for updating each output display is performed by replacing "tiles" in the relevant output display. As shown in FIG. 4, the cross-hatched tile 36 to be updated is located by two row and two column (or two x-y pixel pair) coordinates. FIGS. 3B-3F show samples of the data enable sequences, in which, in FIG. 3B, the sequence for the update of information having the IID code MDC2000 is illustrated. In particular, a data synchronizing signal 42 indicates the ensuing transmission of a data enable sequence, and is followed by the IID code 44 for the source of information having IID code MDC2000 and then the coordinates 46 of the tile 36 to be replaced which, in this example, is 4 rows by 40 columns. The actual data for this tile 36 is presented in a series of lines, corresponding to the number of rows in the tile to be updated, following the data enable sequence line. Note that the correspondence is not one line to one tile row and is explained below. Similar examples are shown for the information having IID codes JSN416 and MDC2000 in FIGS. 3C and 3D, in which in the information having IID code JSN416, a tile of 1 row by 11 columns is updated, and again in MDC2000, a second tile of 6 rows by 40 columns is updated. Alternatively, as shown in FIG. 3E, the update data may appear on the same line as the data enable sequence. In particular, the sync signal 42' is followed by the IID code 44. However, the coordinates 46' include the pixel start number and the pixel stop number of a single row of the update data, along with the line number of the particular line. The update data 48 then follows on the same line. Each tile 36 is then composed of the update data 48 appearing in, for example, a plurality of consecutive lines. Further, as shown in FIG. 3F, the update data may be presented simultaneously on one line for more than one page at a time. In particular, the sync signal 42" is followed by two IID codes 44", and then the coordinates 46 of the tile 36 to be replaced which in this example is 5 rows by 80 columns, toward the bottom of the portions of information having IID codes JSN416 and MDC2000. Additionally, all authorized displays connected to the video transmission may be simultaneously updated at the same coordinates by using a special reception key, e.g., RK =0.

Figure 5:
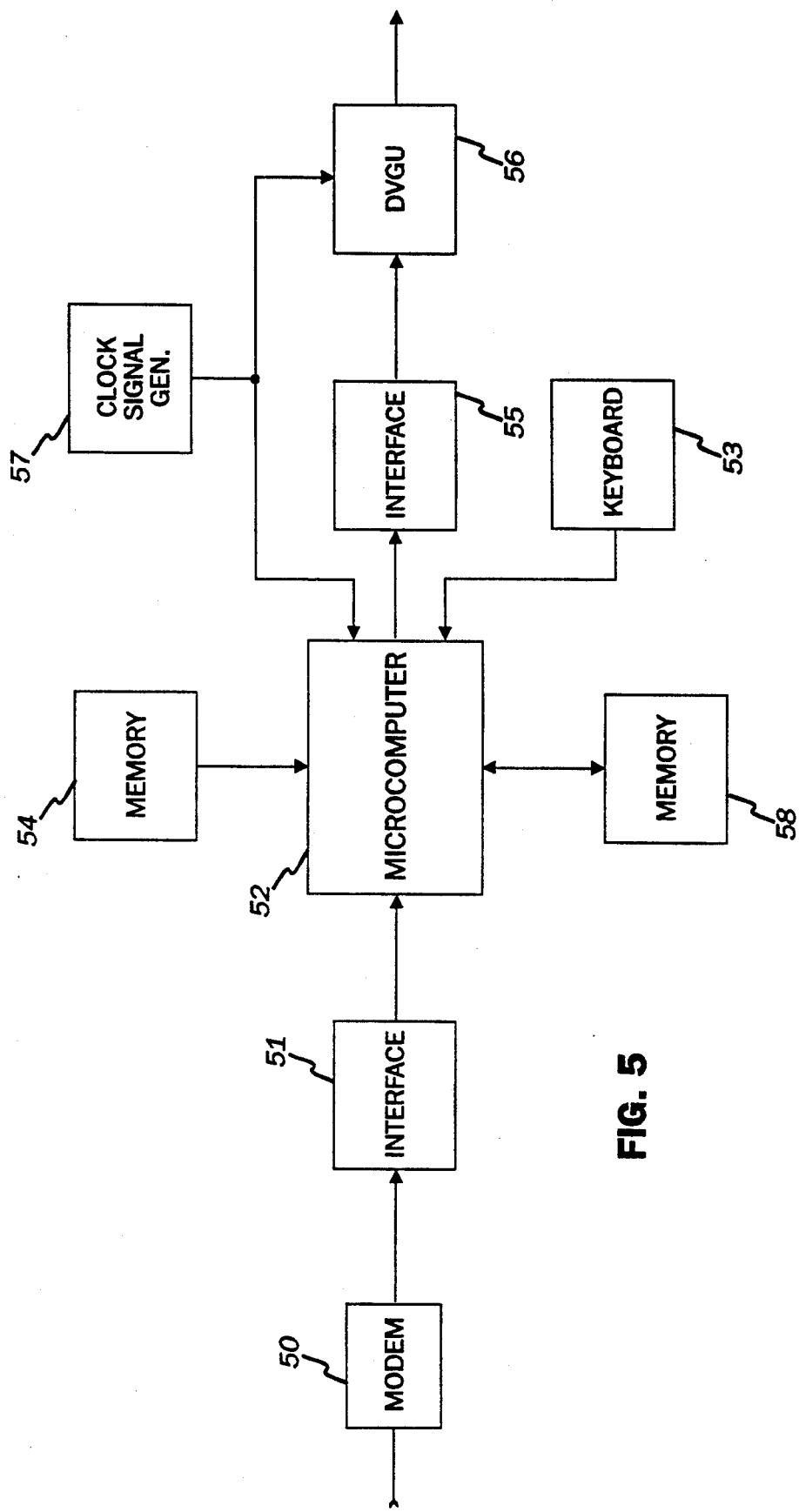
FIG. 5 shows a block diagram of an encoder in the system according to the first embodiment of the invention.

An encoder for the first embodiment of the invention is shown in FIG. 5. The encoder includes a modem 50 for receiving data from a source of market information. This data may be in the form of entire pages or records of financial information where portions are updated, or the update data itself along with information for the positioning of the update data on the respective display screen. The output of modem 50 is connected to an interface 51, which is, in turn, connected to the input of a microcomputer 52. The microcomputer 52 reassigns the data to appropriate locations in new output displays for clients of the information vendor. A keyboard 53 is connected to the microcomputer 52 for controlling the microcomputer. A memory 54 is connected to the microcomputer 52 and supplies thereto the configuration of the new output displays, the reception key (RK) codes for each of the new portions of display information, and the display identification (DID) codes of the client's video screens authorized to receive each of the new portions of information. Based on this information, the microcomputer 52 generates the first data stream and the sequence of second data streams.

The output of the microcomputer 52 is applied through an interface 55, to a digital video generation unit 56 which reconfigures the output of the microcomputer into digital video lines. The digital video generation unit 56 also generates the encoded signal flag and inserts the various synchronizing signals at the beginning of each of the digital video lines. A clock signal generator 57 is connected to the digital video generation unit 56 and the microcomputer 52 for applying timing signals thereto at the line frequency. In the event that the update information applied to the modem 50 is in the form of entire pages or records, a memory 58 is connected to the microcomputer 52 into which the pages or records are entered enabling the microcomputer 52 to compare one page or record with the update of the page or record to extract therefrom only the update data.

Figure 6:
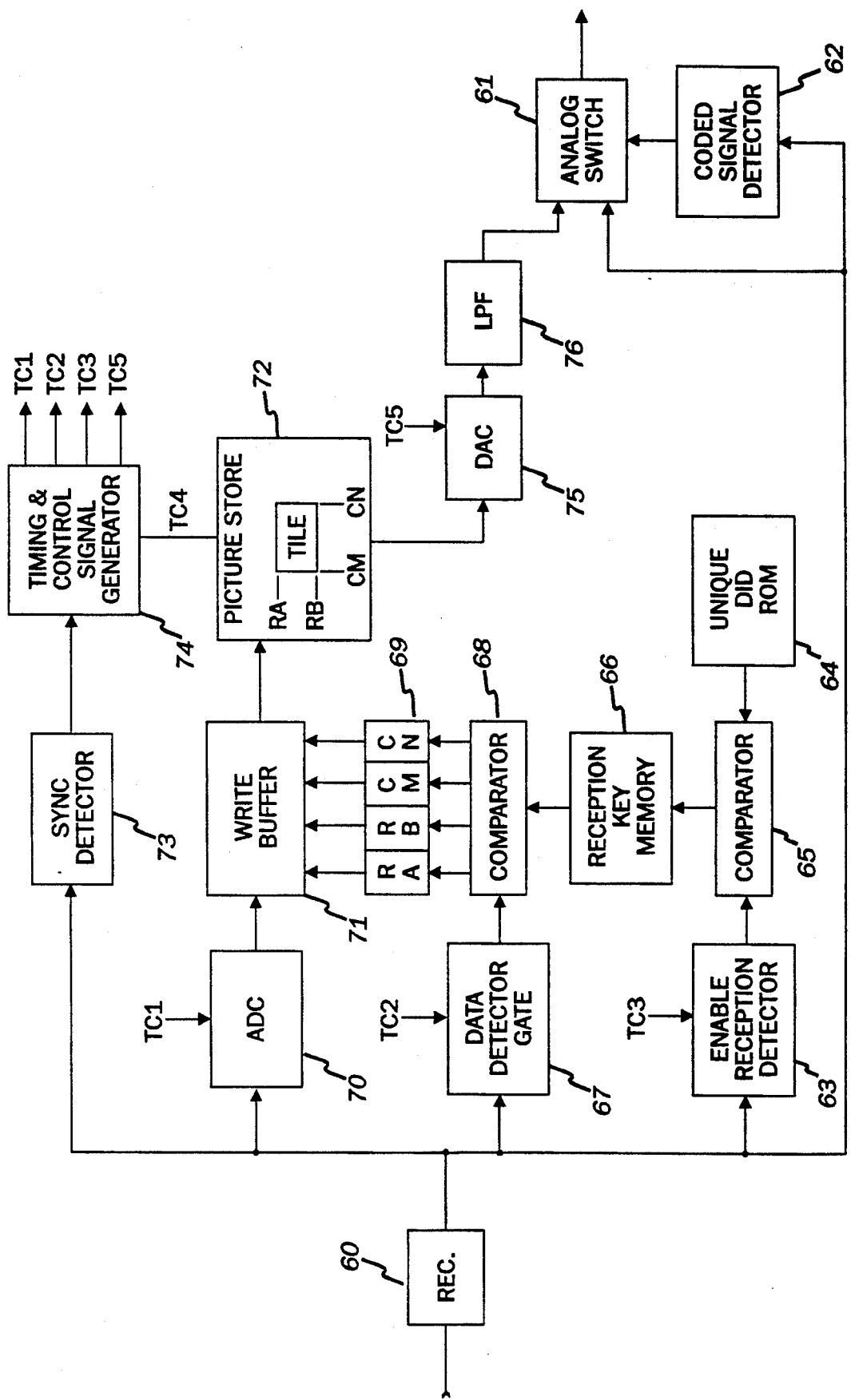
FIG. 6 shows a block diagram of a decoder in the system accordint to the first embodiment of the invention.

FIG. 6 is a block diagram of a decoder for use with the encoder of FIG. 5. The decoder includes a receiver 60 for receiving the data transmitted by the digital video generation unit 56. The output of the receiver 60 is applied to an analog switch 61 for selective application to a video screen in the event that standard non-coded signals are being received. A coded signal detector 62 is coupled to the receiver 60 for receiving the encoded signal flag and for switching the analog switch 61 accordingly. An ER detection gate 63 is connected to the receiver 60 for receiving the enable reception messages containing the DID/RK code sets. Each of the received DID codes is compared with a unique display identification code stored in a ROM 64 by a comparator 65. Upon each match of the DID code, the individual RK code for the respective portion of information is stored in a memory 66.

The output of the receiver 60 is further connected to a data detection gate 67 for receiving the data enable sequences. The individual RK codes in the received data enable sequences are compared in a comparator 68 with the individual RK codes stored in the memory 66. Upon a match of one of these RK codes, the accompanying display coordinates of the update data are loaded into registers 69. An analog-to-digital converter 70 processes the appropriate update data at the output of the receiver 60 and applies its output to a write buffer 71, which also receives the output of the registers 69. The output of the write buffer 71 is applied to a picture store memory 72 in which the section therein corresponding to the location of the update data is updated by using the display coordinates. A synchronizing signal detector 73 is connected to the output of the receiver 60 for separating the message synchronizing signals. The output of the synchronizing signal detector 73 is applied to a timing and control signal generator 74 for generating timing signals for the analog-to-digital converter 70, the data detection gate 67, the ER detection gate 63 and the picture store 72. The output of the picture store 72 is applied to a digital-to-analog converter 75 controlled by the timing and control signal generator 74. The output of the digital-to-analog converter 75 is applied through a low-pass filter 76 to another input of the analog switch 61.

In a second embodiment of the invention, the video signals representing the market information includes color information. In addition, standard television signals are included in the digital video signals for selective viewing of realtime television programs on the video screens. This transmission is necessarily synchronous to the chosen television standard. When the digital video signals are being transmitted by coaxial cable, the usable bandwidth is in excess of 24 MHz.

Figure 7:
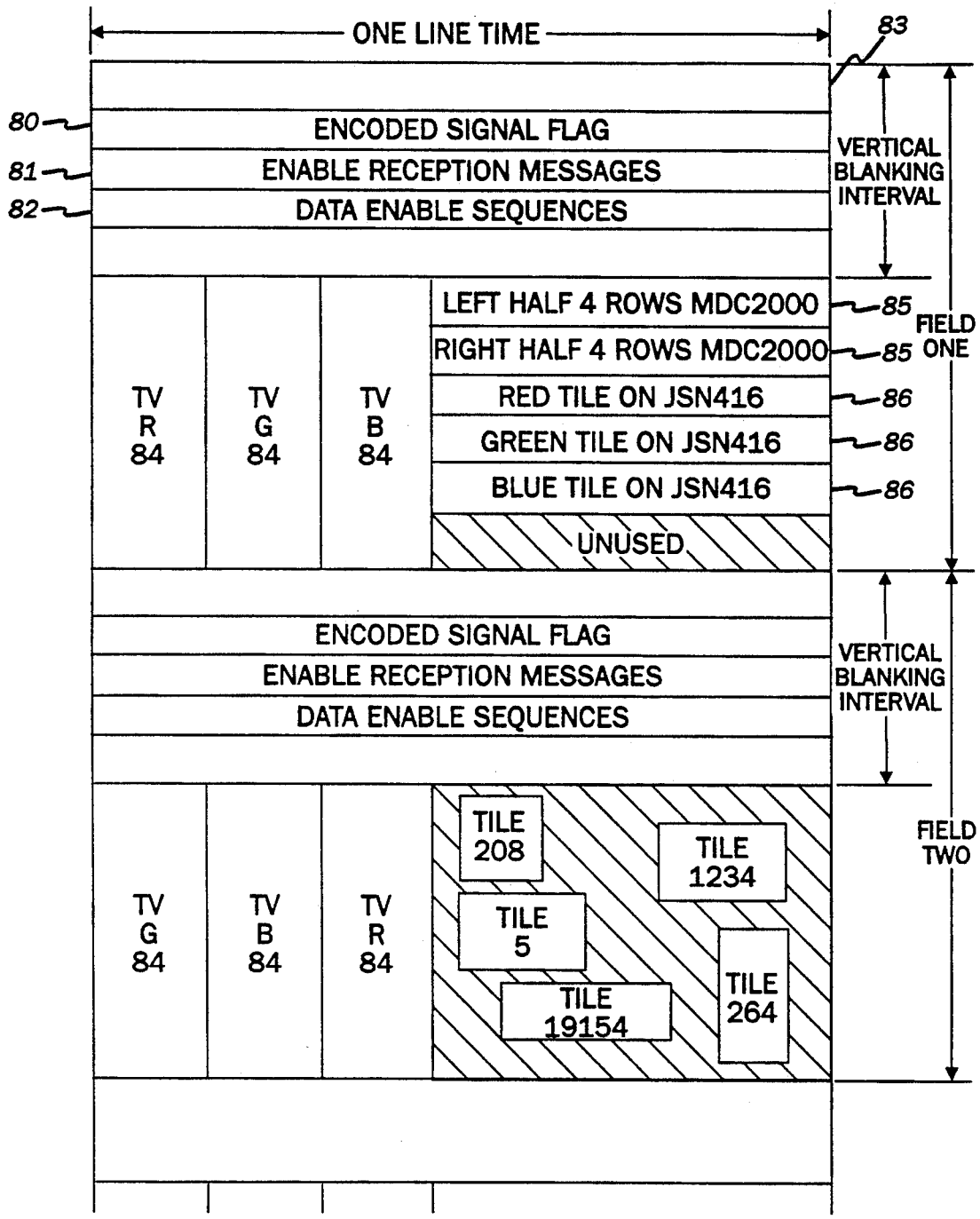
FIG. 7 is a diagram representing the transmitted video signals in a second embodiment of the invention.

FIG. 7 shows a pictorial representation of the transmitted video signals. The encoded signal flag line 80, the enable reception messages lines 81 and the data enable sequence lines 82 are transmitted during the vertical blanking interval 83 between each field of the video signal. During the active video portion of the field, in a first half of each scanning line, the television R, G and B signals 84, each originally having a bandwidth of 4 MHz and each time compressed by a factor of six to an expanded bandwidth of 24 MHz, are sequentially transmitted. In the second half of each scanning line, the update data for individual pages of the market information are transmitted. While the television signals 84 are in color, the update information may be monochromatic, color or a mixture of both. In particular, as shown, the first 8 half-lines contain the monochrome update data 85 for the left half and right halves, respectively, corresponding to RK code MDC2000. The update date 85 is followed by the update data 86 corresponding to RK code JSN416. The update data 86 is presented in color as the three color signals R, G and B. The remainder of the right half of the first field is shown as being unused in this example. The left half of the second field contains the G, B and R components of the television signals 78'. The right half of the second field contains the monochromatic update data corresponding to RK codes 208, 1234, 5, 19154 and 264.

Figure 7A:
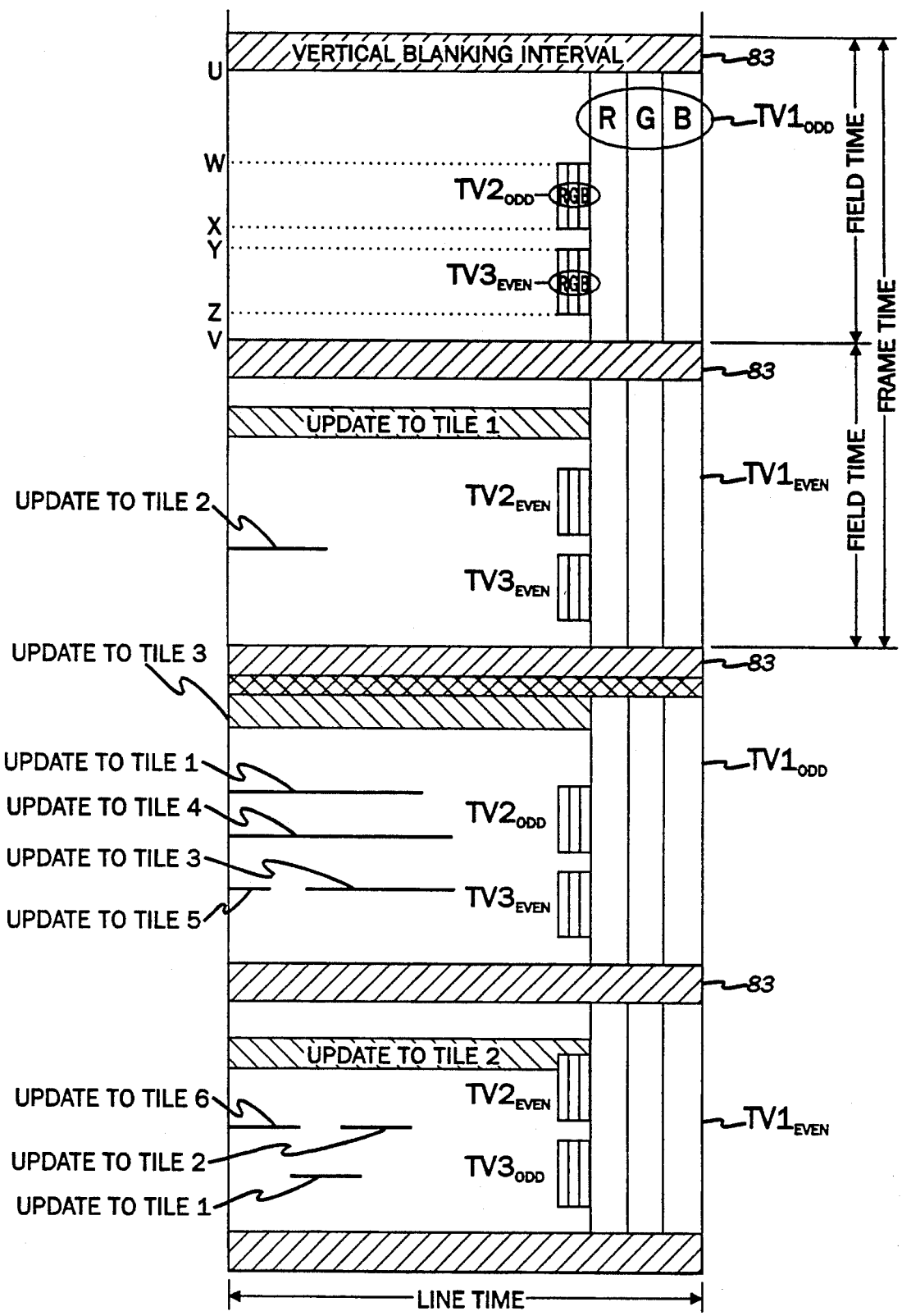
FIGS. 7A, 7B and 7C illustrate the technique of transmitting and displaying a plurality of television signals along with update data.
Figure 7B:
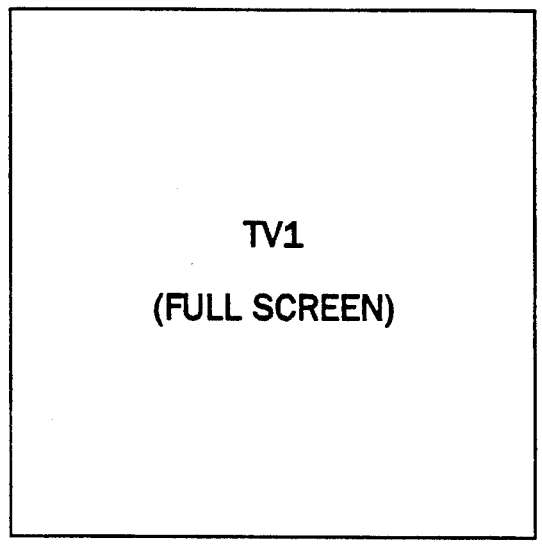
Figure 7C:
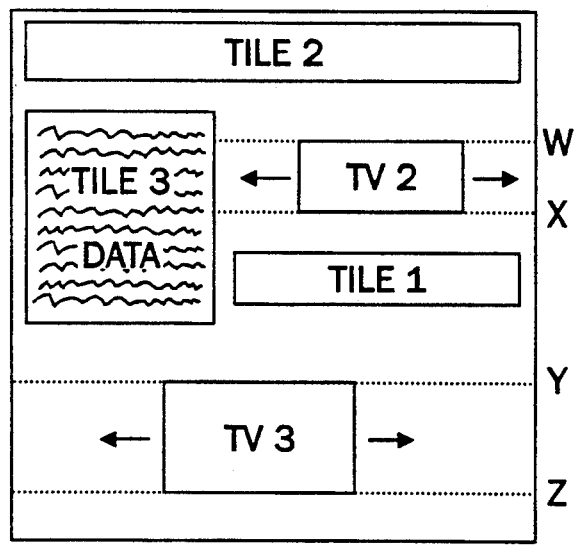

FIGS. 7A–7C illustrate the technique of transmitting and displaying more than one television signal at a time along with update data for output displays on a plurality of video screens. Specifically, FIG. 7A illustrates the transmission of four fields of digital video signals corresponding to two television video frames. A vertical blanking interval 83, corresponding to the vertical blanking interval 83 of FIG. 7, is shown. Nine different sources of information are shown as being transmitted in the fields, namely television signals TV1–TV3 and six tiles numbered TILE 1 to TILE 6 having corresponding update data to particular portions of display information. The transmission of a field structured in this manner is done at the television scanning rate, as mentioned above.

The television signals TV1–TV3 are shown as being time compressed in a well known manner. The TV1 signals are shown as being transmitted during a portion of every horizontal digital video line. Television signals TV2 and TV3 are shown as being transmitted only during certain horizontal digital lines, namely from line W to line X, in the case of TV2, and from line Y to line Z, in the case of TV3. The television signals TV1–TV3 are shown as pluralities of lines having alternating odd line ($TV_{ODD}$) and even line ($TV_{EVEN}$) fields in successive video fields. The television signals are illustrated in FIG. 7A in the RGB format, i.e., three primary color signals, but also may be transmitted as one luminance and two color difference signals, e.g., Y,U,V. Further, the television signals may be digitized and compressed, e.g., using the JPEG or MPEG standards or some other technique.

Also, the update data to output display tiles TILE 1 –TILE 6 are transmitted in various lines at times when the television signals are not being transmitted.

The update data for an output display tile may appear anywhere in the video screen and may start and stop at any point or in any line of the digital video field, provided that the update data does not occur simultaneously with the television signals. Thus, update data may occur during the vertical blanking interval 83 as shown in the third digital video signal field for update data to TILE 3. Update data also may be a lengthy stream of data that fills those portions of successive lines that are not filled by television signals as illustrated in the fourth digital video signal field with respect to the update to TILE 2 and signals TV1 and TV2. Further, update data may be a relatively short stream of data starting at the beginning of a line time, or in the middle of a line time, see, e.g., updates to TILE 6 and TILE 2 and TILE 1 in the fourth field.

In addition, there may be no update data for display information as in the first digital video signal field containing television signals $TV1_{ODD}$, $TV2_{ODD}$, $TV3_{EVEN}$, although there will be some digital data (not shown in the first field) that is transmitted, as described below.

Figure 13:
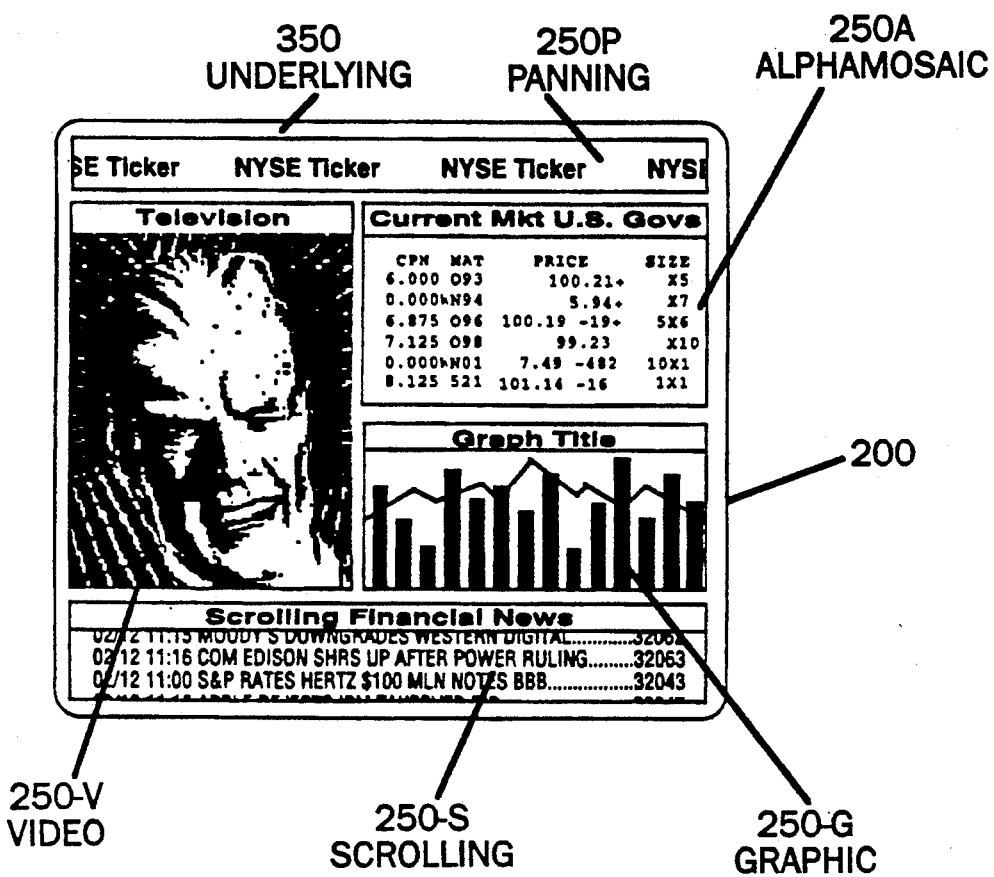
FIG. 13 is an illustration of a composite page having a plurality of tiles.

The resulting displays that are possible with this transmission structure are illustrated in FIGS. 7B and 7C and 13. FIG. 7B illustrates the display of the television signals TV1 and which, due to the transmission of such signals during each digital video scan line, produce full screen television displays. FIG. 7C, on the other hand, illustrates the display of both TV2 and TV3 signals which, by virtue of their transmission within the stated intervals, are displayed within specific vertical boundaries within the video screen. Specifically, the TV2 display must be located between horizontal lines W and X in any horizontal location (with the proviso that it not interfere with output display data) and TV3 must be displayed between horizontal lines Y and Z, in any horizontal location (with the same proviso). The output display corresponding to one of the source information in tiles TILE 1 –TILE 6 that the particular video screen is enabled to receive can be displayed above, below or alongside the TV2 and TV3 signals (only TILE 1 –TILE 3 are illustrated).

Due to the complex ordering of the update data in the first and second fields, the data enable sequences in the lines 82 must necessarily be more complex than those shown in FIGS. 3B –3F. In addition, the enable reception messages also must indicate which of the video screens is authorized to receive the television signals sent with the update data. In particular, as shown in FIG. 8A, the enable reception messages are similar to those shown in FIG. 3A, with the exception that in addition to the DID/RK code sets, the messages include a set 87 indicating which of the video screens, for example, the screen with DID code 297, is authorized to receive which television signals, for example, the television signal having an IID code TV1, which also may be used as a reception key (RK) if distribution is to be enabled. FIG. 8B shows a sample data enable sequence which 35 includes, in addition to that described with respect to FIGS. 3B -3F, the coordinates of the update data in the source field. FIG. 8C shows a sample of the data enable sequence for identifying the television signals, and includes a data synchronizing signal 88, a television RK code 89 and the starting coordinates 90 of the color signals, red, green and blue, or Y,U,V.

Figure 9:
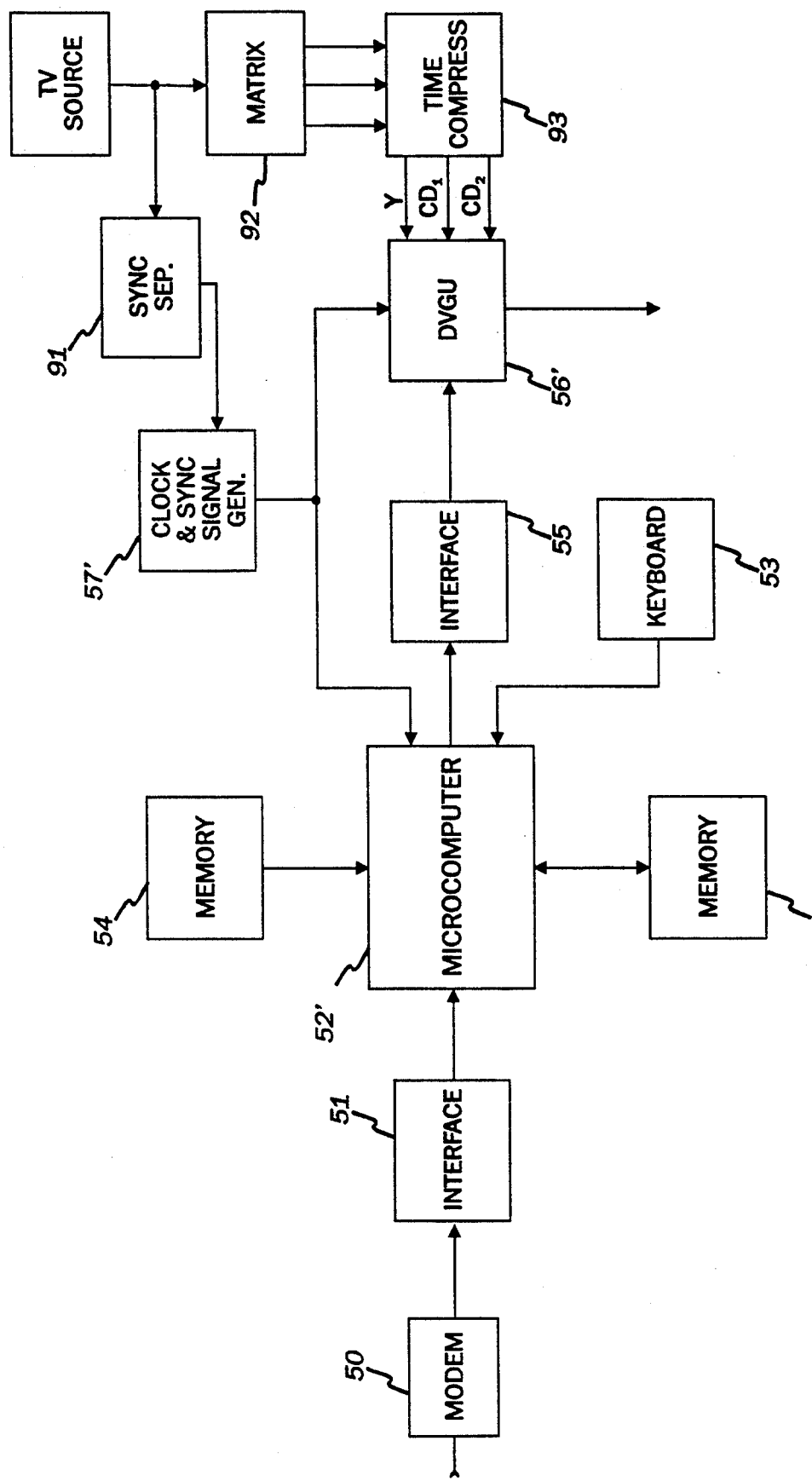
FIG. 9 is a block diagram of an encoder in the second embodiment of the invention.

FIG. 9 shows a block diagram of an encoder for the second embodiment. The digital video generation unit 56' has a second set of inputs for receiving the three components of the color television signal, $Y,CD_1,CD_2$. In particular, a source of television signal is connected to a synchronizing signal separation circuit 91 for detecting the vertical and horizontal synchronizing signals in the video signals. The source of the video signals is also connected to a matrix circuit 92 for providing the three components. Each of these components is subjected to compression in compression circuit 93 and the three components are then applied to the digital video generation unit 56'. The clock and sync signal generator 57' applies synchronizing signals to both the digital video generation unit 56' and the microcomputer 52', and receives the synchronizing signals from the separation circuit 91 for synchronization therewith.

Figure 10:
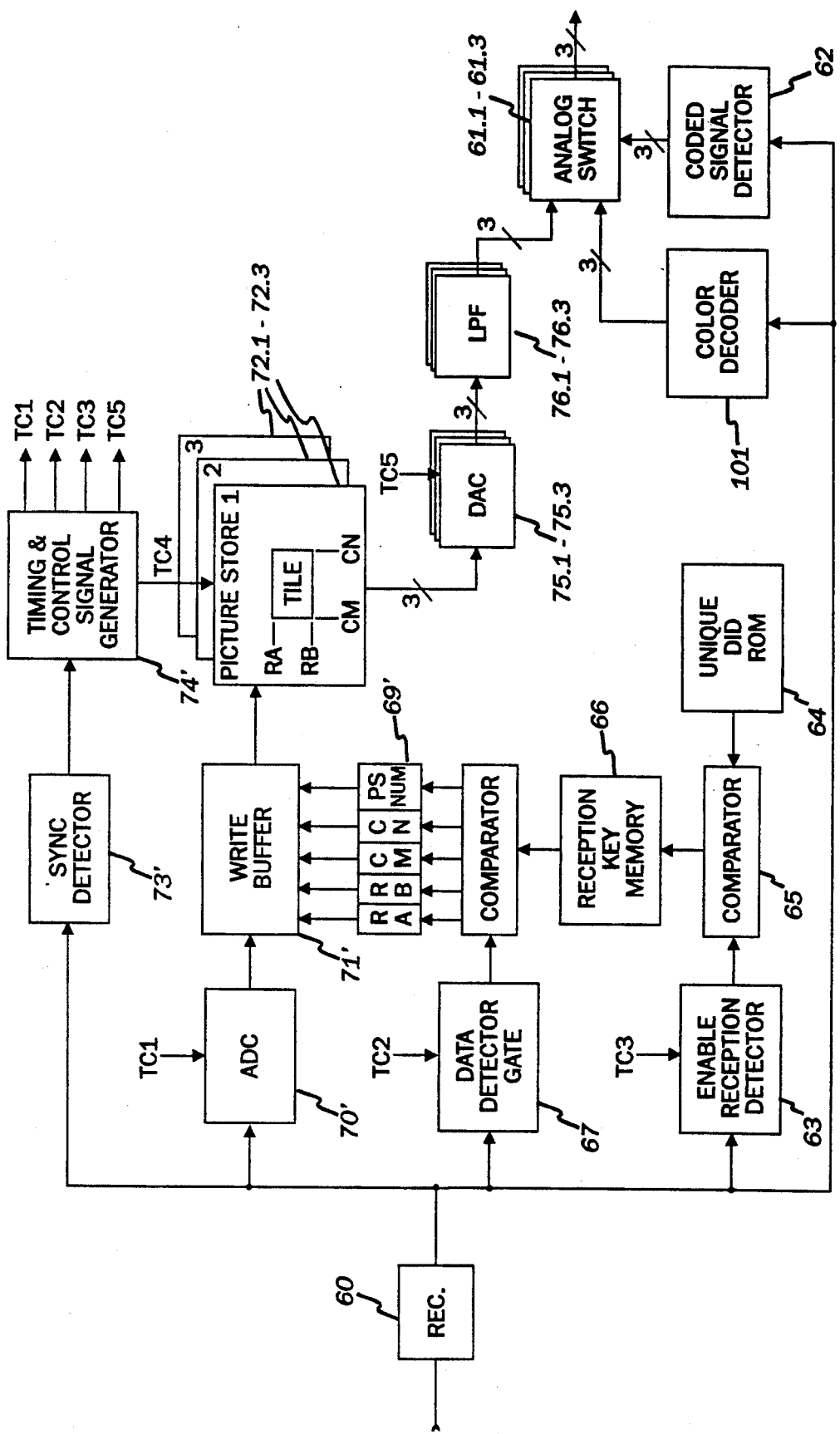
FIG. 10 is a block diagram of a decoder in the second embodiment of the invention.

FIG. 10 shows a block diagram of a decoder for the second embodiment. Components the same as those in FIG. 6 are designated with the same reference number. The decoder is substantially similar as the decoder of the first embodiment with the exception that the decoder is now capable of processing color signals and the encoded data selectively includes television signals. In particular, a color decoder 101 is included between the output of the receiver 60 and the input of the analog switch 61.1 -61.3. The register 69' includes a register element for storing the number of the picture store. The synchronizing signal detector 73' outputs field synchronizing signals in addition to line synchronizing signals. The write buffer 71 now accesses three picture stores 72.1 -72.3 corresponding to the three color components, red, blue and green. The outputs of these picture stores 72.1 -72.3 are applied to three digital-to-analog converters 75.1 -75.3, and then to three low pass filters 76.1 -76.3 for application to the other inputs of the three analog switches 61.1 -61.3.

Referring to FIGS. 11 to 29, a third embodiment of the present invention is shown, which reflects a number of improvements to the first and second embodiments described above. One system in accordance with the third embodiment includes an encoder 312, a digital-video (DV) bus 314, a plurality of decoders 316, a plurality of video screens 317, a control bus 318, a keyboard 319, optionally a mouse 319', and a supply (or source) of display information 310 which may include realtime television signals, and analog and digital video signals representing display information. The DV bus 314 is preferably a channel capable of transmitting digital and video information. This permits the use of standard coaxial cables or video switches as the DV bus 314.

Figure 11:
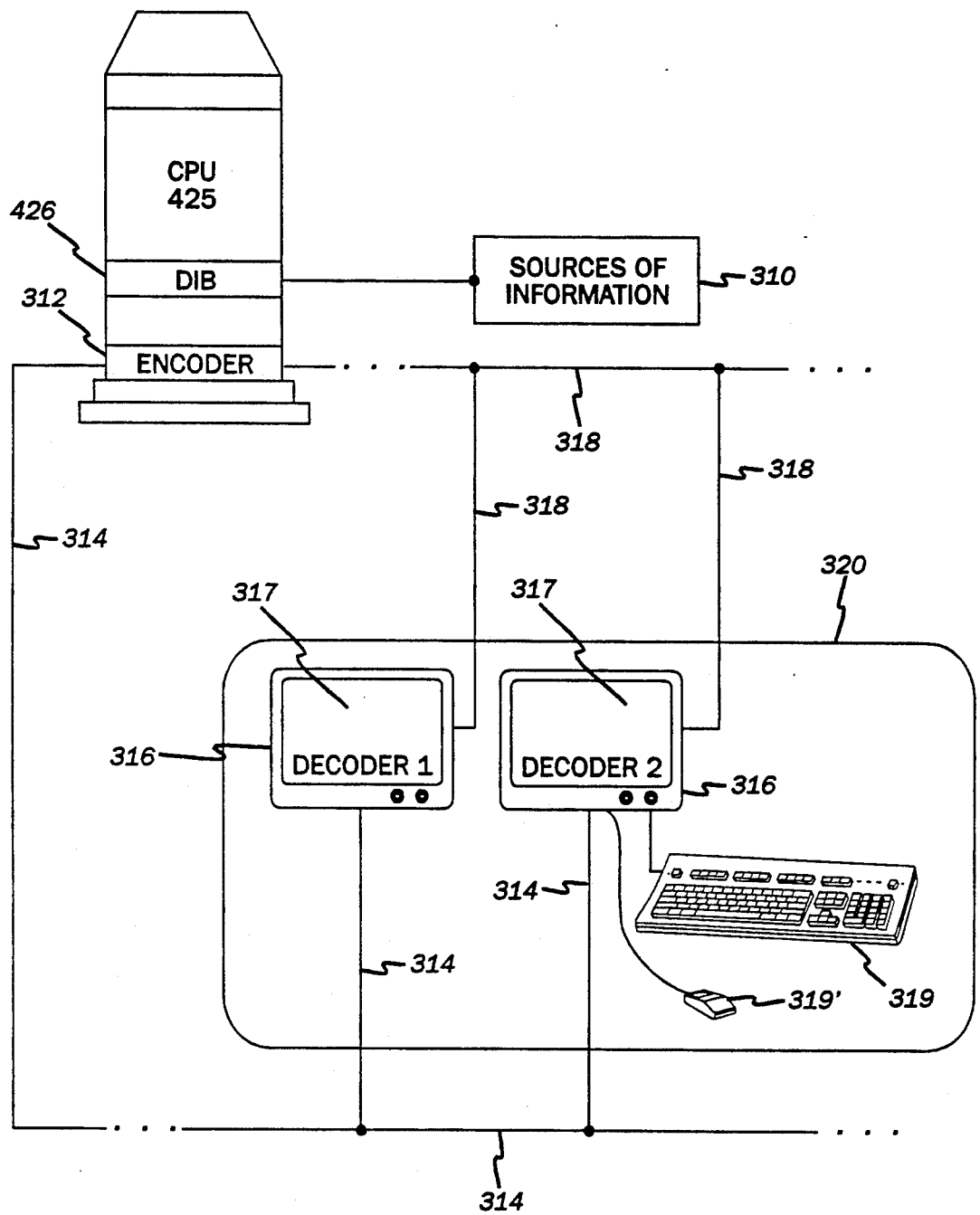
FIG. 11 is a block diagram of a system according to a third embodiment of the present invention.
Figure 26:
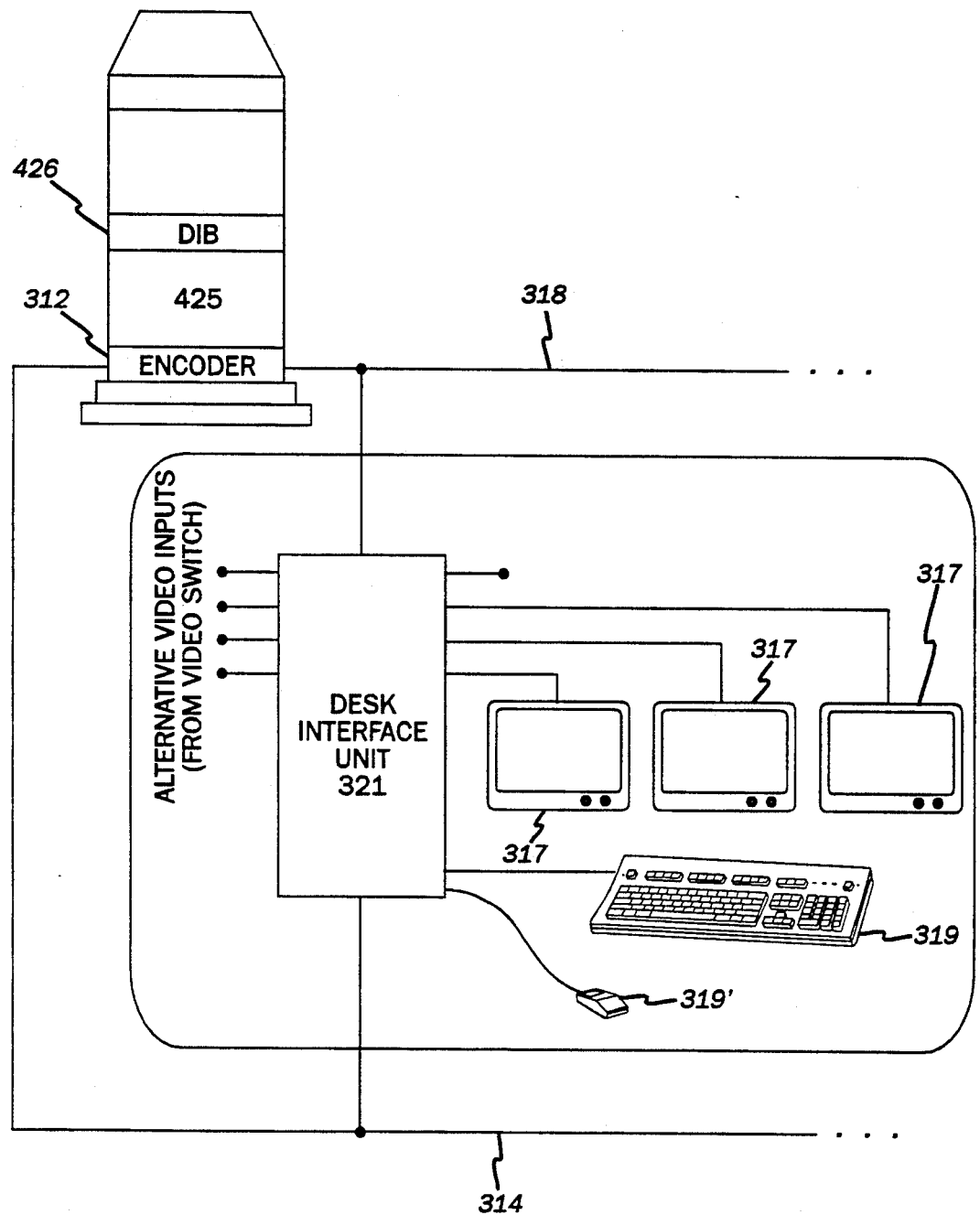
FIG. 26 is a block diagram of a desk interface unit of an alternate embodiment of the third embodiment of the present invention.

As illustrated in FIG. 11, each decoder 316 has an associated video screen 317, preferably constructed as an integral unit in a common enclosure. Alternately, as shown in FIG. 26, each decoder 316 may be part of a desk interface unit (DIU) 321, which supports a plurality of video screens 317, e.g., four, and a plurality of users and their respective keyboards 319 and mice 319'. Each user may have one or more video screens 317 arranged in a work space, e.g., on a desk top 320. Each video screen may have a unique DID. Alternately, each user or desk top 320 may have a unique DID such that restricted display information may be displayed on any video screen of the enabled user or desktop.

One aspect of the present invention concerns improvements in the structure of the signals (also referred to as "DV bus signals" which are concatenated to form "DV bus messages") and their messaging along the DV bus 314 between the encoder 312 and the plurality of decoders 316, and their display on a video screen 317.

Figure 12:
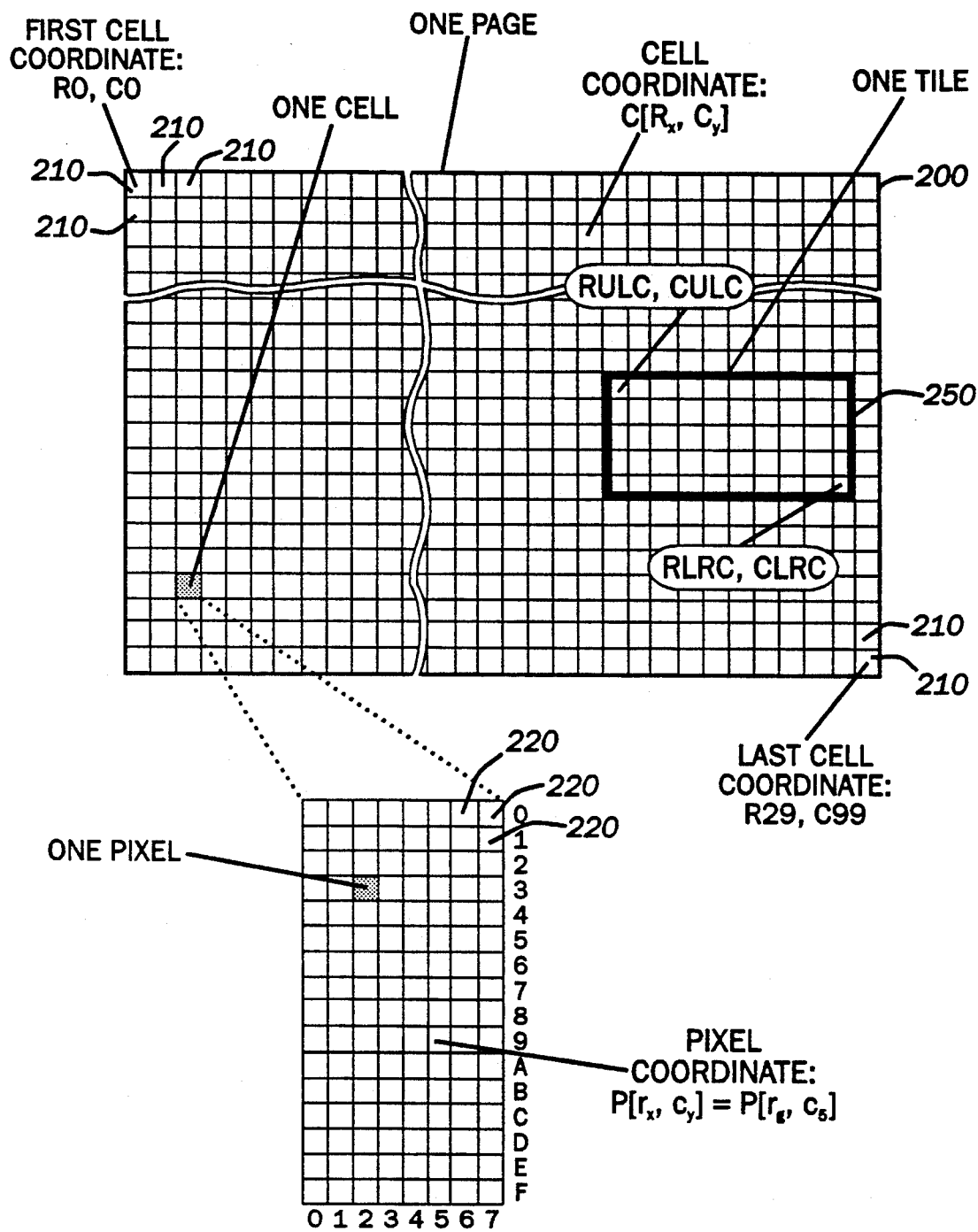
FIG. 12 is an illustration of the format for a single page of display information in accordance with the invention.

FIG. 12 illustrates the image produced on each video screen 317, which is a composite page 200 of display information and/or television signals, as described below. Each composite page is organized as a plurality of cells 210. Each cell is organized as a plurality of pixels 220. Every cell 210 has an assigned location within composite page 200, by row R and column C, relative to an origin and cannot be arbitrarily placed. The origin may be selected to be in the upper left corner or elsewhere. Similarly, every pixel 220 has an assigned location within each cell 210, by row r and column c, relative to a cell origin and cannot be arbitrarily placed. In accordance with the present invention, and as explained below, messages transmitted along DV bus 314 are either directly or indirectly addressed to cells.

In a preferred embodiment, each composite page 200 is composed of 30 rows and 100 columns of uniform and fixed-size rectangular cells 210, as shown in part in FIG. 12. The coordinates of the cell 210 in the upper left corner of the page 200 are (R0,C0). The cell 210 in the lower right corner of the page 200 is at (R29,C99). Each fixed-size cell 210 has 128 pixels 220 organized into 8 columns by 16 rows. This represents a display screen 317 that is larger than the size of standard pages or records of display information provided by commercial information vendors, and the size video screens provided by those vendors with their systems. Such standard pages and display screens have 18 or 25 rows by 80 columns or 12 rows by 64 columns. Advantageously, the larger display screen permits the user to create composite pages 200 containing more display information than previously possible with the prior systems, and further permits displaying television signals and/or value added information without sacrificing the display information.

Each pixel 220 within a cell 210 may have up to 256 different colors, selected from a larger palette of 16,777,216 colors. The number of colors that may be displayed on any given video screen 317 depends on the amount of memory of the decoder 316 operatively connected to the video screen. For example, if a decoder has been loaded with one byte per pixel of screen store memory, or approximately ($800 \times 480 = 384,000$ pixels) 376 Kbytes of memory, it can display 256 colors per pixel. For another example, if a decoder, which has lower cost and functionality, has been loaded with only two bits per pixel of screen store memory, or approximately 96 Kbytes of memory, it can only display 4 colors per pixel.

Reducing the number of colors to be signaled also reduces the length of the messages needed to create or "paint" a composite page 200. For example, when four colors are being used, only the first two significant bits of a color byte need be transmitted. Even when 256-color decoders are used, clever selection of the color definitions can reduce the amount of messages necessary to transmit information concerning a small tile on the page. For example, a first tile may have colors 0, 1, 2, and 3 while a second tile may have colors 16, 17, 18, and 19. Changing the colors in the second tile only requires the transmission of two bits of information per pixel.

In this third embodiment also, DV bus messages are transmitted as tiles. As already noted, a tile is a rectangular region that will appear on the video screen 317 and is illustrated here by the bold black rectangle 250 on the right side of composite page 200 in FIG. 12. It may contain any number of horizontally and vertically contiguous cells 210. Preferably, each tile is defined by the location of its first cell, i.e., the coordinates (row R and column C), in its upper left corner and either its size (i.e., number of rows and columns of cells in the tile) or the coordinates of the cell in its lower right corner.

This third embodiment of the invention preferably employs two concepts of tile messaging to reduce further the amount of overall data that is required to be transmitted. The first concept is called cell wrapping. This provides for sending one large single continuous message to a tile for one cell 210 after another (either horizontally or vertically aligned) within a tile having determined boundaries so that the first cell to cross the tile boundary in the direction of continuity automatically "wraps back" within the tile to the beginning of the next row or column so that each cell is successively filled. The tile boundaries are preferably incorporated into the tile display boundary coordinates provided to the decoder for the update data. This avoids having to monitor when the next cell 210 will be outside of a boundary of the tile and resend either a new message or next row or next column indicator. The decision to use horizontally aligned messages or vertically aligned messages may be based on the aspect ratio of the tile boundary so as to minimize the number of wrapping events and maximize painting speed. When combined with run length encoding of messages, described below, cell wrapping greatly improves messaging efficiency.

The second concept is the use of implied motion where portions of display information contain regions that must be moved, either vertically (scrolled) or horizontally (panned). For example, conventional financial instrument tickers are usually panned horizontally across a video screen, while news headlines are sometimes scrolled vertically. This movement can be accomplished by either retransmitting all of the required information such that the relative location of each column (panning) or row (scrolling) is adjusted for each incremental move, or in accordance with a preferred embodiment, by transmitting only the new information and "implying" the desired motion by the prior definition of a panning or scrolling tile type. Implied motion within a tile greatly improves the messaging efficiency.

Referring to FIGS. 12, and 13, the video screen 317 may be referred to as the underlying tile 350. One top of the underlying tile 350, one or more of the following types of tiles, referred to as tile 250 with a letter suffix, can be displayed as illustrated in FIG. 13.

A graphic tile 250-G may be defined to display information on a pixel by pixel basis. It is used to display graphs, charts, scanned images, e.g., still pictures, value-added presentations of historical data, and similar non-alphanumeric character display information.

An alphamosaic tile 250-A is a tile entirely defined by an extended set of ASCII characters or the equivalent (i.e., alphanumeric characters). It is used to display normal alphanumeric character text plus any predefined extended ASCII characters. Each pixel usually may have up to 256 colors. In FIG. 13, the alphamosaic tile 250-A is illustrated as displaying information concerning U.S. Government securities that are periodically updated. Alphanumeric tiles 250-A are static unless they are further defined for relative movement.

A panning tile 250-P is an alphamosaic tile that is controlled to create horizontal motion, left or right. In FIG. 13, panning tile 250-P is illustrated as the (NYSE) Ticker which is being panned right to left. The character string update "NYSE" has been received at the entry (partial "S" character) and is being automatically panned (partial "E" character) under the control of decoder 316 using implied movement. The panning effect may be a cell by a cell advance or a pixel by pixel advance, the latter providing a smoother image transition and presentation of partial characters.

A scrolling tile 250-S is an alphamosaic tile that is controlled to create vertical motion, up or down. In FIG. 13, the scrolling tile 250-S is illustrated as the "Financial News" and is being scrolled upwardly. The entire lower row of characters has been received at the entry and is being automatically scrolled (partial top and bottom rows) under the control of decoder 316 using implied motion. The scrolling may be a cell by cell advance or pixel by pixel advance, the latter providing a smoother image transition and presentation of partial characters.

A video tile 250-V is used to display a realtime television signal. Each pixel within the video tile may take on any color supported by the relative television transmission standard and the picture store memory size of the given decoder 316. In an embodiment wherein the decoder 316 includes a picture store memory, different TV signals may be selected for display within a video tile 250-V so long as they are being transmitted within the same vertical format. If, however, a picture frame memory is used, which can store an entire frame of television signals, then the video tile 250-V need not be limited to the same vertical format and may be located anywhere on underlying tile 350.

The size and display location of each tile 250 on underlying tile 350 is preferably initially established using a tile default size and position. Each tile 250 may be locally resized and repositioned by each user. Thus, for example, by using a mouse 319 or keyboard 319', each user may redefine any tile 250 by (1) overlaying any one tile over any other tile and overwriting the display information of the other tile(s), (2) changing the foreground/background attributes among the displayed tiles, (3) moving a tile to any new display location on the video screen (except for real time television video tiles 250-V, which may only be moved horizontally in the absence of a picture frame memory), and (4) changing its size either to display more or less display information or to display the same information in larger or smaller size.

In accordance with the third embodiment of the present invention, tile messaging embodies the following five principles:

1. Each tile 250 is uniquely named, i.e., it has a unique IID code that is used as a reception key, and is assigned system default display location and size, typically as an offset referenced to the origin cell (e.g., (R0,C0)) on the underlying tile 350 or to the origin cell of a tile 250 within the underlying tile 350. Thus, a tile 250 may be nested within other tiles 250 on an underlying tile 350, such that relative offset of each tile in the chain to its antecedent associated tile is respected and maintained by the decoder.

2. Tiles 250 may be locally resized and repositioned from their system default conditions locations by individual users and may be given an offset referenced to an origin cell on the underlying tile, or to an origin cell of any other tile. The remapping of the tile default location and size to the user-defined tile location and size occurs in each user's decoder. DV bus messages to update the user-defined tile are transmitted with the default display coordinates (unless the symbolic signaling technique described below is used) and the default tile message is mapped onto the user-defined tile within the picture store memory of the decoder. If appropriate, the user's definition of the tile will provide display coordinates for selecting appropriate cells selected by the user and disregarding other cells in the DV bus message of the default tile, so that only the display information in the user defined tile is stored and displayed. Thus, the user's redefinition of the tile has no effect on the DV bus messages and only the user selected information is displayed and updated.

3. It is often more efficient to retransmit the whole tile using cell wrapping rather than transmitting just the updates. This is because computational efficiency is obtained by filling in time lengths of DV bus signals with useful data rather than blanks. This is not usually true for retransmitting the whole page of display information.

Figure 13A:
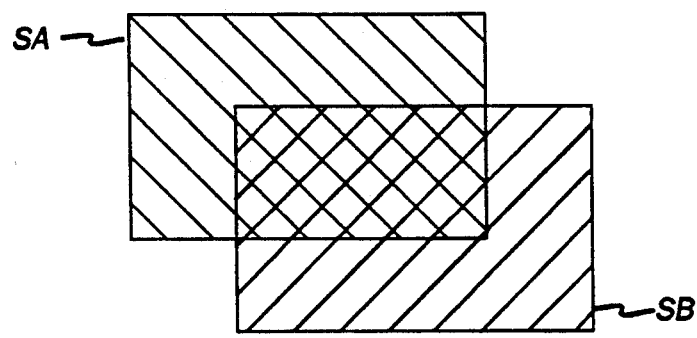
FIG. 13A, 13B and 13C are illustrations of tile messaging for updating different user defined tiles having common display information.
Figure 13B:
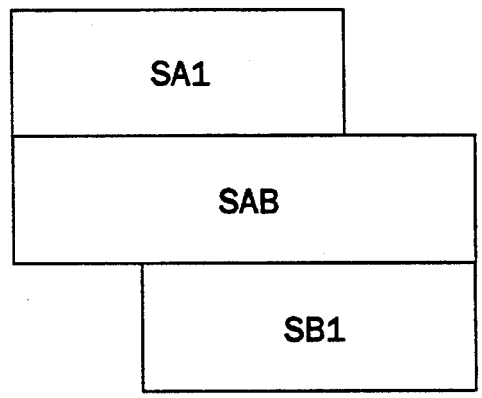
Figure 13C:
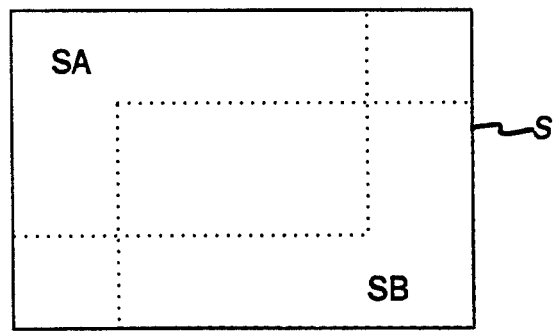

4. Related page or record updates often occur in bursts and are usually received from the information vendor one row of display information immediately after the other. It is far more efficient to store all of these received multiple contiguous-column row updates to a tile within a portion of display information for a very small time (perhaps 1/20th of a second) before transmitting them as a single group within a single tile on the DV Bus 314 to all of the decoders 316. This technique avoids retransmitting the same tile each time one row of the tile is updated, and retransmitting each update data, but not the complete tile, with the appropriate header and offset display coordinates, e.g., starting and ending row and column to display the update in the relevant display location of the video screen. Similarly, with reference to FIGS. 13A-13C where two users have defined tiles that include some common portions of the same page or record of display information, e.g., tile SA and tile SB, the update data for the underlying page or record of display information may be transmitted in one of three formats. The first format is to create two separate tiles SA and SB and transmit update data for those tiles as necessary with a duplication of messages. The second and more useful technique is to decompose the overlapping tiles SA and SB into three tiles SA1 which is unique to user A, SB1 which is unique to user B, and SAB which is common to users A and B. Then updates for the three tiles are separately provided as appropriate. A third technique is to create a "supertile" S which includes all of the display information. In this latter embodiment, user A is enabled to receive supertile S with display coordinate information for retrieving only those portions of information selected by user A, and user B is similarly enabled to receive supertile S with display coordinate information for retrieving only those portions selected by user B. Thus, the update message is only sent once, yielding improved DV bus messaging efficiency.

5. Both contiguous-column row messaging and contiguous-row column messaging should be supported within tile messaging for efficient updating of tiles.

The application of tile messaging greatly reduces the amount of message traffic on the DV bus 314. One example is explained with reference to FIGS. 14A and 14B, which respectively illustrate composite page 200$a$ having tiles $T_1$, $T_2$, $T_3$ and $T_4$ and composite page 200$b$ having tiles $T_1$, $T_5$, $T_3$ and $T_4'$, such that tiles $T_4$ and $T_4'$ are different user-defined tiles based on the same original portion of display information $T_4^*$.

First, it is noted that in prior art systems, all vendors of video display information typically use contiguous-column row oriented messaging; all screen changes are signaled by multiple individual messages, each message concerning only contiguously located columns in one row of the page or record. A standard page from one commercial vendor may be thought of as one large static alphamosaic tile 250-A that is 80 columns wide and 18 rows high. When the page is transmitted to the client site for the first time in response to a page request by a user, it may be sent using eighteen messages, one for each display row. Each message will include a header identifying the page or record number of the source display information, the row number, and the starting column number of the following message, and up to 80 columns of character data. Each message corresponds to a single row and is about 100 characters (one byte per character) in length. Thus, for an 18 row display, the total page requires 1800 characters to be transmitted over the telephone line. At 180 characters per second, it takes about ten seconds to "paint" the screen for the first time.

When an information change occurs, the information vendor updates the page by sending only the new information. When one character changes, for example, a single message is sent having control information (in brackets) and the new data as follows:

[{PAGE NO}{ROW}{STARTING COLUMN}] DATA [{P16251}{R0}{C13}]1.

Thus, most update messages only represent one or two new data characters to be displayed on the video screen to be displayed on the video screen accompanied by about ten information control "characters" for placing the data characters in the proper display locations. Further, when one fundamental data element changes it often causes a flurry of very small individual messages to update other rows or columns.

With the foregoing in mind, and referring to FIGS. 14A and 14B, if the original portion $T_4^*$ is defined as an alphamosaic tile 250-A, then, without tile messaging and according to the prior art, receiving a new headline would require transmitting a total of nineteen messages (about 1900 characters); seven messages to composite page 200$a$ and twelve messages to composite page 200$b$. Seven of the messages transmitted to composite page 200B would be identical to those transmitted to composite 200$a$ except that the row display location would be different to reflect the fact that the headline information is displayed higher on composite page 200b than on composite page 200a.

However, with tile messaging, receiving a new headline would require transmitting a total of one message (under one thousand characters). Both composite pages 200a and 200b would receive the same tile message, e.g., $T_4'$, and use cell wrapping and the user-defined tile location offsets and display coordinates to display properly the information on the respective composite pages 200a and 200b.

If the original portion $T_4^*$ was defined as a scrolling alphamosaic tile 250-S, then using tile messaging would have resulted in both composite pages 200a and 200b being properly redrawn by only one DV bus message of less than one hundred characters. This represents a nineteen times reduction in DV bus message traffic for this simple case. The improvement is even more pronounced when more tiles and composite pages are involved.

The third embodiment of the invention preferably employs tile messaging of update data using a symbolic signaling technique, which will now be described with reference to FIGS. 11A, 11B, 11C, 11D, 12A, 12B, and 12C. FIG. 11A illustrates a transmission technique similar to that discussed above with reference to FIGS. 3A-3E. However, for the purposes of clarity, no synchronization signals are shown, and only a single row and single column transmission are shown. The tile row and column starting and ending locations will be transmitted in the manner described elsewhere.

FIGS. 11A-11C and 12A-12C illustrates message types for alternative techniques of customizing and displaying composite pages 200 of display information and updating the display information for particular users. With specific reference to a FIG. 11A, one technique uses an enable reception message 100 and data enable sequences 102, 103 and 104 at time $t_1$ and data enable sequences 112, 113 and 114 at time $t_2$. The enable reception message 100 is shown as being comprised of display identification (DID) code 120-reception key (RK) code 106 pairs, in this case, three code pairs DID1/RK1, DID2/RK2 and DID3/RK3. The reception key 106 is used to authorize the decoder to retrieve update data for a portion of display information having an IID code that is the same as the reception key. Thus, a decoder video screen 317 having the DID 120 of ID1 is authorized to receive information for reception key 106a RK1, the decoder video screen 317b with DID 120b of ID2 is authorized to display display information for reception key 106b of RK2, and so on. It should be understood that, although the RK's 106 and DID's 120 are illustrated as alphanumeric characters RKn and IDn (n being an integer) in practice it is preferred that they be multibit, e.g., 21 or 24 bits, code words that encrypt the actual source of display information. This is so that an unauthorized user cannot identify and retrieve a certain display information by tapping into the DV bus.

Following the enable reception message 100, at time $t_1$ three separate data enable sequences 102-104 are illustrated, each of which is comprised of a reception key 106, row and column display location information 108, followed by data 110. Although the data 110 is shown as directly following the reception key 106 and row and column information 108, it can be transmitted on a separate line, immediately following the data enabling sequence.

For the purposes of this example, the information displayed on the respective portions of display information having IID codes RK1-RK3 can be different, but each contains at least one common information field of data 110, which is represented by "DATA1" relating to a 30-year U.S. Treasury bond. By transmitting the information field data 110 with the foregoing data enable sequences 102, 103 and 104 for the three reception keys 106, namely RKs 106a-106b of RK1-RK3, the three different video screens 317a, 317b and 317c, having corresponding DIDs 120a-120c of DID1-DID3, can display the same information field 110 in different locations as illustrated by boxes 111a, 111b and 111c in FIGS. 12A-12C respectively, using display coordinates 108a-108c.

For example, the data enable sequence 102 places the data 110 in the upper left hand corner represented by display coordinates 108a (ROW1,COL1) of video screen 317a (box 111a) having the DID 120a of DID1, which was enabled with reception key 106a of RK1. In a similar manner, sequence 103 places the information field 110 near the center of video screen 317b (box 111b) having the DID 120b DID2, represented by the display coordinates 108b (ROW10,COL40), which was enabled with reception key 120b of RK2. Sequence 104 places the information field data 110 toward the lower right hand corner of video screen 317c (box 111c) having the DID 120c of DID3, represented by the display coordinates 108c (ROW3,COL3) which was enabled with the reception key 106c of RK3.

Thus, the information field data 110 is transmitted by three separate tile messages 102, 103 and 104 at a time $t_1$ such that each tile has a different offset relative to the upper left corner of the underlying tile 350. In order to customize the information displayed on various displays, separate tiles must be transmitted to each video display 317. When it is necessary to update the display information for information field data 110 during time interval $t_2$, again three tiles, e.g., illustrated as data enable sequences 112-114, must be transmitted, each having the appropriate reception key 106, row and column 108, and the new display information for information field data 110, e.g., DATA2, as shown in FIG. 11A.

The application of symbolic signaling is based on the realization that the traders of financial instruments prefer to select the display information they use to formulate their trades, and that some of that display information will be the same as that used by other traders, and some information will be different. It also is based on the realization that the traders do not necessarily want to view all of the information provided by a commercial information vendor and prefer to customize their video screens to satisfy their desires.

Accordingly, the customization of the information displayed on multiple decoder video screens is greatly facilitated, and at the same time, the overhead required to update information commonly used is greatly reduced, according to the present invention, in the following manners. Referring to FIG. 11B, one aspect of the present invention provides for using enable reception and initialization messages 116-118 and data enable sequences 128 at time $t_1$ and 134 at time $t_2$. Each enable reception and initialization message 116-118 respectively includes a DID code 120 for a video screen, an IID code which, in this instance, is used as a secondary reception key (SRK) 122, in this case "LONGBOND", and display coordinate information 108, e.g., row R and column C. The display coordinate information 108 row R and column C will place the data 110 associated with the secondary reception key 122 in the designated display location only for the video screen identified in the DID/SRK set. The term "secondary reception key" is a reception key that is associated with another reception key such that a decoder must be enabled with the other first or primary reception key before it can be enabled by a secondary reception key. The other reception key also may be a secondary reception key associated with yet another first or primary reception key as explained below.

Thus, each enable reception and initialization message both enables a video screen to receive and display certain data and initializes the relative display location of that data on that video screen, even though no data has been sent. Importantly, this permits each user to select the display location on the user's video screen to display the data corresponding to the secondary reception key SRK independently of the other users so that only the particular secondary reception key and the corresponding data need be sent to effect the correct display. Again, the use of LONGBOND as an IID code and an SRK is for illustrative purposes and in practice an encrypted multibit bit code word would be used as the SRK.

Figure 12A:
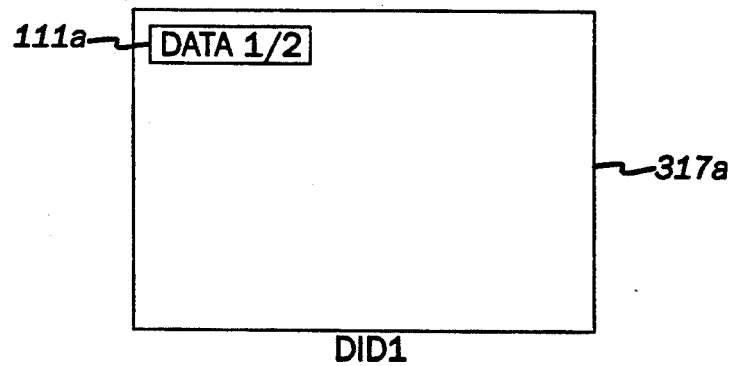
FIGS. 12A, 12B and 12C illustrate the displays produced through the message sequences shown in FIGS. 11A, 11B and 11C, as described above.
Figure 12B:
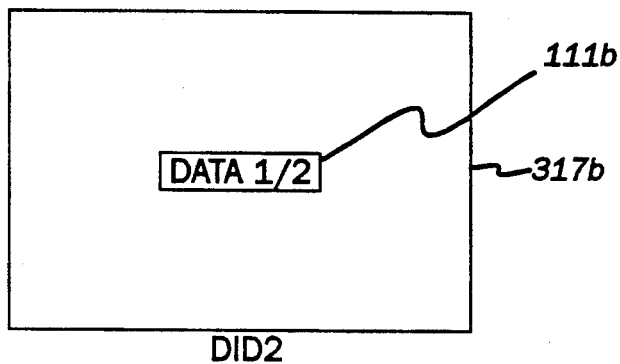
Figure 12C:
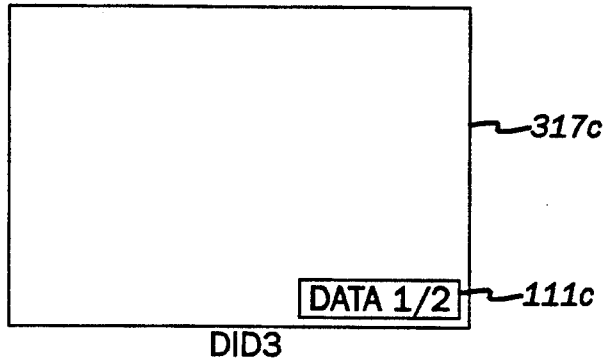

Thus, using enable reception and initialization messages 116–118, video screen 317a having the DID 120a of DID1 is enabled in this example, e.g., at the beginning of the day, with SRK 122 LONGBOND and will display the subsequently transmitted data 110 information starting at display coordinates 108a (ROW1,COL1). Similarly, video screen 317b having the DID 120b of DID2 is enabled with the SRK 122 LONGBOND and to receive and display the data 110 information at its selected display coordinates 108b (ROW10,COL10). Video screen 317c having the DID 120c of DID3 will likewise place the data 110 information at its selected display coordinates 108c (ROW20,COL60). Then, at time t$_1$ a single tile data message 128 is transmitted comprising the SRK 122 LONGBOND and the display information data 110, shown as DATA1. Upon receiving the tile data message 128, decoder video screen 317a will recognize the SRK 122 LONGBOND as matching its previously enabled SRK 122 and place the data 110 DATA1 in the designated location according to the previously initialized display coordinates 108a, i.e., the upper left hand corner (ROW1,COL1) box 111a as shown in FIG. 12A; video screen 317b will likewise display the data 110 DATA1 of message 128 in its center (ROW10,COL40) box 111b, and video screen 317c will similarly display the data 110 DATA1 of message 128 in its lower right hand corner (ROW20,COL60) box 111c. When it is necessary to update the display information at time t$_2$, a single tile data message 134, is transmitted, comprising the SRK 122 LONGBOND and the data 110 DATA2 to update the video screen. This data 110 is then displayed in the proper location of each video screen 317, in the same manner, to update the display.

Figure 11C:
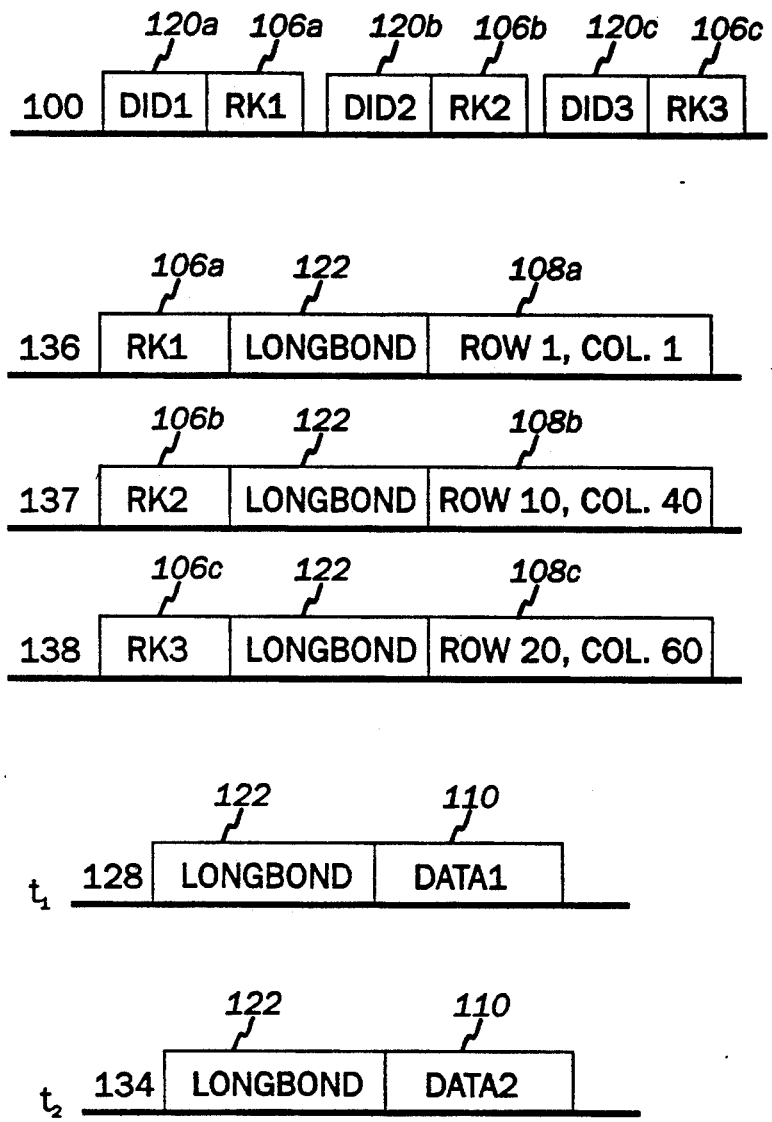

Referring now to FIG. 11C, another aspect of the invention concerns using three types of messages to display and update information, enable reception messages 100, initialization messages 136, 137 and 138, and data enable sequences 128 and 134. The enable reception messages 100 are used in the same manner and for the same purpose as described above in connection with FIG. 11A. Then, once a decoder is enabled with a reception key 106, the enabled decoder is initialized with a secondary reception key SRK 122 for that enabled reception key 106, and display coordinates 108 for displaying the subsequently transmitted data 110 in the selected display location 111 on a video screen 317. Thus, each initialization message 136, 137 and 138 includes a first IID code corresponding to a previously received reception key 106, a second IID code which is used as a secondary reception key (SRK) 122 (in this case LONGBOND), and display coordinate information 108, e.g., row and column or offset display information, which may be unique for each video screen 317. Then, at times t$_1$ and t$_2$, the data messages 128 and 132 described above in connection with FIG. 11B are transmitted, having the SRK codes 122 LONGBOND, which will be received by the enabled and initialized decoders, and the data 110 for display at the indicated display locations 111a, 111b and 111c on the respective video screens 317a, 317b and 317c.

The initializing messages 136, 137 and 138 are not enabling reception messages 100. Thus, if the decoder is not first enabled with the reception key 106 by an enable reception message 100, it will not retrieve the secondary reception key 122 by an initialization message and will not retrieve the data 110 from a data enable sequence of the type 128 and 134 data message.

A comparison of the information that must be transmitted using the scheme of FIG. 11A, at time t$_2$, with that of FIGS. 11B or 11C at time t$_2$ readily demonstrates the reduction in message transmission overhead produced using either symbolic signaling scheme in accordance with this form of the present invention. Also, the techniques illustrated in FIGS. 11B and 11C enhance the flexibility for producing user-customized displays in accordance with particular client requests while reducing the volume of data enable sequences to display and update display information.

In this regard, the user who is enabled with a reception key may select locally a new location for a tile of display information selected from the enabled display information. To do so, the user would select the tile using the keyboard 319 or a mouse 319', and define an offset of the selected information by moving the tile to its new display location on the video screen, relative to either the origin of the underlying source portion of the display information or to the origin of the default tile location. This new tile position information is communicated over control bus 318 to host CPU 425 (see FIG. 11) which may generate a new initialization message with the SRK for the tile (i.e., an information identification code) and new display coordinates. Thereafter, any update data for that tile will be mapped from the position of the update data relative to the default origin onto the user-defined tile and displayed (to the extent the update data occurs in the user-defined tile).

The user may relocate the tile to a different position on the display screen. This change also will be either followed by an initialization message so that any update data falling within the first defined tile is mapped into the new display location, which remains the same with respect to the display location relative to the original page or is remembered so that any update data falling within the first defined tile is mapped into the new display location by the decoder, e.g., by adjusting the display coordinates as the update data are stored.

The use of secondary reception keys provides a convenient technique to minimize message overload. Moving a tile defined by an enabled secondary reception key and initial (or default) display coordinates, has the effect of changing the display coordinates so that the data corresponding to the secondary reception key will be mapped into the tile in its new location. Thus, the user may easily customize the provided data for commonly used data by using secondary reception keys and initializing the display coordinated for the display information.

Figure 11D:
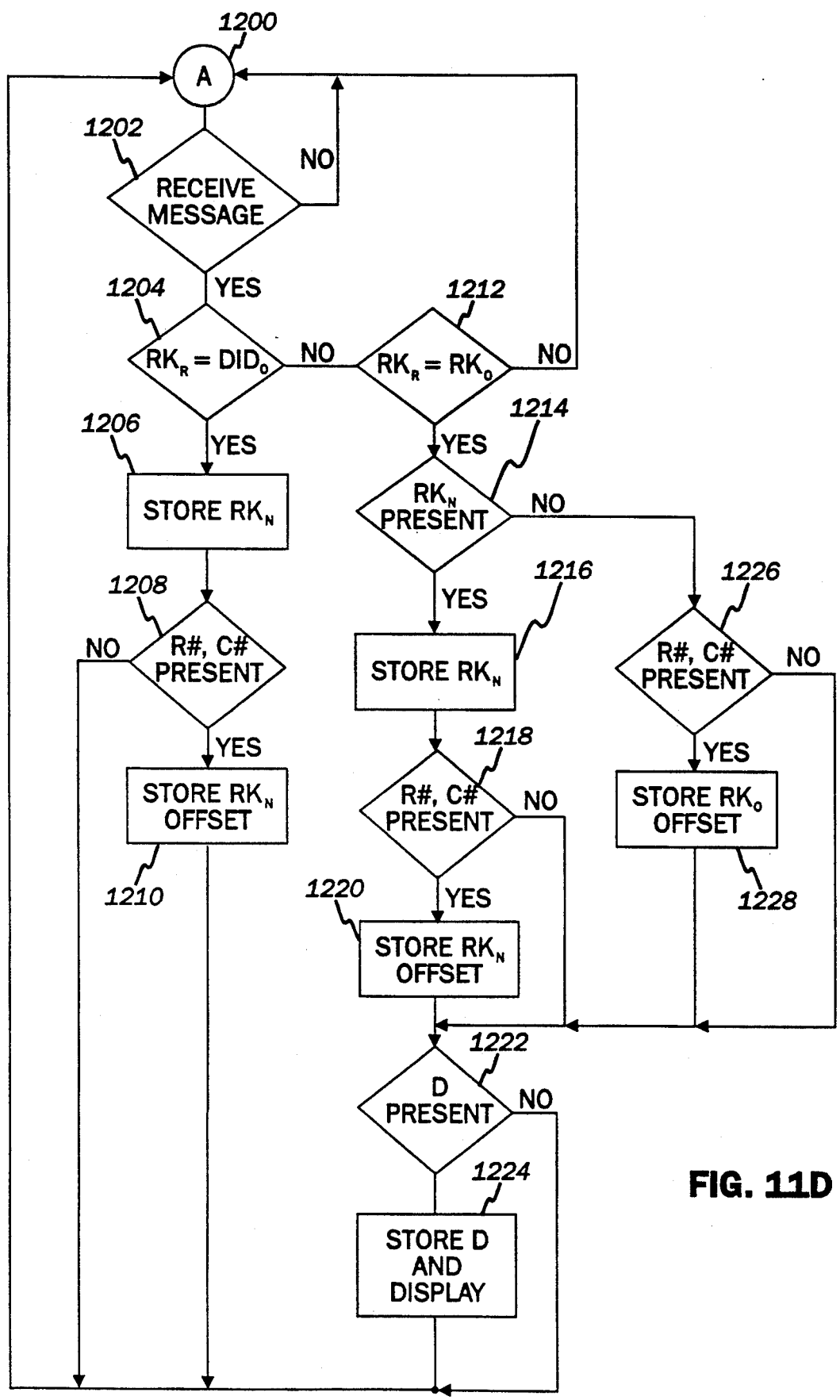
FIG. 11D is a flow chart for processing messages using symbolic signaling according to one embodiment of the present invention.

Referring now to FIG. 11D, an embodiment of a decoder 316 employing symbolic signaling operates in the following manner. The following definitions are used. DID is a unique decoder identification code; $DID_R$ is a DID code in a message received by a given decoder; $DID_O$ is the unique DID code stored in a given decoder; RK is a reception key; $RK_R$ is the first reception key in a message received by a decoder; $RK_N$ is a reception key in a message received by a decoder that was not previously stored in the decoder; $RK_O$ is a reception key that was previously stored in the decoder; R# is a start row number; C# is a start column number; and D is a string of data to be displayed.

There are at least seven types of messages, wherein the brackets contain the identified fields of the message as follows:

Enable Reception Messages
[DID, $RK_N$]
[DID, $RK_N$, R#, C#]
Initialization Messages
[$RK_O$, R#, C#]
[$RK_O$, $RK_N$]
[$RK_O$, $RK_N$, R#, C#]
Data Enable Sequence
[$RK_O$, D]
[$RK_O$, R#, C#, D]

The enable reception message that associates a DID and an $RK_N$ provides the decoder having a $DID_O$ matching the $DID_R$ code in the message with a new reception key $RK_N$, which is stored and thus becomes an $RK_O$ as to subsequent messages. The decoder may store one or more $RK_O$s at any given time.

The enable reception message that associates a DID, an $RK_N$ and an R# and C# provides the decoder having a $DID_O$ matching the $DID_R$ in the message with a new reception key $RK_N$ and display coordinate information (R#, C#) for that $RK_N$. The display coordinates are relative to the video screen origin (on the underlying tile). The decoder can store many different $RK_O$s and their corresponding display coordinates intended for display on any particular video screen. Each enable reception message will be ignored by any decoder not having a $DID_O$ matching the $DID_R$ in the received message.

The initialization message that associates an $RK_O$ and display coordinate information R# and C# will provide the new display coordinate information for the already stored reception key $RK_O$ for each decoder that was previously enabled with that reception key $RK_O$. The display coordinate information defines the offset of $RK_O$ relative to the video screen origin (on the underlying tile).

The initialization message that associates an $RK_O$ and an $RK_N$ will enable each decoder that was previously enabled with $RK_O$ with an additional new reception key $RK_N$ in the received message for the same portion of display information.

The initialization message that associates an $RK_O$, $RK_N$ and R# and C# enables each decoder previously enabled with reception key $RK_O$ with an additional new reception key $RK_N$ and display coordinate information (R#, C#). The display coordinate information defines an offset for the reception key $RK_N$ relative to the video screen origin (on the underlying tile).

Each initialization message will be ignored by a decoder that was not previously enabled with the reception key ($RK_O$) that matches the reception key $RK_R$ in the received message.

The data enable sequence that associates an $RK_O$ and data D is provided to each decoder and the data is retrieved by each decoder that was previously enabled with the identified $RK_O$ and is ignored by the other decoders. If no display coordinate information R#, C# has been stored in the decoder for the identified reception key $RK_O$ in the received message, then the decoder will store and display the data D without an offset relative to the stored origin of the tile corresponding to $RK_O$; when there is associated display coordinate information stored it will be used.

The data enable sequence that associates an $RK_O$, data D to be updated and display coordinate information R#, C# is provided to each decoder and is retrieved by each decoder that was previously enabled with the identified $RK_O$ and is ignored by the other decoders. The data D is stored and 35 displayed using the provided display offset information (R#, C#). Thus, the data is displayed at a location offset by R# and C# relative to either the video screen origin (if no previous $RK_O$ offset was stored in the decoder) or the data is displayed offset by R# and C# relative to the previously stored offset of $RK_O$.

Referring still to FIG. 11D, a flow chart for symbolic signaling, from the perspective of messages received at the decoder, will now be discussed. The processing routine is entered at node 1200, and it passes to step 1202, which tests for a received message. When no message is received, the decoder system returns to node 1200 and waits for a message. When a message is received, the routine proceeds to step 1204 where the message is evaluated first to determine if the first reception key $RK_R$ in the message is a received code $DID_R$ that matches the unique $DID_O$ (typically a code stored in a ROM device in the decoder). Upon a match the system moves to step 1206 where the second received reception key $RK_R$ in that message is considered a new reception key $RK_N$ and is stored in the decoder. That $RK_N$ thus becomes a stored reception key $RK_O$ as to any subsequently received message.

Following storage of a reception key at step 1206, the routine advances to step 1208, which determines whether the message contains row R# and column C# information associated with the received and just stored reception key. If offset information is present, the associated display coordinate information R#, C# is stored in step 1210, and defines the offset for that received and stored reception key $RK_N$. The offset is defined relative to the origin of the underlying tile. Following storage of the information, the system returns to node 1200 for the next message. If there is no display coordinate information in the message, then the system returns to node 1200 for the next message.

If at step 1204 it is determined that the first reception key $RK_R$ in the message does not match the $DID_O$ code, then the routine moves to step 1212 and the message is evaluated to determine whether the first received reception key $RK_R$ matches a previously stored reception key $RK_O$ for the decoder. If it does not, then the routine returns to node 1200 and waits for the next message. If it does, then the routine proceeds to step 1214 where the message is evaluated to determine if it also contains a new second reception key $RK_N$.

If a new reception key $RK_N$ is present, then the routine proceeds to step 1216 and the new second reception key $RK_N$ is stored, and thus becomes a stored reception key $RK_O$ as to any subsequently received message. After storage of a new reception key, the routine next proceeds to step 1218 where the message is evaluated to determine if it contains display coordinate information R#, C#.

If new display coordinate information R#, C# is present at step 1218, the offset location information for $RK_N$ is stored at step 1220. If the message does not contain a new reception key $RK_N$ as determined at step 1214, then the routine passes to step 1226 where the message is evaluated to determine if new display coordinate information R#, C# is present. If it is, it is stored at step 1228 to define the offset for the data associated with the reception key $RK_O$.

If the message does not contain display coordinate information, or after any such information is stored, the routine passes to step 1222 where the message is evaluated to determine if any data is present. If no data D is present, then the routine returns to node 1200 and waits for another message. If data D is present, then it is stored and displayed using the display coordinate information most recently associated with the stored reception key $RK_O$ matching the received reception key $RK_N$ in the message at step 1212. Thereafter, the routine returns to node 1200 and waits for the next message.

It is noted that the symbolic signaling routine may be combined with the nonsymbolic signaling techniques described above. It also is noted that other enabling, initialization and data messages and complementary messages for disabling reception and/or removing reception keys and display coordinate information can be created, sent, and processed in a similar manner.

According to the present invention, the encoder stores a composite page 200 as a number of tile definitions and messages. This allows the system to store, transmit, and/or display information in an efficient manner using a technique referred to as cellular micrographics. Cellular micrographics is described with reference to FIG. 15, Tables I and II, and an illustrative cellular micrographics transmission algorithm, using two (one foreground/one background) colors per pixel wherein: all cells 210 in an alphamosaic tile 250-A are transmitted as extended ASCII characters, i.e., each character is represented by one byte of data and there is one character per cell 210; cells of a graphic tile 250-G are transmitted as one or more bits per pixel and, hence, multiple bytes of data per cell 210; graphic tiles 250-G may contain both graphic cells (multiple bytes of data per cell) and alphamosaic cells (a single byte of data per cell); and, for the sake of processing efficiency, each tile 250 (except video tiles 250-V) may run-length encode the signals (either horizontally or vertically) prior to transmission.

Figure 15:
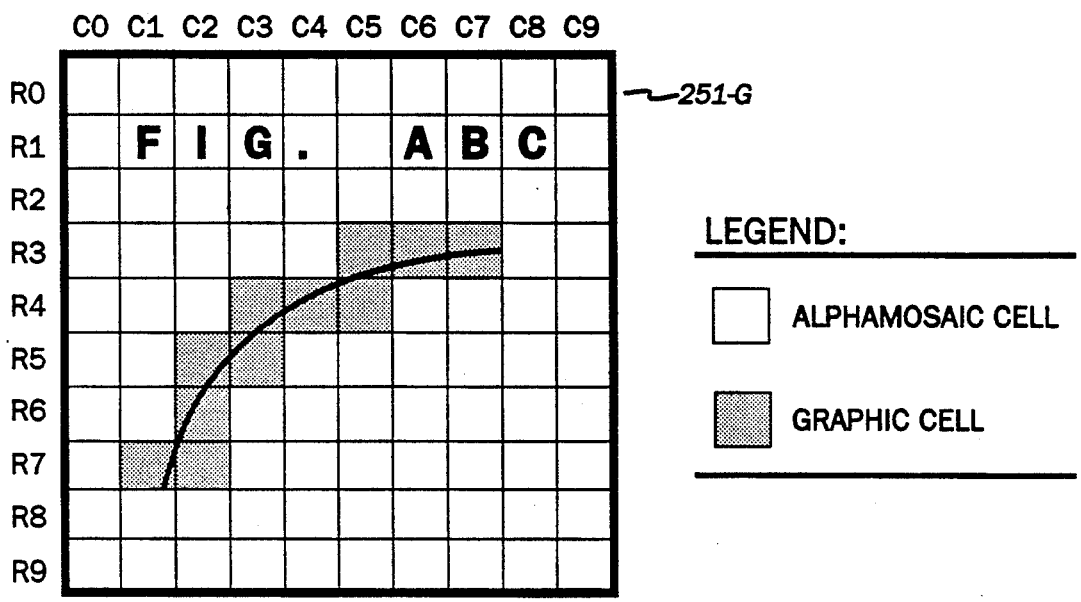
FIG. 15 is an illustration of graphic tile messaging with graphic a alphamosaic cells.

FIG. 15 shows a graphic tile 251-G that has ten cell rows and ten cell columns and is described in Table I, where b=blank character per cell, a=one ASCII character per cell, and p=pixel defined cell.

TABLE I

| Cell Row | Contents | Notation |
|---|---|---|
| R0 | 10 blank characters | 10b |
| R1 | 10 ASCII characters | 10a |
| R2 | 10 blank characters | 10b |

TABLE I-continued

| Cell Row | Contents | Notation |
|---|---|---|
| R3 | 5 blank characters, 3 pixel defined cells, 2 blanks characters | 5b,3p,2b |
| R4 | 3 blank characters, 3 pixel defined cells, 4 blanks characters | 3b,3p,4b |
| R5 | 2 blank characters, 2 pixel defined cells, 6 blank characters | 2b,2p,6b |
| R6 | 2 blank characters, 1 pixel defined cell, 7 blank characters | 2b,1p,7b |
| R7 | 1 blank character, 2 pixel defined cells, 7 blank characters | 1b,20,7b |
| R8 | 10 blank characters | 10b |
| R9 | 10 blank characters | 10b |

Because the cellular micrographic algorithm preferably uses run length encoding and cell wrapping within the tile 251-G, the tile 251-G can be completely defined by the messages described in Table II. The calculations in Table II assume that single-bit-per-pixel signaling is being used and that each pixel-defined cell 210 is individually specified by 16 bytes of data (sixteen rows of eight columns of single bit values).

TABLE II

| Message number | Representing | Length | [in bytes] |
|---|---|---|---|
| 1 | 11b | 1 | [1] |
| 2 | 8a | 9 | [1 + 8] |
| 3 | 16b | 1 | [1] |
| 4 | 3p | 49 | [1 + 3(16)] |
| 5 | 5b | 1 | [1] |
| 6 | 3p | 49 | [1 + 3(16)] |
| 7 | 6b | 1 | [1] |
| 8 | 2p | 33 | [1 + 2(16)] |
| 9 | 8b | 1 | [1] |
| 10 | 1p | 17 | [1 + 1(16)] |
| 11 | 8b | 1 | [1] |
| 12 | 2p | 33 | [1 + 2(16)] |
| 13 | 27b | 2 | [1 + 1] |
| TOTALS: | 100 cells | 198 bytes | |

Thus, by using the cellular micrographics technique of the present invention, the amount of required transmitted data to display the tile 251-G is reduced by a factor of approximately eight from 1,600 bytes to 198 bytes. The 1,600 bytes is based on 16 bytes per cell and 100 cells.

The 198 bytes represent 13 control bytes, 8 ASCII characters, 11 pixel cells (16 bytes each), and 1 blank, or:

$$13+8+11(16)+1=198$$

Still greater efficiencies may be accomplished by using run length encoding within pixel defined cells.

Referring to FIGS. 11, 16, and 25-27, a DV bus signal structure and signaling method, between the encoder 312 and a plurality of decoders 316 and/or desk interface units 321, in accordance with a preferred embodiment of the invention, is shown. The encoder 312 includes a receiver 510 for receiving input messages from a host central processing unit (CPU) 425 and a residual video converter (RVC) 400. These messages are then applied to an error detection and correction (EDAC) circuit 520, which adds parity and interleaving to protect against both single and burst errors. The output of the EDAC circuit 520 is passed to modulation circuit 530, which functions to increase the data throughput rate and facilitate subsequent signal processing and clock recovery in each decoder. References to a decoder should be understood to include desk interface units 321 where the context permits.

Modulation circuit 530 converts the binary digital data into a quad level (8,9) modulated signal, as described below. The output of the modulation circuit 530 is passed to the multiplexor (MUX) circuit 540 which switches between, on the one hand, the digital data from CPU 425 and video data from RVC 400 and on the other hand time-compressed television signals which are received from television feed converter (TFC) 450. MUX circuit 540 drives the output of encoder 312 onto DV bus 314.

Each decoder 316 (only one is discussed for the sake of convenience) includes an analog front-end signal processor (AFESP) circuit 610, which receives the DV bus signals, recovers a clock signal from the modulated signal and establishes detection thresholds for processing the quad level DV bus signals. The output of AFESP circuit 610 is passed to demultiplexor (DEMUX) circuit 620, which demultiplexes the television signals and the digital-video signals, such that each may be further processed and provided to video screen 317. DEMUX circuit 620 passes the digital-video signals to demodulator circuit 630 which converts the quad level (8,9) modulated signals into binary signals.

The output of demodulator circuit 630 is passed to error detection and correction (EDAC) circuitry 640, which uses and then removes the parity bits to output digital signals that correspond to the signals input to encoder EDAC circuit 520 as a best estimate of the intended message. The message is then transmitted to circuit 650, which checks the syntax of the message and stores the display information in the designated address locations of a picture store memory.

The television signals separated from the DV bus message by DEMUX circuit 620 are separately passed to circuit 670 which converts the compressed television signal into displayable television image signals, and then provides those image signals to switch 680. Switch 680 selects between passing the television image signals and the digital display information to video screen 317.

Figure 17:
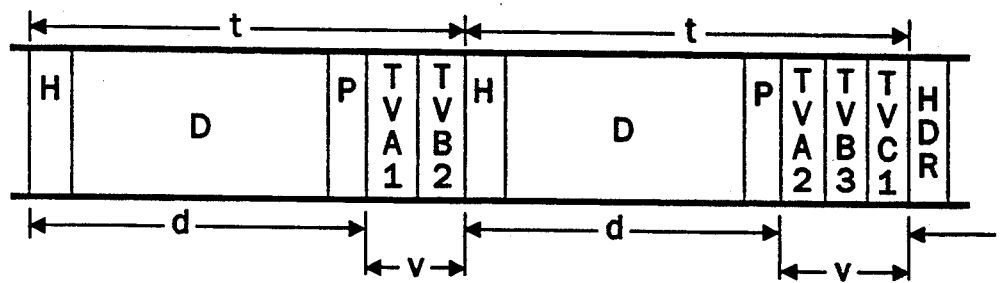
FIG. 17 is a diagram of a DV bus message stream over two successive video signal time periods.

As illustrated in FIG. 17, signals transmitted on DV bus 314 are transmitted in packets t. If no television signals are to be transmitted on the system, the packet t may have a time length that is variable, according to the amount of data in each message. If television signals are to be transmitted, then the packet t has a fixed and uniform time length corresponding to time length of the television standard video scan line. Thus, for NTSC television, the packet t time block is about 63.5 microseconds.

Each packet t includes a digital display information packet d including a header portion H, a data portion D and a parity portion P. The header H contains information that allows each decoder 316 to identify the beginning of a packet t, and to detect digital signal transitions to compensate for the transmission loss characteristics of the communication channel. The parity bits P are collectively illustrated as following the data D in FIG. 17, but in practice may be interspersed among the data D according to conventional parity and interleaving error detection and correction coding techniques.

The digital packets d carry all the display information except television signals. One or more digital packets d constitute a DV bus "message" used by each decoder 316 to modify the displayed screen image.

Each packet t also may include a television (signal) packet v, including one or more realtime television program signals illustrated as "TV". Signals for different television images are given different letters, such that TVA, TVB, and TVC represent three different television display images. The subscript numbers 1, 2, and 3, represent consecutive lines of a given television image field, such that signal $TVA_1$ is followed by $TVA_2$ in a following video packet v, thereby to provide the first and second lines of the odd line (or even line) field of television image TVA. As noted above in connection with FIG. 7A, the fields alternate odd and even video scan lines on the video screen, and two fields form a frame of video, e.g., about one-sixtieth of a second per field and one thirtieth of a second per frame. The television signals TV are preferably time-compressed and may be either an analog signal, for example, using multiplexed analog component (MAC) encoding, or a digital signal, for example, using digital compression methodology (e.g., JPEG, MPEG). In an embodiment where digital television signals are used, the video packet v may be omitted so that all the digital data is transmitted in the portion data D of a digital packet d, and processed as a tile of pixel based digital display information.

The digital packet d of each packet t may vary from one time length $t_n$ to the next $t_{n+1}$, depending on the amount of data D and television video information TV that is to be transmitted in each packet t. To reduce the amount of memory required in each decoder 316 that is equipped to receive a realtime television signal, it is useful to signal an amount of information necessary to generate about one TV scan line within the time period t of one TV line. With reference to FIG. 17, this means that the second TVB line $TVB_2$ must occur no later than 63.5 microseconds after the first TVB line $TVB_1$. This does not however, require that the consecutive TVB line signals be uniformly or periodically spaced.

Typically, DV bus messages are not sent to a decoder 316 faster than the decoder 316 can buffer and act upon them. Because the DV bus 314 is a simplex transmission channel, the encoder 312 must keep track of the messages being sent to each decoder 316 and the time required to execute each message. Subsequent messages are queued until all of the decoders 316 that have to receive and act upon a given message are able to do so.

Figure 16:
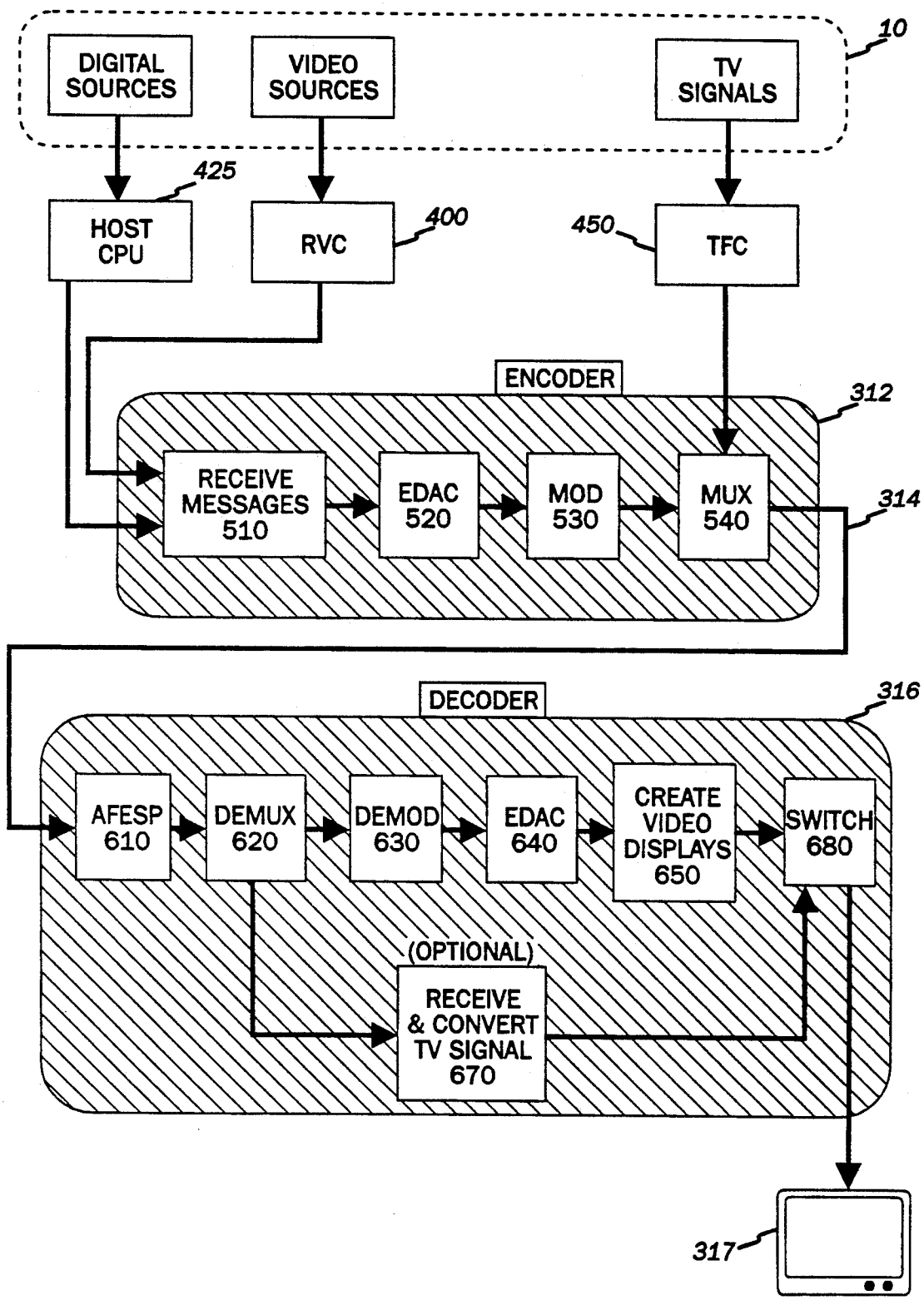
FIG. 16 is a block diagram of DV bus signaling for the embodiment of FIG. 11.
Figure 18:
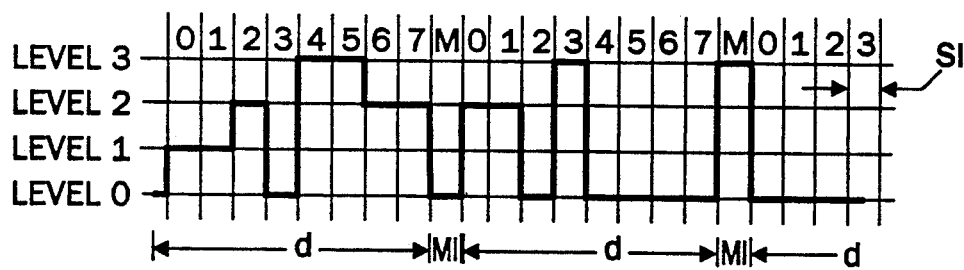
FIG. 18 is a diagram of a quad level (8,9) modulated signal for DV bus message.
Figure 19:
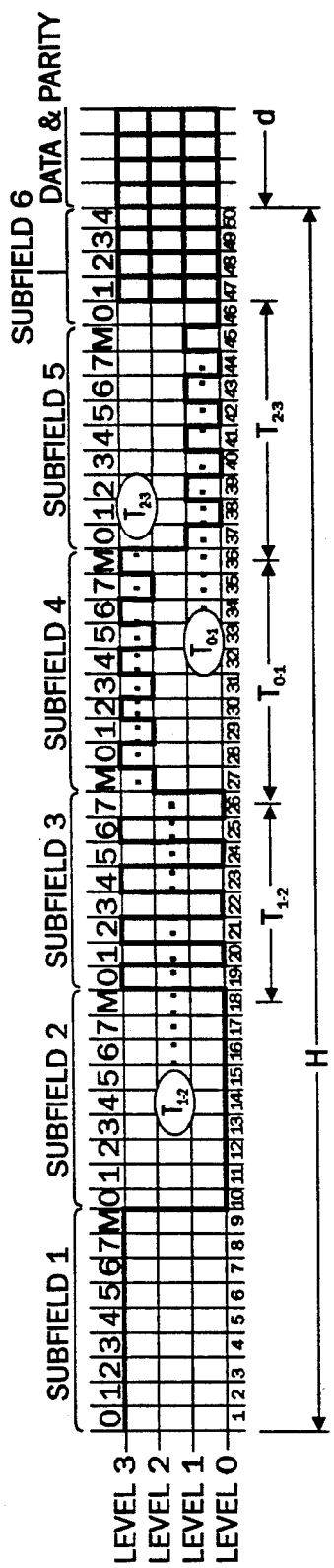
FIG. 19 a diagram of a header section of a digital message using the quad level (8,9) modulation.

Referring to FIGS. 16 and 18–19, modulation circuit 530 and demodulation circuit 630 are complementary for the selected modulation protocol. There are four considerations for selecting a signal modulation method: (1) clock recovery, (2) start of message identification, (3) information transmission rate, and (4) bit error rate. All decoders 316 must recover a digital clock from the received DV bus signal. Therefore, the transmitted DV bus signal must have an adequate number of digital transitions for this purpose, regardless of data D content. Further, the decoder 316 must be able to determine the start of the message in a reliable manner.

In the present invention, a quad level digital signal, transmitting two bits of information every signaling interval SI is used as a reasonable engineering trade-off between data throughput and bit error rate. Since each signaling interval SI carries exactly two bits of information, it is also referred to as a "dibit" interval. An (8,9) interval modulation method is implemented to transfer one word (16 bits) of demodulated data D to the decoder EDAC 640 at a time. The structure of this modulation method is illustrated in FIG. 18, wherein SI is the signaling interval and MI is the modulation interval. The rule for determining the signaling level of the modulation interval MI is to maximize the transition occurring at the leading edge of the modulation interval MI. That is, if the signal level in the signaling interval SI just before the modulation interval MI is level 2 or 3, then the modulation interval MI signal is set to level 0. If the signal level in the signaling interval SI just before the modulation interval MI is level 0 or 1, then the modulation interval MI signal is set to level 3.

Referring to FIG. 19, the header field H is 50 signaling intervals SI long and includes six subfields. These subfields provide information to each decoder for the decoder to recover the clock signal and compensate for the transmission characteristics of the DV bus 314 and any interconnections.

Subfield one has a length of 9 signaling intervals and contains eight dibits of the maximum value signal. This is followed by subfield two, which also is 9 signaling intervals long and which contains eight dibits of the minimum value signal. These two subfields intentionally violate the modulation rule and set the maximum and minimum input signal range to allow the decoder 316 to detect the start of a packet d and fine-tune its decision thresholds to compensate for attenuated received-signal levels, and may be used to signal the possibility of the beginning of a header field H. However, the start of a data decision will only be made after all six subfields are properly received.

Subfields three, four, and five each have a length of 8 signaling intervals and may be used to fine-tune decision thresholds to discriminate between signals at levels 1 and 2, $T_{1-2}$, levels 2 and 3, $T_{2-3}$, and levels 0 and 1, $T_{0-1}$, respectively. This is analogous to double-ended clamping of a binary digital signal.

Subfield six has a length of 8 signaling intervals SI and is used as a delay and clock run-in prior to the start of data field D. It is also used to specify the interleaving depth for Error Detection and Correction (EDAC) as explained next.

Referring to FIGS. 16 and 19, the encoder EDAC circuit 520 adds parity bits to the message. This permits the decoder 316 to detect and correct the errors that occur during signal transmission. Parity both increases the reliability of the messaging, as evidenced by a decreased bit error rate, at the expense of decreasing the message data throughput.

Development efforts indicated that an error detection (e.g., checksum) and replication correction method would likely be inadequate. It was discovered that system performance was improved by using a single error correcting and double error detecting code (e.g., Hamming) within a single level interleaving framework. While non-interleaved burst error correcting codes exist (e.g., Reed-Solomon), their implementation was believed to be more difficult in an ASIC environment in which the present invention is preferably implemented.

Figure 20:
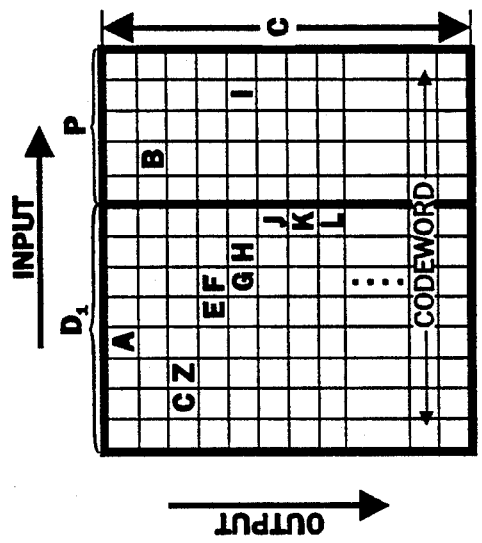
FIG. 20 is a diagram of a double buffered error detection and correction interleaving technique.

Referring to FIG. 20, digital data D to be transmitted is written bit by bit horizontally into a double buffer. When the first row of data is filled, data is written into the next row and the parity bits P corresponding to the data D in the first row are calculated according to the EDAC methodology rule selected. This process continues until the entire buffer is filled. The buffer is then locked to prevent further input, and transmitted to the modulator circuit 530 bit by bit vertically. The buffer may be reused after its entire contents have been transmitted; double buffering sustains continuous message output from the encoder 312.

Each buffer row includes both data D and parity P, and represents one codeword. Assuming that a single error correcting double error detecting code has been used, without interleaving the following errors illustrated in FIG. 20 have the results indicated in Table III:

TABLE III

| Error | Codeword errors | Action |
|---|---|---|
| A,J,K,L | Single in data field | Correctable |
| B | Single in parity field | Correctable |
| C,Z | Double in data field | Detectable, not correctable |
| E,F | Double | Detectable, not correctable |
| G,H,I | Triple | Not detectable, may not give error |

The nature of the digital video bus 314 is that errors occur in bursts. Apart from randomly-occurring single bit errors, the probability of a second error immediately following the first error is relatively high. For example, if the probability of a first error is $10^{-9}$, the probability of the next bit being in error is not $10^{-9}$ but might be 0.9, and the probability of the following bit being in error might be 0.8. Therefore, a single-correcting methodology is ineffective in this type of transmission channel. Interleaving, i.e., buffering the data to be messaged horizontally and transmitting it vertically, causes burst errors to be spread among several codewords. In this regard, a burst error J,K, and L of length three in the channel is mapped into three single codeword errors and this is correctable by the chosen error detection and correction scheme.

By choosing a large interleaving depth of n codewords, e.g., 32 codewords, it is possible to protect against relatively long burst errors with a relatively simple single error correcting code. For example, when using an interleaving depth n of 32, a burst error of up to 32 bits is fully correctable, all errors of length 33 to 64 are detectable, and all those with greater length could possibly result in errors. The occurrence of single bit errors plus burst errors will degrade the performance of the system in a manner determined by their location.

The maximum possible interleaving depth depends on both the maximum buffer size and the number of TV signals to be transmitted. This is because each time-compressed TV signal must occupy a time slot occurring once a line time, i.e., in successive packets t. Therefore, the maximum length of digital packet d is determined by both the television signal compression factor and the number of TV signals being transmitted simultaneously. Preferably, the interleaving depth n should be maximized within the time constraints imposed by the number of TV signals being transmitted. Thus, with reference to FIG. 7A, the possible interleaving depth n between lines U and W and between lines X and Y are the same, and is greater than the interleaving depth m between lines W and X and between lines Z and V. This is because the latter two series of DV bus signals also include TV lines for television signals TV2 and TV3. Accordingly, the interleaving depth n will change with the amount of television signals being transmitted.

Referring to FIGS. 21-23, a plurality of digital video bus messages are now described. The messages are controlled in two layers, a transport layer, for detecting and receiving data sent to a specific decoder 316, and a message layer, for executing application firmware or software. Processing is done by a custom Packet Reception Application-Specific Integrated Circuit (ASIC) including a microprocessor located in the receiver module 610 of the specific decoder 316. The ASIC module 610 may have any structural implementation so long as it performs the signal processing functions described and illustrated. Configuration of an ASIC is within the ability of a person of ordinary skill in the art.

Regarding the transport layer, referring to FIG. 21, the transmission of variable length packets d are concatenated to form complete messages in the presence of time multiplexed television signals (e.g., TVA and TVB), are shown. The message format is summarized in Table IV below:

TABLE IV

| Message (M) | Packet (t) | Interleaving Depth |
|---|---|---|
| 1 | 1 | D0 |
|   | 2 | D1 |
|   | 3 | D1 |
|   | 4 | D2 |
| 2 | 1 | D2 |
|   | 2 | D2 |
| 3 | 1 | D1 |
|   | 2 | D1 |
|   | 3 | D0 |
| 4 | 1 | D1 |
|   | 2 | D1 |
|   | 3 | D2 |

The interleaving depth is defined in terms of the total time of television signals present in the video packet v of a packet t. For example, the fourth packet t in message 1, designated M1-P4 in FIG. 21, has an interleaving depth of D2 corresponding to the time used by the two TV signals.

Referring to FIG. 22, the location of the digital packet d fields are illustrated. Field 0 contains a message header. Field 1 contains the end of message (EOM) flag which indicates that the current packet d is the last one in the current message when the EOM flag is set. This enables the hardware to process the reception keys contained in fields 2 and 3 of the packet d, to determine whether further processing of this packet d is required.

Fields 2 and 3 contain the reception key which is formed by the address type and address. More specifically, Field 2 contains the "address type" which is used to specify the meaning and use of the contents in the address (Field 3). In a preferred embodiment, the address type field contains two bits. A value of 00 indicates that the following address field contains a unique display identification code for a given a decoder video screen, i.e., a $DID_O$. If the address field value is 01, then the address field contains a new to be stored information identification code for a tile 250, i.e., an $RK_N$. If the address field is 10, then the address field contains a previously stored information identification code for a tile 250, i.e., an $RK_O$. If the address field value is 11, then the address field contains a packet sequence number (PSN), having a value of from 1 to 31, and the decoder 316 checks for sequential numbering of packets d within the message. An out-of-sequence number causes the entire message to be rejected.

Field 3 is the "address field" and may have up to 21 bits. Accordingly, there may be up to $2^{21} = 2,097,152$ different unique identification codes for each address type, i.e., video screens and pages, records, portions and tiles of display information.

Field 4 has sixteen bits and provides the "message length" which is only transmitted in the first packet d of a message. It indicates the total length of the message in bytes.

Field 5 contains the data D used to form the display information message. It has a variable bit length.

Regarding the message layer of the DV bus 314, there are two classes of messages that can be accommodated, supervisory messages and image data messages. Supervisory messages direct one or more decoders to perform control and/or bookkeeping actions, such as enabling a reception key or defining a tile. Image data messages refresh or update the contents of a displayed tile. Such messages always cause the decoder video screen 317 to update even if the display information is unchanged.

All received packets d are concatenated into messages at the decoder 316. The location of the received message fields is illustrated in FIG. 23. Field 0 is the reception key (RK) and contains 3 bytes. Bit 0 is set to 0, bits 1 & 2 contain address type and bits 3-23 contain the address (cf. FIG. 22). Field 1 contains the "message length"; it uses two bytes to specify the length of the message in bytes.

Field 2 is the "message sequence number" and is a one byte field. It contains a message sequence number for messages to the reception key RK specified in Field 0. The decoder 316 verifies that the difference between the current and last received message sequence number is always one modulo 256 to ensure that all messages to the current reception key RK are received in order. When an out of sequence number is detected, an error request is transmitted by the decoder 316 over the control bus 318 (See FIG. 11) indicating the last correctly received message.

Field 3 is the "Command" field, and has one byte which indicates the operation to be performed on the contents of the data in following Field 4, the variable length part of the message. A Command may be self acting, i.e., the data field contents immediately following is null. The byte length of the data in Field 4 is limited by the time length t of each message and the video signals v in each message.

In a preferred embodiment, the message Command field 3 has the following commands and data Field 4 has the following associated data: A message Command byte 0 initializes decoder hardware and clears the video screen. There is no associated data. A message Command byte 1 sets the parameters to configure the video screen hardware and software. Associated data bytes 0-7 contain the ON and OFF period for four blink counters, and data bytes 8-11 contain the motion period for four motion counters. A message Command byte 2 operates to clear the video screen, making all pixels the background color. There is no associated data. A message Command byte 3 operates enable reception. It instructs the uniquely identified decoder 316 to enable reception for the specified reception key, and associates this reception key with the request string for the specific tile 250 sent by the decoder 316 to the host CPU 425 via the control bus 318. For this message Command, the associated data is, for bytes 0-2, the tile reception key, and for bytes 3-23, the tile request string. A message Command byte sets the tile definition. It defines the tile 250 whose number is specified in the address Field 3. The first associated data byte specifies the default color index for the portion of display information. The second data byte specifies the default display attribute. The third data byte represents the number of symbolic tile definitions (the number of 11 byte packets following). Each of these definitions contains a 16 bit symbol number (tile IID or RK), the two corner display coordinates (upper left and lower right; a rectangular tile boundary is assumed), the default symbolic tile attributes and the value of the motion counter if the tile is a panning or scrolling tile. The associated data bytes are:

| | |
|---|---|
| byte 0 | default color index |
| byte 1 | default display attribute |
| byte 2-3 | default upper left row and column number |
| byte 4-5 | default lower right row and column number |
| byte 6 | tile motion attribute |
| byte 7 | current motion index |
| byte 8 | default character table |
| byte 9 | number of text messages composing the tile |
| byte 10 | current message sequence number(s) for tile messages 1 to n |

A message Command byte 5 sets the color table. It contains a number (specified in data byte 0) of definitions for the color table. Each definition contains four bytes. The first data byte is an index (0-255) into a color table. The three other data bytes represent background color, foreground color and line color respectively. Each of these three data bytes is encoded internally as IIRRGGBB: two bits to define the overall INTENSITY (I), two bits to define the RED (R) intensity, two bits for the GREEN (G) and two bits for the BLUE (B). The associated data bytes are:

| | |
|---|---|
| byte 0 | number of color definitions |
| byte 1 | new color index |
| byte 2-4 | background, foreground, line colors |
| byte 5-8 | next color definition (same as bytes 1-4) |
| byte 9-12 | next color definition (same as bytes 1-4) |

A message Command byte 6 operates to send new text to the video screen. The characters contained in the data section are put on the screen in contiguous columns or rows, depending on the axis of consecutiveness, using cell wrapping. The associated data bytes are:

| | |
|---|---|
| byte 0 | message id (Tile-relative) |
| byte 1 | message sequence number |
| byte 2 | relative row number |
| byte 3 | relative column number |
| byte 4 | number of data bytes following |
| byte 5 ... | data in TEXT format |

A message Command byte 7 provides for downloading programming code into the decoder 316 application program memory. The associated data bytes are:

| | |
|---|---|
| byte 0 | program revision code |
| byte 1-4 | section address |
| byte 5 | last section flag |
| byte 6 ... | program code |

A message Command byte 8 clears a tile. It causes all pixels in the tile to be set to the default background color. There is no associated data. A message Command byte 9 is a "Genlock", which is functionally equivalent to a vertical sync pulse in a video signal. There is no associated data. A message Command byte 10 is to define a character set. It downloads a pixel map for a character set for converting a one character byte to a multibyte pixel representation. The associated data bytes are:

| | |
|---|---|
| byte 0 | Character table ID |
| byte 1 | Starting character code |
| byte 2 | Number of codes defined |
| byte 3 ... | Bit map definitions (16 bytes each) |

When a tile 250 is defined in the encoder 312, a static array of messages is allocated to, and associated with, that tile 250. All messages in the encoder 312 are kept in a queue and are sent out, in their entirety, in a message cycle whose period varies according to system scheduling constraints.

The system is preferably tuned to optimize message scheduling for its particular mix of static alphamosaic tiles 250-A, graphic tiles 350-G, motion tiles 350-P, 350-S, RVC tiles 350-V, TFC "tiles" 350-V, and the number of decoders and video screens. One suitable message prioritizing schedule is the following order: individual decoder directed messages, scheduled messages (tile motion control), tile update data messages, decoder re-requested tile update messages, alphamosaic refresh messages, administrative messages, and graphics refresh messages.

The message layer protocol supports three kinds of attributes for cells 210: motion, cell and color. The motion attribute is an eight bit word that is encoded MOV, C1, C0, V, NU, NU, NU, NU, where MOV, C1, C0, V are movement, movement control byte 1, movement control byte 0, video and NU stands for unused bits. The cell attribute is an eight bit word and it combines both software and hardware attributes. The byte is encoded REV, ULIN, NU, NU BR1, BR0 BE1, BE0 where BR1, BR0, BE1, BE0 are blink rate 1, blink rate 0, blink effect 1, blink effect 0, REV stands for reverse video and ULIN stands for underline. These last two attributes are implemented in software and therefore need not reside in the character cell. The color attribute is an index into the color table.

The message layer protocol uses a byte oriented TEXT format to specify control, alphanumeric text, and graphics. The lowest nine bytes are control bytes and have the following special meanings: Byte 0 specifies that the next byte will contain a repetition factor for run length encoding to specify how many times the cell definition that follows should be repeated along the axis of consecutiveness. Byte 1 specifies that the next 2 bytes will contain the relative row and column number applicable to the following text. Byte 2 specifies that the next 16 bytes define a graphic cell to be put in current location. Byte 3 specifies that the next byte is to become the current cell attribute, meaning that it will apply to every subsequent cell defined in the message. Byte 4 specifies that the next byte contains the size of the cell specifications to come. The sizes allowed are 0 for normal size, 1 for double size, 2 for triple size and 3 for quadruple size. Byte 5 specifies that the next byte is to become the current color index, meaning that it will apply to every subsequent cell defined in the message. It is not used for graphic cells. Byte 6 specifies that the following cell specifications should be put in consecutive locations horizontally. In other words, to define the address of the next cell, the current column number should be incremented. Byte 7 specifies that the following cell specifications should be put in consecutive locations vertically. In other words, to define the address of the next cell, the current row number should be incremented. Byte 8 specifies that the current cell location is not to be modified, e.g., if the cell contains a character that is defined on another line. For example, if the line 1 contains triple size characters, it also will use line 2 and 3 to display such characters. Therefore, all characters on line 2 and 3 will be "phantom characters." Byte 9 specifies that the next byte identifies the character table from which the following characters will be drawn. The new character set remains in effect until another change character set command, or the end of message. Bytes OAH-OFH are not used and bytes 20H-FFH are normal cell representations. Printable ASCII character codes are preferably used wherever possible.

The following illustrates how the overall messaging efficiency and system throughput, in accordance with this third embodiment of the invention, may be calculated.

Consider a system in which signal bandwidth is 22.5 MHz, the packet time length t (including the header H) is 63.5 μs, the error detection and correction code is a 24/30 Hamming code, interleaving efficiency is 100%, modulation is quad level (8,9), and packet efficiency is 100%.

The signaling interval SI may be determined from the system bandwidth as follows:

a) the signal edge rise time ($t_r$) should be less than or equal to one-third of the signaling interval SI, and b) the bandwidth of the signal ($f_b$) is related to the signal edge rise time by:

$$(f_b)(t_r) = 0.35$$

Hence, the minimum signal interval corresponding to a 22.5 MHz bandwidth is:

$$SI_{min} = 3(t_r) = 1.05/(f_b) = 1.05/22.5 \text{ MHz} = 46.6 \text{ ns}.$$

The signaling interval is therefore chosen to be:

$$SI = 50 \text{ ns}.$$

Regarding information throughput, since quad level modulation is chosen, two bits are transported in every signaling interval. The capacity of the channel is therefore:

$$\text{Channel} = 2/SI = 2/50 \text{ ns} = 40.0 \text{ Mbits/sec} = 5.0 \text{ Mbytes/sec}.$$

This capacity is not actually attained because first, every packet starts with a 50 SI header, every ninth SI after the header contains no information ((8,9) modulation is used to aid clock recovery), and the EDAC circuits appends six parity bits to every twenty four data bits (a (24,30) Hamming code is used).

Second, each packet maximally lasts 63.5 μs. Thus, there can be a maximum of (63,500 ns/50 ns) = 1,270 SI per packet. The 50 SI header therefore reduces the capacity by a factor of (1270−50)/1,270 = 96.1%. The modulation efficiency is (8/9) = 88.8% and the EDAC efficiency is (24/30) = 80%. Therefore, the overall efficiency of the DV bus signaling is approximately = 0.961 × 0.888 × 0.800 = 68.27%. This results in an effective DV bus capacity of:

$$0.6827 \times 40 = 27.3 \text{ Mbits/sec} = 3.4 \text{ MBytes/sec}.$$

In practice the DV bus 314 should be transporting information at a rate of about 20 Mbits/sec or more, which is more than twenty (20×) times that of conventional Ethernet systems. It should be noted that Ethernet has a 10 Mbits/sec capacity of which perhaps only 1 Mbits/sec is realized after protocol and/or error processing.

Referring now to FIGS. 11 and 26, control bus 318 controls bi-directional communication between a decoder 316 (or a desk interface unit 321) and the system. Host CPU 425 may issue messages targeted to a specific decoder or to all decoders, or may request information from a specific decoder. A decoder will send a message to the host CPU 425 when requested by the host CPU 425.

Typical uses of the control bus 318 from the host CPU 425 to decoders 316 are to poll a decoder 316 for a message, install a new decoder 316 on the system, update an LED display of a keyboard 319 at a decoder 316 and maintain the control bus protocol. Typical uses of the control bus 318 from the decoder 316 to host CPU 425 are to transmit keyboard and/or mouse data (i.e., user requests for display information, or to define or move tiles), report decoder malfunctions, and request system resources, e.g., DV bus 314 message retransmission due to a detected error in message sequences.

The structure of control bus 318 is modeled after conventional industry-standard shared bus models. A preferred protocol is one similar to an HDLC unbalanced configuration in normal response mode. A preferred control bus 318 is a system-wide multi-drop RS-422 or 485 network, where the host CPU 425 serves as the primary station and up to 63 decoders 316 are connected as secondary stations to each RS-422 or 485 strand. Bi-directional communication between each decoder 316 and the host CPU 425 is controlled by a preselected polling scheme emitted by the host CPU 425.

At installation, the host CPU 425 assigns a unique control bus address to each decoder. This address consists of a strand ID, which identifies the RS-422 or 485 line to which the decoder is connected, and a 5-bit polling ID. The polling scheme allows the host CPU 425 to poll each decoder using a single byte, thus making the most frequently used signal the shortest length.

In addition, the host CPU 425 sends commands to a specific decoder 316 using its unique 21-bit decoder ID. Unless there are any errors detected, every decoder 316 along a strand is polled before any decoder is polled a second time. This polling sequence represents a polling cycle. The suitable nominal polling frequency of 0.2 second, that is, an outstanding message at a decoder will wait not longer than 0.2 second before it is solicited by the host CPU 425. The baud rate (nominally 9600 baud) is configurable, depending on the number of decoders in the system. This means that smaller systems may be able to realize a savings by using fewer communications controllers. It also means that systems are easily upgradeable, since the system's control bus capacity can be increased by adding communications controllers. Where desk interface units are used, CPU 425 assigns a polling ID for each video screen 317 and polling and command messages are sent for each video screen 317 on the system, rather than to each decoder 316.

Messages between the host CPU 425 and each decoder 316 are in the form of a transaction. All transactions are initiated by the host CPU 425 and take place between the host CPU 425 and a single decoder. Referring to FIGS. 24A and 24E, the host CPU 425 begins its signal by sending a probe message (if it has no command for the decoder 316) or a command message (if it has a command outstanding for the decoder) to a specific decoder. Alternately, the host CPU 425 may send a "Broadcast" message to all decoders on that control bus strand 318. Broadcast messages serve a number of purposes (e.g., transmission failure, system-wide keyboard messages, changing communication parameters, etc.). Both command and Broadcast messages consist of a Header, a sequence element (Seq), and one or more requests (R-Frame).

Referring to FIG. 24B, each decoder responds to a host CPU 425 signal with either a solicitation message or, if no solicitation is ready, an idle message. Idle messages consist of a Seq element only (message bit=0). Solicitation messages consist of a Seq element (message bit=1), a poll element, and one or more request frames. A request frame (R-Frame) contains one or more requests from either the host CPU 425 or the decoder 316. No more than 64 requests can be sent in one R-Frame. FIG. 24C shows the structure of an R-Frame and FIG. 24D shows the structure of a single request.

Of the three message classes generated by the host CPU 425, two (Probe and Command) constitute signals. The decoder must respond within a configurable response interval (nominally set at 5 character times), otherwise the host CPU 425 regards this as a failed transaction. If the number of failed transactions passes a configurable disconnect threshold (nominally set at 5), the host CPU 425 logically disconnects the decoder from the network and displays a suitable message to the system administrator.

The signaled decoder responds to each host CPU signal with a solicitation or idle message. The value of the AK bit in the Seq element (see FIG. 24G and the discussion below) reflects the reception status of the signal. If the signal was a Probe or a successfully received Command, the AK bit is 1. If the signal was a Command, and the R-Frame was not received successfully, the AK bit is 0.

The decoder regards the transaction as successful if the next message sent by the host is a signal to another decoder. Otherwise, a negative acknowledgement is assumed. If the next host message is another signal to this decoder, it retransmits the solicitation. On an error, the host CPU 425 will re-signal a decoder up to a configurable number of times (nominally 5), and then send a broadcast message. This indicates a communication failure without providing a response opportunity. The host CPU 425 then continues its polling sequence.

As shown in FIG. 24E, bit 7 of the poll message is always set. Since a poll message can originate from either the host CPU 425 or the decoder 316, bit 6 is used to indicate the source of the poll (0=Host, 1=decoder). The remaining six bits are the polling ID of the decoder (1 to 63).

Referring to FIG. 24F, Command and Broadcast messages always originate in the host CPU 425. The structure of byte 0 of these two messages is identical; however, whereas the command message is sent to a specific decoder, wherein bytes 1, 2, and 3 of the command element contains the polling ID of the decoder, the broadcast message is sent out to all decoders on the entire strand, wherein bytes 1, 2, and 3 of the broadcast message have a polling ID=0.

In addition to message-by-message acknowledgements, each command and solicitation message is assigned a sequence number (see FIG. 24G). The sequence numbers are consecutive, modulo 4. These are reported by each station in the NR and NS bit fields of the Seq element. Commands are numbered in the NS field by the host CPU 425 and the NR field by the decoder 316; solicitations are numbered in the NR field by the host CPU 425 and in the NS field by the decoder 316. In each case, the sequence number fields contain the next expected sequence number. In other words, the NS field of the current message contains the sequence number of the next message the sending station expects to send. The host CPU 425 maintains a unique NR/NS pair for each decoder. In Broadcast messages, only the NS field is meaningful.

This feature provides an additional means of error correction and detection, since a failure to match one station's NS with the other's NR is interpreted as a request to resend messages with prior sequence numbers. This means that each station keeps a queue of the last 4 messages transmitted. In the event of a sequence number mismatch, all Reqs (up to 64) from all outstanding outbound messages may be concatenated into a new message with the lowest outstanding sequence number.

Figure 25:
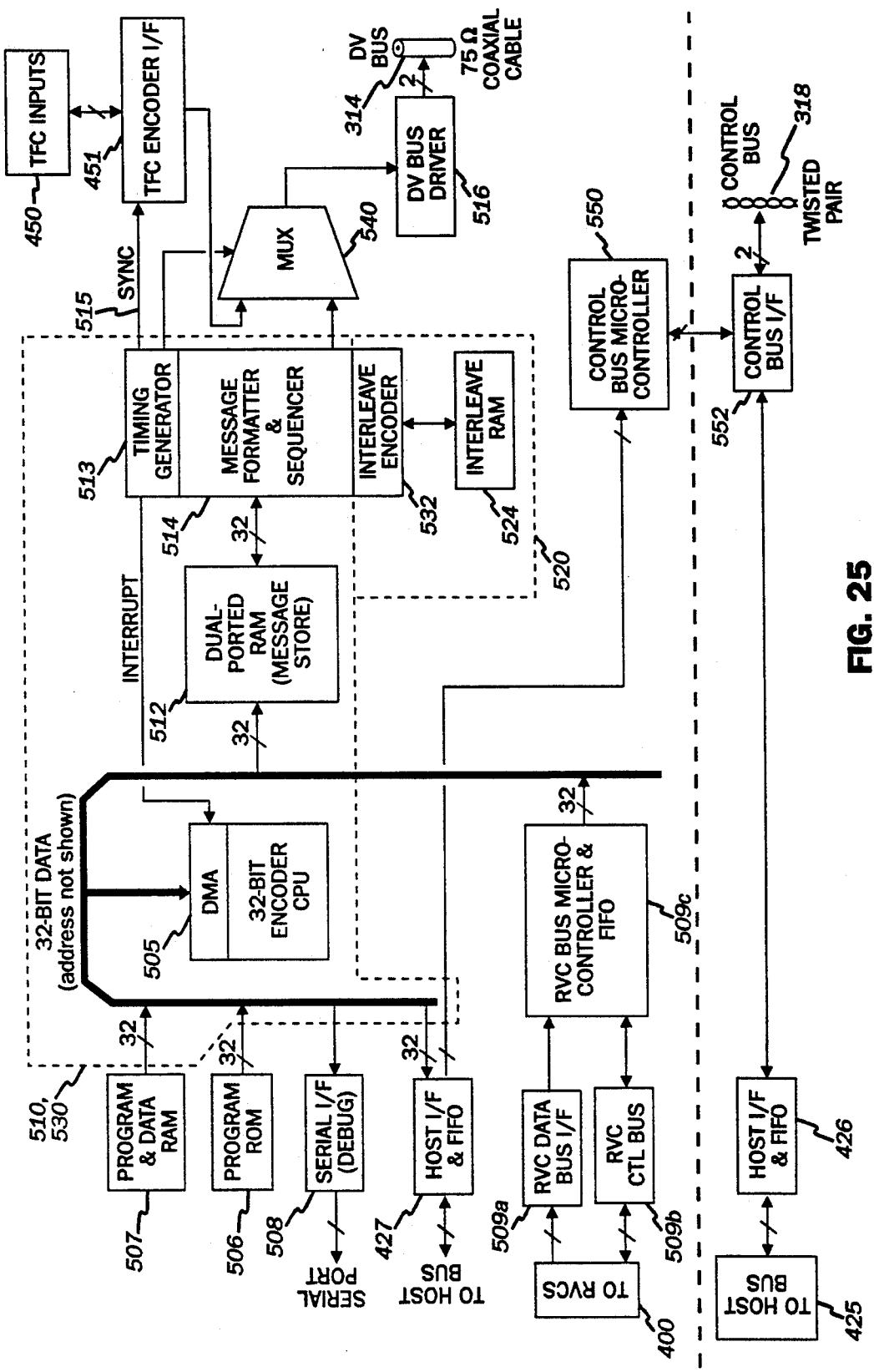
FIG. 25 is a block schematic diagram of the encoder of FIG. 11.

Referring now to FIGS. 11, 16, and 25, a preferred embodiment of an encoder 312 of FIG. 11 is shown. Encoder 312 is constructed to interface with host CPU 425, and to accept signals from digital sources, analog sources, digital video sources, analog video sources, and realtime television image signals, in addition to the host CPU 425. Preferably, the encoder 312 receives video signals from one or more residual video converters 400 and television signals from one or more television feed converters 450.

Encoder 312 is preferably configured as a single printed circuit board assembly that can be installed in a backplane of the host CPU 425, and may be supported by one of ISA, EISA, and VME bus protocols, or an equivalent protocol.

The encoder 312 originates messaging over the simplex DV bus 314 to the plurality of individual decoders 316, and also provides duplex communication over the control bus 318. It includes an encoder CPU 505, which is preferably a high performance 32 bit central processing unit with direct memory address (DMA) and other integrated functions (e.g., counter-timer). A suitable CPU 505 is model 68332 available from Motorola. It is responsible for controlling all of the encoder functions, including collection of incoming data, message manipulation, determination of transmission priority, and dissemination of outgoing data.

The CPU 505 has an associated ROM memory 506, which contains a small amount of program ROM code, e.g., the basic boot code and rudimentary program functions to allow the encoder 312 to perform self-test and communicate with the host CPU 425. The bulk of the encoder executable code is preferably stored in a RAM 507, and may be downloaded via the host interface 427, thereby providing maximum flexibility for reconfiguring the functionality of encoder 312. Alternately of course, the executable code could be contained in the ROM 506.

Data received via the host interface 427 or the serial interface 508 are transferred by DMA into the Program and Data RAM 507 along data bus 504. The encoder CPU 505 can then access these messages and perform any necessary manipulation or response.

The Dual-Ported RAM 512 stores current messages queued by the system, for transmission on DV bus 314.

When a new message has been prepared by the encoder CPU 505, it is then transferred via DMA bus 504 from the Program and Data RAM 507 into the Dual-Ported RAM 512. These transfers occur during the header period of the signals on the DV bus 314, and are initiated by a high-level interrupt provided by a timing generator 513. The Message Formatter and Sequence circuit 514 accesses new messages loaded into the Dual-Ported RAM 512, and formats the message as discussed for transmission over the DV bus 314.

The host interface and FIFO 427 allows bi-directional communication between the host CPU 425 and the encoder 312. Host messages that are to be transmitted by the encoder 312 on DV bus 314 are passed from the host CPU 425 to the encoder 312 via the interface 427. Because these messages are only composed of changes to displayed screens, i.e., update data, the average bandwidth requirements are much lower than for "realtime" video switched systems.

Messages from the host CPU 425 are loaded into an input FIFO memory device in interface 427 for retrieval by the encoder CPU 505. Configuration information is also passed from the host CPU 425 to the encoder 312. The encoder CPU 505 will periodically DMA transfer the incoming messages from the FIFO memory in interface 427 to its local Program and Data RAM 507 over bus 504.

The host interface 427 can also be used for limited information flow in the other direction. Responses and command acknowledgements from the encoder 312 are communicated to the host 425 via interface 427. In addition, data received over the control bus 318, e.g., data generated by the user's keyboard 319 or mouse 319' are transferred to the host CPU 425 through this same interface 427 via control bus microcontroller 550. Alternately, the control bus 318 may be accessed by host CPU 425 directly through host I/F and FIFO device 426 as illustrated in FIG. 25.

The RVC interface 509a consists of a mono-directional data port 509 and a bi-directional control port 509b that communicate between external RVC modules 400 and a bus microcontroller 509c. RVC modules 400 send messages to the encoder 312 that identify pixel change data on video display adapters to which they are connected as described below.

The encoder data bus 504 could possibly be busy when multiple RVC modules 400 attempt to send messages asynchronously to the encoder 312. Arbitration and flow control is, therefore, required. Further, bus and priority arbitration by the interface circuit 509a is preferably provided by RVC bus controller and FIFO 509c in a conventional manner. Typical techniques include: interrupt requests generated by RVC modules 400 and subsequent polling of data by the encoder CPU 505; "token passing" between connected RVC modules 400 to enable sequential access to the interface bus 504; and time domain multiplexing (TDM) of the interface bus 504 to allow periodic access by each RVC module 400.

Messages delivered by the RVC modules 400 are identical in structure to those created by the encoder CPU 505 and are DMA'ed directly into the Dual-Ported RAM 512. Therefore, messages delivered by the RVC modules 400 present no processing overhead to the encoder CPU 505. However, the encoder 312 may apply cellular micrographic techniques (optionally with run length encoding) to further reduce message volume on the DV bus 314.

The serial interface 508 allows easy communication and downloading of executable code, even when the host Interface 427 is not operational. Typically, this port will not be used during normal operation of the system.

The DV bus signaling protocol described above incorporates robust EDAC circuity 520 enhanced by interleaving of data. The likelihood of erroneous data being displayed on a monitor is, therefore, extremely low. The signal to noise performance should have a bit error rate better than $10^{-10}$ in a 38 dB signal to noise ratio, interleaving for burst error protection greater than 16 bits and decompressed TV signal to noise ratio better than 40 dB.

Nevertheless, a further added level of protection is provided by replication coding, i.e., retransmission of previously transmitted data, termed "refreshing." In other words, undetected corrupted data is displayed for only a brief period of time, since the same information will be periodically retransmitted (refreshed) and corrected a short time later, e.g., 0.5 seconds. Thus, the probability of erroneous data being displayed for a significant period of time is further reduced by the number of refreshes, until the message is eventually displaced from the Dual-Ported RAM 512 by more recent data. Thus, the Dual-Ported RAM serves as a cache for each portion of display information that is transmitted to a video screen on the system.

Yet another level of protection is introduced with respect to encoding and refreshing. In this regard, an ESF time-out period is used (see FIG. 2) such that an enable signal flag and enable reception messages must be retransmitted before the time-out period expires or else the previously enabled decoder will become intentionally disabled. Further, retransmission of enable reception messages permits periodically changing the information identification codes for each portion of restricted display information. This will minimize the likelihood that an unauthorized decoder will be able to retrieve and display restricted display information, and because all display information data will be retransmitted, removes the likelihood of corrupted data being displayed for any significant period of time.

The encoder 312 is designed to use as much of the DV bus 314 bandwidth as possible. Priority is given to transmission of new data to keep latency time low. Once this requirement has been fulfilled, the remaining DV bus bandwidth is used for refreshing recently transmitted data. In one embodiment, the DV bus 314 may include up to 2000 feet of type RG-8U coaxial cable, and may have attached to it up to 128 decoders 316 with a 3 dB bandwidth on the order of from 100 Hz to 25 MHz.

The Message Formatter and Sequencer 514 performs a hardware function responsible for retrieving prepared messages (in proper priority) from the Dual-Ported RAM 512 and generating the proper header and message for transmission on DV bus 314. The preferred DV bus definition requires that one packet is transmitted every 63.5 μs corresponding to a television video scan line for a VGA format; for other television formats, other packet time lengths could be used. Long messages are thus broken into several consecutive digital packets d. The Message Formatter and Sequencer 514 performs division of long messages into multiple digital packets d with consecutive packet sequence numbers.

The Dual-Ported RAM 512 is preferably implemented as a circular message store buffer, with new messages loaded by the CPU 505 overwriting the oldest messages left in the RAM 512. Every movement of the starting data pointer by the CPU 505 causes the Message Formatter and Sequencer 514 to begin sending the new messages before resuming the transmission of refresh messages.

The interleave encoder 522 burst error protects the outgoing packet data stream. In summary, the outgoing packet data D and parity P are stored in the interleaving RAM buffer 524 in "raster scan" format. The interleave encoder 522 then reads the data D and parity P with the axes reversed. Consequently, each decoder 316 is able to detect and correct most errors caused by burst noise. As noted, the degree of interleaving in each packet is dependent upon the number of television signals TV being multiplexed onto the DV bus 314. The interleave level in each packet d is controlled by the encoder CPU 505 and is communicated to the decoders 316 via the aforementioned message field.

The timing generator 513 generates the various DV bus dependent timing signals used by the encoder 312. An interrupt to the encoder CPU 505 is timed to allow new messages to be loaded into the Dual-Ported RAM 512 during the period when the Message Formatter and Sequencer 514 is not accessing the RAM 512. Horizontal and vertical sync signals are provided at output 515 of timing generator 513 for dissemination to an optional Television Feed Converter (TFC) 450. Multiplexor control signals are also generated at output 516 for use by an output multiplexor device 540 to inject the converted TV signals at the appropriate time in a video packet v during each TV scan line time length t.

Regarding TFC 450, a number of live TV signals may be time compressed and transmitted over the DV bus 314 for display by remotely located decoders 316. These standard NTSC video signals will be time compressed (e.g., by a Multiplexed Analog Component (MAC) technique), and then injected onto the DV Bus 314 in a Time Domain Multiplexed (TDM) fashion. Further, the same television signal can be provided with different line numbers so that one video screen can display the signal at full size and another can display it at a different size, e.g., ¼ size.

Thus, TFC encoder interface 451 accepts the MAC analog signals from several different TFCs 450. When other television signal compression formats are used, interface 451 is appropriately modified. In addition, interface 451 provides horizontal and vertical sync signals to the TFCs 450 to "genlock" these signals to the master time clock in encoder 312. Configuration and control messages are also passed between the host computer 425 and the TFC 450 via a conventional low bandwidth serial communications link (not shown).

Digital signals generated by the Message Formatter and Sequence 514 are modulated in the "dibit" format, i.e., with four discrete analog levels representing two binary bits of information per signaling interval. Signals supplied by the TFC Interface 451 are typically high frequency MAC analog signals. These two signal types are time multiplexed together by multiplexor 540 to form a hybrid signal for transmission over the DV bus 314.

The multiplexor 540 performs this selection process in response to control signals provided by timing generator 513. The exact number of TV signals, and their location within the DV bus packet, are determined by configuration information passed from the host computer 425.

The DV bus driver 516 interfaces the analog output signal from the multiplexor 540 onto the 75 ohm DV bus coaxial cable 314 in a conventional manner.

The control bus microcontroller 550 polls the control bus interface 552 collects the data from remotely located decoders 316 and passes the data to host computer 425. On large systems, this functionality may be performed on a separate Digital Interface Board (see DIB 426 FIG. 11.) The control bus interface 552 connects the encoder 312 to a multi-point twisted pair control bus 318. Drivers are used to send and receive differential signals on this control bus 318.

In one version of the third embodiment of the present invention, the encoder 312 was designed using Application-Specific Integrated Circuits (ASICs). Three Field Programmable Gate Array (FPGA) ASICs were defined using commercially available devices. Increases in FPGA densities will allow partitioning the design into fewer FPGAs. The functions of the three FPGAs are distributed as follows.

| ASIC | FUNCTIONS |
| --- | --- |
| 1. Host Interface | Host Interface & FIFO 427 (except the FIFO itself) (ISA bus) |
| 2. Video | Dual-Ported RAM 512 |
| 3. Message | Message Formatter & Sequencer 514<br>Timing Generator 513<br>Interleave Encoder 522 |

Figure 29:
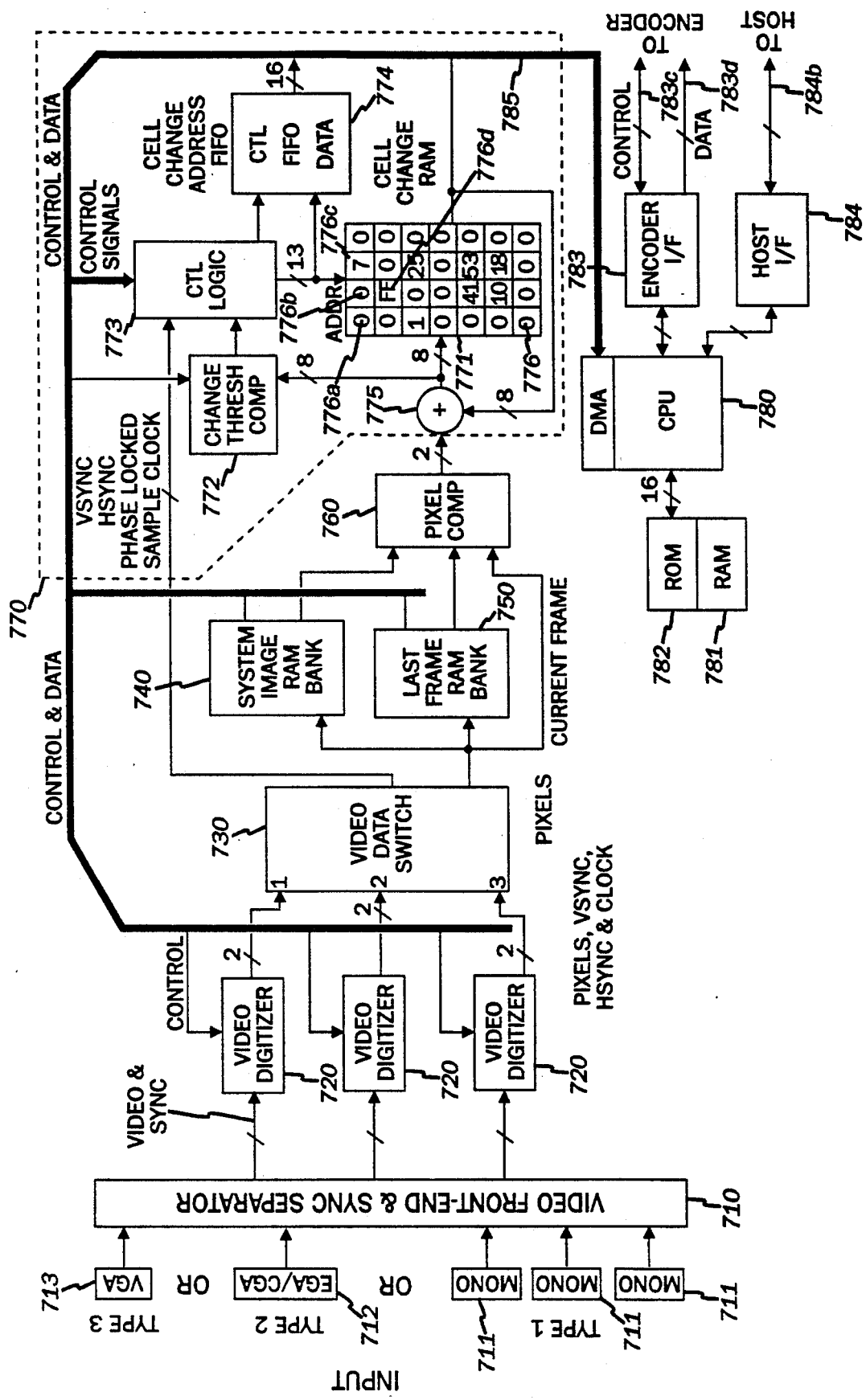
FIG. 29 is a block diagram of a modular residual video converter device in accordance with a preferred embodiment of the present invention.

Referring now to FIG. 29, a modular residual video converter (RVC) 400 in accordance with a preferred embodiment of the present invention is shown. In this embodiment, RVC 400 includes a video front end and sync separator circuit 710, three video digitizer circuits 720, a video data switch 730, a system image RAM bank 740, a last frame RAM bank 750, a pixel comparator 760, and a pixel change circuit 770 for identifying which cells 210 of a composite page 200 of display information have changed pixel information and the pixel change information.

Preferably, each RVC 400 operates under the control of a microprocessor (CPU) 780. CPU 780 has associated memory RAM 781 and memory ROM 782 and a direct memory address capability, and a DMA control and data bus 785. CPU 780 also has an encoder interface 783, for interfacing with an encoder data bus interface 509a and control bus interface 509b (FIG. 25) and a host CPU interface 784, for interfacing with a host CPU 425.

The RVC 400 may be configured to accept one of three different types of input video signals, namely monochrome, EGA/CGA, or VGA. For monochrome video signals, three BNC connectors 711 are provided to accept video feeds from three independent monochrome video signal feeds. For EGA/CGA video signals, one type DB-9 connector 712 is provided to accept one EGA or one CGA input video signal feed. For VGA video signals, one type DB-15 connector 713 is provided to accept a single VGA input video signal feed, such that the signal may be analog or digital RGB signals. These connectors and their pin connections, are conventional and known in the art. Preferably, RVC 400 includes a jumper or switch selection (not shown) to select which connector output, corresponding to the type of video signal feed, will be input to the RVC 400. This may be incorporated into front end circuit 710 or into a cable converter having a standard connector on one end.

Referring to FIG. 29, the front end circuit 710 includes circuits to separate the horizontal and vertical sync signals from the input video signals. In the case of non composite video inputs, the appropriate video connector pins must be selected for provision of these same signals. When RVC 400 is to be used to digitize a three color signal, e.g., CGA, EGA, or VGA, the sync signals respectively fed to the three video digitizers 720 are synchronous. Further, front end circuit 710 may include an analog color matrixing circuit to convert color R,G,B signals into Y,U,V signals for more efficient digital encoding of the signals. When the RVC 400 is used to digitize three monochrome video signals, all three sets of sync signals may be asynchronous.

Alternately, each RVC could be configured with one type of connector, e.g., connector 711, 712 or 713, in a dedicated manner for processing only the corresponding type of video signal. This configuration would simplify the manufacture of modular circuits, so that different RVC 400's would be used for processing the different format video signals. Thus, the user of the RVC 400 may select the appropriately configured module and insert it into the printed circuit board for converting the received video signal.

Figure 30:
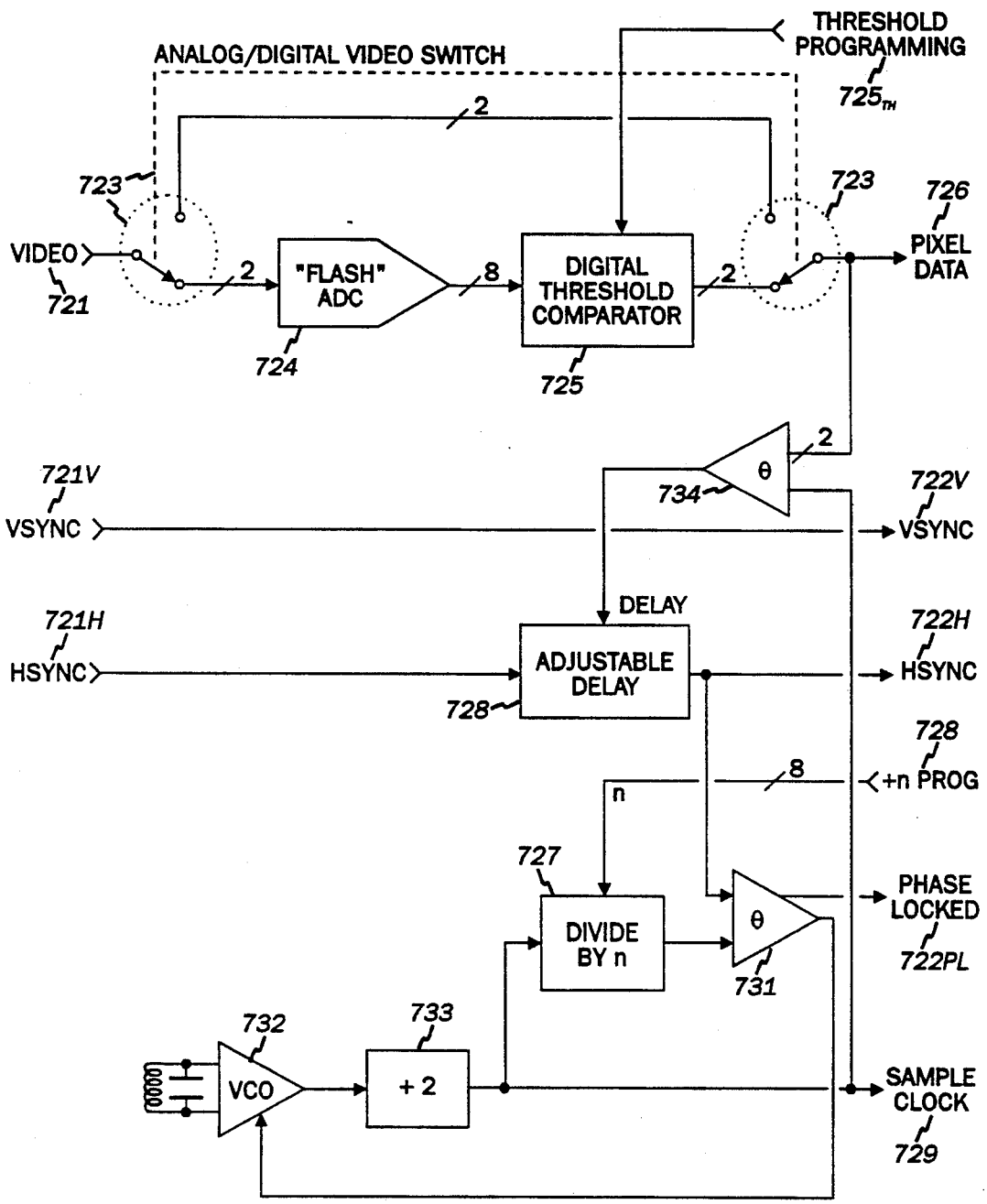
FIG. 30 is a block schematic diagram of the video digitizer circuits of FIG. 29.

Referring to FIGS. 29 and 30, the three video digitizer circuits 720 have the same construction and operate in the same manner, and therefore only one such circuit is described. Each video digitizer circuit 720 receives from front end circuit 710 one video signal video input feed at input 721, a vertical sync signal VSYNC for that video signal at input 721v, and a horizontal sync signal HSYNC for that video signal at input 721h. The vertical sync signals are passed directly through circuit 720 to output 722v.

A double-throw switch 723 is provided to configure circuit 720 to process digital video signals and analog video signals. Switch 723 may be manually configured or, more preferably, configured by RVC CPU 780 by appropriate commands over the control and data bus 783. Switch 723 is illustrated in FIG. 30 in the position for accepting and digitizing analog video signals. In this configuration, the signal VIDEO at input 721 is passed to a flash analog to digital converter (flash ADC) 724 and a digital threshold comparator 725.

Flash ADC 724 accepts differential analog video signals, for minimization of common-mode ground noise, where it is locally converted to a single ended signal. The flash ADC 724 is preferably capable of operating at the 32 MHz VGA video rate, and its output may be asynchronous, and not dependent on any timing clock. Thus, flash ADC 724 converts the sampled analog signal VIDEO into, e.g., an eight bit digitized output.

In the preferred embodiment, the digital threshold comparator 725 performs a combinatorial logic function that maps the m-bit output value of flash ADC 724 into an n-bit pixel value, e.g., a two bit value. This renders the analog signal VIDEO compatible with conventional video signals that are digitally transmitted. Digital threshold comparator 725 uses three programmable binary thresholds that define four video signal amplitude regions. The binary threshold values are programmed by CPU 780 at input 725. Thus, the two bit digital signal assigns the analog input signal amplitude to four levels. More particularly, the 8-bit digital value is mapped into a quad level (8,9) modulated signal which has two bits of data per signaling interval.

This is usually adequate when processing monochrome signals. However, when processing color signals, this results in four possible values for each of the R,G,B, (or Y,U,V) signals. Hence, only sixty-four different colors may be represented by the RVC 400. Further, assigning two bits to each of the R,G,B (or Y,U,V) signals does not necessarily represent the best use of digital bandwidth.

In an alternate embodiment more than two bits could be used. For example, R=3, G=3, and B=2 bits (and similarly Y=3, U=3, and V=2 bits) may be used when appropriate for the video signals being processed. Also, when other transmission system formats are used, flash ADC 724 digital threshold comparator 725 should be adjusted to provide and an appropriate m-bit digital conversion rate and the desired mapping of the m-bit digital value of the sampled analog video data to an n-bit pixel data signal compatible with the system.

When the video signals VIDEO at input 721 are digital, typically a two bit signal, switch 723 is placed in the digital position (not shown), the video signals VIDEO are simply passed through for further processing. Thus, in the present embodiment, the two bit digital pixel data representing the input video signals VIDEO are available at node 726. The output of circuit 720 provides the pixel data at output 726 to video data switch 730, along with the vertical sync pulses VSYNC at output 722v, the horizontal sync pulses HSYNC at output 722h, and the phase locked horizontal sync pulses PHASE LOCKED at output 722pl.

It has been realized that simply sampling the video signals at the pixel frequency is not likely to be sufficient to digitize the incoming video data at the proper sampling rate and phase. Sampling the analog video signals at a frequency different from the pixel rate of the video signal would result in aliasing the frame of pixel data and its sync pulse resulting from the difference between the two frequencies.

Sampling near the middle of each pixel minimizes any threshold ambiguity. However, simply matching the sampling frequency and the pixel rate frequency does not guarantee this will occur. Consequently, in accordance with the current invention, each video digitizer circuit 720 also contains two phase locked loop (PPL) circuits to meet the two criteria of frequency matching and mid-point sampling (collectively referred to as "pixel phase lock").

The video signal at input 721 can be arbitrary. Therefore, it is impossible to determine the pixel clock frequency from the video data alone. However, the nominal horizontal scan rate and exact number of pixels n per horizontal line are known from configuration information supplied to RVC CPU 780. As noted, each display has a defined number of cells per row and a defined number of pixels per line in a cell and the video scan line used to display a line of pixels across the video screen is known, e.g., 63.5 μs. This information may be used to generate a divisor value for a "divide by n" counter 727, which value n is provided by CPU 780 at input 728. The "divide by n" counter 728 is thus loaded with a programmed divisor n such that n is equal to the number of pixels per horizontal video scan line of the video screen 317 (total pixels, not just visible pixels). The output from counter 727 may be a pulse, since only the rising edge of the signal is used for phase lock purposes.

The leading edge of the horizontal sync pulse HSYNC input at 721h is passed through an adjustable delay circuit 728, and then is passed to one input of a first phase comparator 731. The other input to phase comparator 731 is the output of divide by n counter 727. Phase comparator 731 produces an error signal that represents the phase difference between the delayed pulse HSYNC and the output of counter 727. This error signal is then used to adjust the frequency of a voltage controlled oscillator (VCO) 732 so that sampling frequency matching phase lock is maintained. The error signal is amplified appropriately such that VCO 732 output frequency is driven in the direction to minimize the sampling frequency phase error.

This phase comparator 731 is preferably a state-machine variety, since only the rising edges of the incoming signals are used for phase comparison. The phase comparator 731 also may incorporate sample-and-hold circuitry to minimize VCO 732 output frequency ripple, while maintaining an acceptably fast loop response. The Motorola MC145159 Frequency Synthesizer IC incorporates a sample-and-hold phase detector plus programmable counters, and may be used to implement much of the PLL circuitry of video digitizer 720.

The output of the VCO 732 may not necessarily be a precise 50/50 duty factor. Therefore, the oscillator is designed to run at twice the pixel frequency, and its output is fed into a "divide by 2" flip-flop 733. The output from flip-flop 733 is a uniform square wave that is the sample clock rate at output 729 and, as noted, is input to divide by n counter 727.

The phase control circuitry described above thus assures that the pixel sample clock at output 729, which is generated by the RVC 400, matches the incoming video pixel data frequency at output 726.

A second phase comparator 734 is used to compare the pixel phase with the sample clock at output 729. Thus, one input is the digital pixel data at node 726, and the other input is the sampling rate output from divider 733. The output from the pixel phase comparator 734 is used to control delay circuit 728, which is preferably linearly adjustable. The delay may be implemented as a simple variable RC circuit, since only ±½ pixel delay must be produced. When the delay is adjusted by the pixel phase comparator 734, the phase reference for the pixel frequency is changed. This, in turn, produces a comparable shift in the phase of the pixel sample clock at output 729.

Preferably, phase comparator 734 also is a state-machine variety to compare only rising edges of the input signals. However, special consideration must be made in phase comparator 734 to account for the arbitrary nature of the incoming video signal data. In this regard, phase comparator 734 must incorporate a sample-and-hold type circuit, because phase error information may be produced by only a dozen or so pixels (one character), while the output signal must be held stable for an entire video frame. The response of the phase control loop must take into account the fact that phase error sampling may occur only once per video frame (e.g., every 16.7 ms).

Referring to FIG. 29, the outputs from the three video digitizer circuits 720 connect to a 2-bit video data switch 730. Switch 730 is preferably operated in rotary fashion, so that each video input (illustrated as numbers 1, 2, and 3) is connected in turn for one video frame of pixel data. As a result, each video signal input is sampled for changes once every three frames, for a signal transmission latency of about 50 ms. In the case of asynchronous monochrome inputs, the average latency may be slightly longer, and is dependent upon the frame phase relationships between the non gen-locked video signals.

The high sampling rate of each video signal input assures that minor screen changes (e.g., blinking characters) are rapidly detected and broadcast quickly enough to maintain the desired visual effect on the video screens 317 of the decoders 316.

Switch 730 also may be controlled by CPU 780 to connect selectively to one particular video input more or less frequently than the other inputs.

The output of switch 730 is a stream of pixel data corresponding to one current frame of display information. This pixel data is passed to a "system image" RAM bank 740, a "last frame" RAM bank 750, and a pixel comparator 760. The pixel comparator 760 has as inputs the stream of pixel data from the output of video data switch 730 corresponding to the one current frame of display information for a given video signal, the pixel data corresponding to the last frame of display information for the given video signal, which was previously stored in last frame RAM bank 750, and the pixel data corresponding to the frame of display information that is currently displayed for the given video signal, which was previously stored in system image RAM bank 740. The pixel comparator 760 uses these three inputs to test for changes in successive frames.

The system image RAM bank 740 is a memory device (or an area of memory in a large memory device) containing a cache of pixel data corresponding to the images displayed on a system video screen 317 for each particular portion of display information that is transmitted by the three video signals inputs. The cached pixel data match the "net pixel change data" previously transmitted to the encoder 312, i.e., the pixel data for displaying the output display information corresponding to the video signals VIDEO and any subsequent messages providing update data (pixel change data) for updating the output display based on differences between successive frames of the source VIDEO. The net pixel change data also is stored in a picture memory of each remotely located decoder 316 and is used to generate the output images displayed on a video screen 317. As explained in more detail below, the pixel data contained in RAM 740 for any given frame is only updated when update data messages are broadcast, e.g., to or by an encoder 312, thereby to update the pixel data display information held in the respective memories of the remotely located decoders 316 and system image bank 740.

The last frame RAM Bank 750 is a memory device (or an area of memory in a large memory device) containing pixel data for the last frame of display information for each input video signal. The corresponding pixel data for each "last" frame of display information in RAM 750 is completely updated with the "current" pixel data for that frame (from video data switch 730) as the "current" frame pixel data is compared with the corresponding prior last frame and the system image frame.

The system image and last frame RAM banks 740 and 750 are organized with byte-wide (8-bit) data paths. This allows the data to be read and written with a 120 ns cycle time at the VGA data rate. Buffering and wider memory organization may be used, if necessary, to further increase cycle time.

Once the video data switch 730 has selected a new video signal input channel, the last frame RAM Bank 750 is operated in a "Read-Modify-Write" mode. This allows the contents of the RAM 750 to be read into pixel comparator 760, while new data from the output of video switch 730 is written into RAM 750 later in the same cycle.

The pixel comparator 730 processes the three input frames of pixel data to determine if a valid pixel change has occurred. If the current frame pixel data (2-bit value) matches the last frame pixel data, and these data are different than the corresponding pixel data retrieved from the system image RAM bank 740, then a change over two successive frames has been detected and it is considered that a valid pixel change has been detected. If, instead, the current pixel data does not match the last frame data, then it is considered that either the last frame or the current frame contained an error (noise) or it does not correspond to a valid change. In other words, the system waits for corresponding pixels in two successive frames to be different than the corresponding pixel in the system image frame before declaring that a valid pixel change has occurred.

Even though the RAMs 740 and 750 may be delivering byte-wide data, each set of corresponding 2-bit pixels is preferably compared independently. The two bits represent four possible different intensity levels. The output from the pixel comparator 760 is a two bit value representing the absolute value of the pixel intensity change. The output is passed to pixel data change circuit 770 for processing and identifying pixel change data that is to be provided to an encoder 312.

The foregoing comparison algorithm is highly immune to noise, since only stable (but changed) pixel data is flagged as changed. If greater noise immunity is desired, additional "next to last" frame RAM devices could be used and the algorithm modified to wait for more than two consecutive frames to have the same changed pixel data different from the system image.

Referring to FIG. 29, pixel data change circuit 770, in the preferred embodiment of the present invention includes a cell change RAM device 771, a change threshold comparator 772, a control logic device 773, a cell address change first-in-first-out (FIFO) device 774, and a binary adder 775.

The cell change RAM 771 is a small RAM memory bank (or an area of memory in a large memory device) partitioned into cells 776 such that each cell 776 corresponds to one cell 210 of a video screen image of display information and each cell 210 (FIG. 12) can display a display character, e.g., an alphanumeric or ascii character. Each cell 776 contains an 8-bit binary value representing the sum of the absolute value of the intensity level change of the pixels in the cell. This sum is referred to as a "weighted sum" because it reflects the magnitude of the intensity level difference of the pixels, and not just the number of pixels that have changed. In other words, a larger intensity change is more significant than a smaller intensity change and the magnitude of the change is weighted accordingly.

In the present invention, there are enough cells 776 in cell change RAM 771 to compare each cell 210 of a video frame of display information transmitted by the input video signals, and thus RAM 771 need only be 1/16th the size of either system image or last frame RAM bank 740 and 750. Preferably, RAMs 740, 750 and 771 are discrete memory devices with DMA access so as to minimize the time required to read and write data.

The cell change RAM 771 is operated in Read-Modify-Write mode. The contents of one cell 776 are read and numerically added, at binary adder 775, to the pixel change value that is supplied by the pixel comparator 760 for the corresponding cell 210 of display information. The weighted sum is then rewritten into the same cell 776 in the same cycle. Thus, each cell 776 acts as a cumulative counter that is incremented by the pixel change value from comparator 760 corresponding to the absolute value of the intensity change. The data in a given cell 776 of cell change RAM 720 is reset to zero when the RVC CPU 780 or the encoder 312 broadcasts the pixel change data corresponding to the given cell 776 to the encoder 312 or decoder 316 respectively.

In a preferred embodiment, the corresponding cells 210 of the current video frame, last video frame and pixel map for a complete page 200 of display information are compared, one cell at a time, and the corresponding cells 776 are updated with pixel change values. At the end of each complete frame 200, each cell 776 for that frame 200 contains a binary value that represents the weighted sum of the absolute values of the number of pixel data changes in the corresponding cell 210, since the cell 210 was last updated and the cell 776 count was last reset. Each cell 776 thus holds the weighted sum of 128 pixel change values, since each cell 210 contains 128 pixels.

For example, referring to FIG. 29, no pixel changes have been detected for the cells labeled 776a and 776b. However, 7 weighted pixel counts have been detected for the cell labeled 776c in row 1 column 3. The cell labeled 776d in row 2 column 2 holds the value FF, indicating that at least 255 weighted pixel changes have been detected. Since each cell 776 only holds an 8-bit value, the binary adder 776 must "clamp" the total at FF, and not allow the weighted count data to rollover. Note, the maximum possible weighted sum for a cell having 128 pixels and four intensity levels (two bits per pixel) is 512.

The change threshold comparator 772 is a binary comparator whose threshold is programmed by the CPU 780. Whenever a cell change value, i.e., the weighted sum output from adder 776, reaches that preset count threshold, the control logic device 773 is actuated to load the address of the cell 210 corresponding to cell 776 into the cell change address FIFO device 774. The comparator 772 is enabled only during the comparison of the last pixel 220 of each cell 210 (i.e., the lower right-hand pixel) to minimize multiple detection of cells 210 with substantial changes.

During periods of minimal change activity, the CPU 780 may program the count threshold as low a 1, thereby enabling it to detect single-level single-pixel changes in a given cell 210. However, during periods of high system activity, or during rapidly changing video frames, the count threshold may be selectively programmed at a level high enough to reduce message traffic to an acceptable level and still detect significant changes in the video information that will provide an accurate display to the user.

The cell address data that is contained in cell change address FIFO 774 is later used by the converter CPU 780 to identify those cells 210 with cumulative weighted pixel changes at or above the predetermined count threshold. In this regard, the CPU 780 may simply access the FIFO 774 to determine the cell 210 addresses corresponding to cells 776 with above threshold changes, rather than sequentially reading every cell 776 in the cell change RAM 771.

Further, by loading the cell change values into the FIFO 774 along with the cell 210 addresses, the converter CPU 780 can make further priority decisions regarding the order in which cell 210 pixel change data is broadcast.

The control logic device 773 is responsible for coordinating and synchronizing the actions of the RAM banks 740 and 750, pixel comparator 760, threshold comparator 772, and cell change address FIFO 774. It also interrupts the CPU 780 at the appropriate time to initiate retrieval and manipulation of pixel data.

RVC CPU 780 is responsible for configuring all the various control registers within the RVC 400 and for retrieving and manipulating the pixel data in the indicated or identified cells 210 with changes. After a complete video frame has been digitized and compared, the CPU 780 is interrupted by the control logic 773. The CPU 780 then performs the following functions: (1) Addresses of cells 210 with corresponding cells 776 having counts at or above the predetermined count threshold are read from the FIFO 774; (2) Pixel data for changed cells 210 corresponding to cells 726 in RAM 775 are transferred to the CPU RAM 781 from the system image and last frame RAM banks 740 and 750 (this dual transfer occurs because the "current" frame pixel data has by this time already been written into the last frame data via DMA bus 785); (3) new pixel change data are written from the last frame RAM bank 750 into the system image RAM bank 740 (via DMA bus 785); (4) Updated cells 776 in the cell change RAM 771 are zeroed for detection of new change data and non updated cells 776 are left as incremented, if at all, such that pixel changes in subsequent frames may cause such cells to exceed the established count threshold; and (5) Message(s) containing update data, i.e., the pixel change data from the changed cells, are prepared for broadcast to the system encoder 312, for distribution to remotely connected decoders 316 during sampling of the next frame of display information.

The CPU 780 should be fast enough to handle modest amounts of video changes during the vertical blanking interval (1.4 ms). Should the CPU 780 become overloaded with unprocessed changes, the control logic 773 may be configured to insert blank video frames between actual frame comparisons, thereby allowing the CPU 780 to access the RAMs 740, 750 and 771 for extended periods of time. The only side-effect of inserting blank frames is a temporary increased latency for broadcast of pixel change information.

The CPU 780 software should be capable of detecting certain special case video changes. For example, a screen going completely blank should be detected and encoded without requiring direct messaging of each pixel.

The CPU RAM 781 preferably contains executable code, program data, and pixel data. Pixel data are temporarily moved from the system image and last frame RAM banks 740 and 750 via bus 775 to the CPU RAM 781 for generation of pixel change data messages as explained below.

In a preferred embodiment, RVC 400 is configured with an interface 783 that connects to an encoder 312 via two buses: a mono-directional data bus 783d and a bi-directional control bus 783c. This allows the RVC 400 to format complete messages, and transmit each message to the encoder 312 when instructed to do so by the encoder 312 or host CPU 425. By completely formatting the messages, and notifying the encoder 312, the processing burden on the encoder CPU (not shown in FIG. 30) is substantially reduced. This results in increasing the message handling capacity and throughput of the encoder 312 and its ability to distribute more display information and update data more quickly to the plurality of decoders 316.

The encoder interface 783 typically receives polling signals from an encoder 312 to determine whether an RVC 400 has any pending messages. At the poll, the RVC 400 empties its output message queue into an input message queue for the encoder 312. The polling is preferably performed at a configurable rate (nominally 0.25 sec).

Further, the RVC 400 is preferably controlled by host CPU 425 and includes a host computer interface 484. The host CPU 425 provides the RVC 400 with control information, over a bus 784b. From the perspective of the encoder 312, messages originating from RVC 400 appear to be updates to a pixel-based video or graphic tile rather than a character cell-based alphamosaic tile.

The host CPU 425 can, for example, tell the RVC 400 to: (1) generate a test image, (2) enable/disable sampling of a specific video signal input, (3) set the input sampling interval (nominallye. 0.25 seconds), (4) assign a tile identification code to messages derived from a specified portion of a video image, (5) assemble a current complete image derived from a video input (rather than just the changes), and (6) empty its output queue.

There are two types of user requests for an output display to which the RVC 400 is adapted to respond, a new page delivered by the information vendor, and an old page requested by a new viewer.

For a new page, RVC 400 creates and sends a blank screen message and thus resets the "System Image" and "Last Frame" RAM banks 740 and 750 for that video signal to all blanks. As the new portion of display information is received from the information vendor, it may be sent to the encoder 312 for transmission to the decoder 316 and video screen 317. There is a 3-frame latency delay that is insignificant when compared to the time required for transmitting the new display information from the information vendor site over a telephone line to the client (i.e., subscriber) site.

When a new viewer requests a portion of display information that is currently stored in the system image RAM bank 740, the RVC 400 immediately transmits the entire portion as an update message to the encoder 312 for transmission to the user requesting the display. This latency is less than one frame time. Thereafter, the new user will receive only update data messages for that page in the same manner as the existing users.

It should be understood that more or less than three video digitizer circuits 720, with appropriate changes in the corresponding switch 730 and data processing circuits, could be used in other embodiments for processing more or less than three discrete video signals and composite, non composite or both composite and non composite video signals using the same residual video converter unit 400.

Advantageously, the present invention provides for a reduced time to respond to a user's request to view a page or record of display information that is already being viewed by another user by caching the output display at the client's site, and providing the complete output display as change information to the new user and continuing to provide only relative changes in each of the plurality of cached portions to other existing users of that display information. Further, the invention processes video information in a manner that is essentially transparent to the user and does not add significantly to the time required to display a new page of information and reduces the burden on an encoder type device at the subscribers site. Further, because each converter can be made as a module, supporting additional video signal sources can easily be obtained by adding more modules, without significantly burdening the encoder device.

Referring to FIGS. 11, 16 and 26 to 28, a decoder 316 in accordance with a preferred embodiment of the present invention is shown.

In the present invention, and with reference to FIG. 26, the decoder 316 of the present invention may be resident inside a desk interface unit (DIU) 321, which is adapted to handle decoder functionality, including mouse 319' handling, keyboard 319 and message retransmission/flow redirection, and to drive several video screens 317, and which may be positioned for the use of one or more than one user on one or more trading disks 320. Preferably, a single DIU 321 is designed to support up to four individual users and thus includes connectors for four keyboards 319, four mice 319', and four color video screens 317. Alternately, the four color monitor ports may be configured to drive a total of twelve monochrome video screens 317.

As discussed above in connection with FIG. 11, the decoder 316 may be installed as a separate printed circuit board assembly inside an enclosure also housing the video screen 317. This provides for a modular system whereby each video screen has a unique display identification code stored in memory of the decoder 316, and thereby enhances restriction of secure display information to authorized and permitted video screens.

Regardless of its location, each decoder 316 (or DIU 321, and herein collectively referred to as "decoder 316") is provided to connect each user's input devices 319, 319' and video screens 317 to both the DV bus 314 and the control bus 318.

Figure 27:
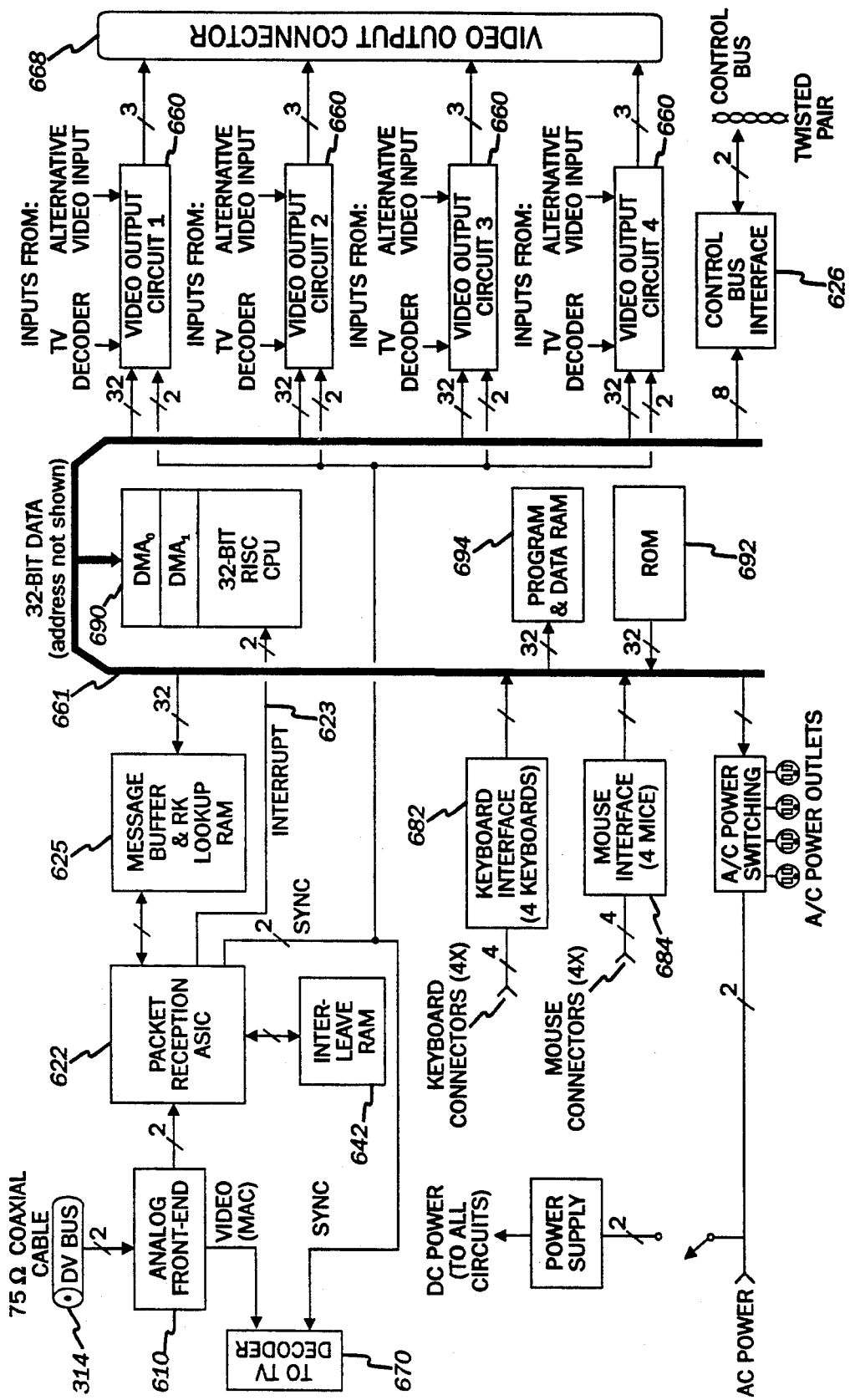
FIG. 27 is a block schematic diagram of the decoder of invention FIG. 11.

Referring to FIGS. 16 and 27, a preferred embodiment of a decoder 316 is shown. The Analog Front-End circuit 610 connects to the DV bus 314 and (1) receives the DV bus signals and maintains proper impedance matching; (2) post-equalizes the DV bus analog signal; (3) double-end clamps the signal for threshold setting; and (4) converts the quad-level signal into a 2-bit binary signal.

The Analog Front-End circuit 610 provides a high impedance input to maintain proper transmission line impedance matching. Overvoltage protection also is provided to make decoder 316 tolerant of electrical disturbances. The DV bus coaxial cable 314 will exhibit frequency dependent loss and group delay (dispersion) characteristics. The magnitude of these effects depends upon the length and type of cable selected. For example, RG-59U will exhibit much higher loss per unit length at high frequencies than will RG-8U foam core cable. The Analog Front-End circuit 610 is thus preferably designed to accept widely varying signal levels and high frequency rolloff, depending upon its location along the DV bus 314.

Some form of additional adaptive equalization may be used to correct for loss and dispersion effects. This signal equalization improves the error performance and noise tolerance of the system.

To convert the quad-level analog signal received from the DV bus 314 into a 2-bit binary signal, detection thresholds are established by the analog circuitry. By double-end clamping the DV bus packet d header H signal, the Analog Front-End circuit 610 can determine the upper and lower signal levels and the three signal thresholds as described. The Front-End circuitry 610 then converts the quad-level signal into 2-bit binary input signal for processing by the Packet Reception ASIC 622.

The Analog Front-End circuit 610 also may be adapted to receive, recondition, and repeat the DV bus messaging data if the received signal level falls below a predetermined threshold. This repeater function could be bypassed by a mechanical relay should signal levels be adequate, or if the decoder 316 is inoperative. The decoder 316 also may recondition and repeat the television signals on the DV bus 316 by using information contained within the message header H.

The Packet Reception ASIC 622 receives signals from the Analog Front-End circuit 610, and (1) decodes the header H to identify the beginning of each packet d, programs the dibit threshold levels, and determines the interleaving depth; (2) creates horizontal and vertical sync pulses for use by the Video Output Circuits 660 and TV Decoder 670; (3) performs error detection and correction (EDAC) on each data packet d received; (4) compares each data packet against the stored "reception key" information (a display identification code or an information identification code) to determine if the data requires further processing by the decoder CPU 690; (5) interrupts the decoder CPU 690 at the beginning of vertical blanking so that updates may be made to the Video RAM 662 and Attribute RAM 664 of the Video Output Circuit 660 (see FIG. 28); and (6) loads accepted data packets d into the Message Buffer 625, and interrupts the decoder CPU 690 for further processing.

The incoming data is first stored in the Interleave RAM 642. The Packet Reception ASIC 622 then reads the data with the axes reversed, and performs the EDAC function. The Packet Reception ASIC 622 decodes the header bits to determine the interleave factor to reconfigure the interleave Structure on a packet-by-packet basis. As with the encoder circuit, the decoder ASIC may be implemented by any number of circuits and structures, so long as the described functions are performed, which is within the abilities of a person of ordinary skill in the art.

The Message Buffer 625 is a dual-ported static RAM device that can be accessed by both the Packet Reception ASIC 622 and the decoder CPU 690. Arbitration is provided by the conventional RAM control circuitry within the Message Buffer 625 to prevent simultaneous access. Messages that have been decoded and error corrected are compared against hardwired or previously enabled reception keys, which also are stored in the RAM of Message Buffer 625. Those messages that match reception keys are then loaded into the RAM of Message Buffer 625 from the Packet Reception ASIC 622. Once a complete message (that matches a reception key) has been loaded into the Message Buffer 625, the CPU 690 is notified via an interrupt from ASIC 622 over bus 623. The CPU 690 may then interrupt its normal program operation and retrieve the complete message from the Message Buffer 625.

In the preferred embodiment, decoder CPU 690 is a 32-Bit Reduced Instruction Set Computer (RISC) CPU having a 5 suitable program for controlling decoder 316 operations. One such device is the LSI Logic Model No. LR33000 CPU, which is capable of executing an average of slightly less than one instruction per clock cycle, providing an execution speed of approximately 20 million instructions per second (MIPS). The CPU 690 is preferably capable of both high speed program execution, and high speed data transfers via its two programmable direct memory access channels $DMA_0$ and $DMA_1$. It is responsible for (1) collection and processing messages that match reception keys; (2) responding to processed messages by specific actions and modification of displayed information; (3) DMA transfer of video and attribute information to/from the various video display memories; (4) delivery and collection of data to/from the Control Bus Interface 626; and (5) collection of input information from keyboards 319 and mice 319'.

In an alternate embodiment, the functionality previously described may be accomplished by a lower performance 16-bit CISC CPU such that a single decoder 317 may contain a CPU 690 which is a type 80188 CPU, thereby reducing the cost of the decoder 317.

The CPU 690 has an associated ROM device 692 and an associated Program and Data RAM device 694. ROM 692 preferably contains a small amount of program ROM including, for example, the basic boot code, and rudimentary program functions to allow the decoder to perform self-test and communicate with the host computer 425 via the DV and control buses 314 and 318. Only basic operating functions are executed from ROM 692, thereby allowing system flexibility with executable code downloaded via the DV bus 314. Thus, upon power up, the CPU 690 will begin execution of the program stored in ROM 692 first performing self-test of all circuitry, then acknowledging the status to the host 425 via the control bus 318.

RAM 694 contains both executable code (instructions) and program data. In this embodiment, the bulk of the executable code for decoder 316 is stored in the RAM 694, thereby providing maximum flexibility for reconfiguring the decoder operation. Alternately, of course, the entire program code could be contained in ROM 692. Upon interrupt by the Packet Reception ASIC 622, the CPU 690 operates to DMA transfer the incoming message from the Message Buffer 625 to the Program and Data RAM. The CPU 690 may then resume normal program execution, and perform interpretation of the newly received message at a later time.

In one embodiment, a decoder 316 using a 20 MIPS processor 690 can redraw a complete bit-mapped graphics image (2 bits/pixel) in approximately 165 ms. The DV bus 314 can deliver a full screen graphics image in approximately 32 ms. Because the encoder 312 will not repeat a DV bus message until its refresh period (nominally 200 ms) has elapsed, no decoder 316 will lose a message due to overflow even under worst-case conditions.

Figure 28:
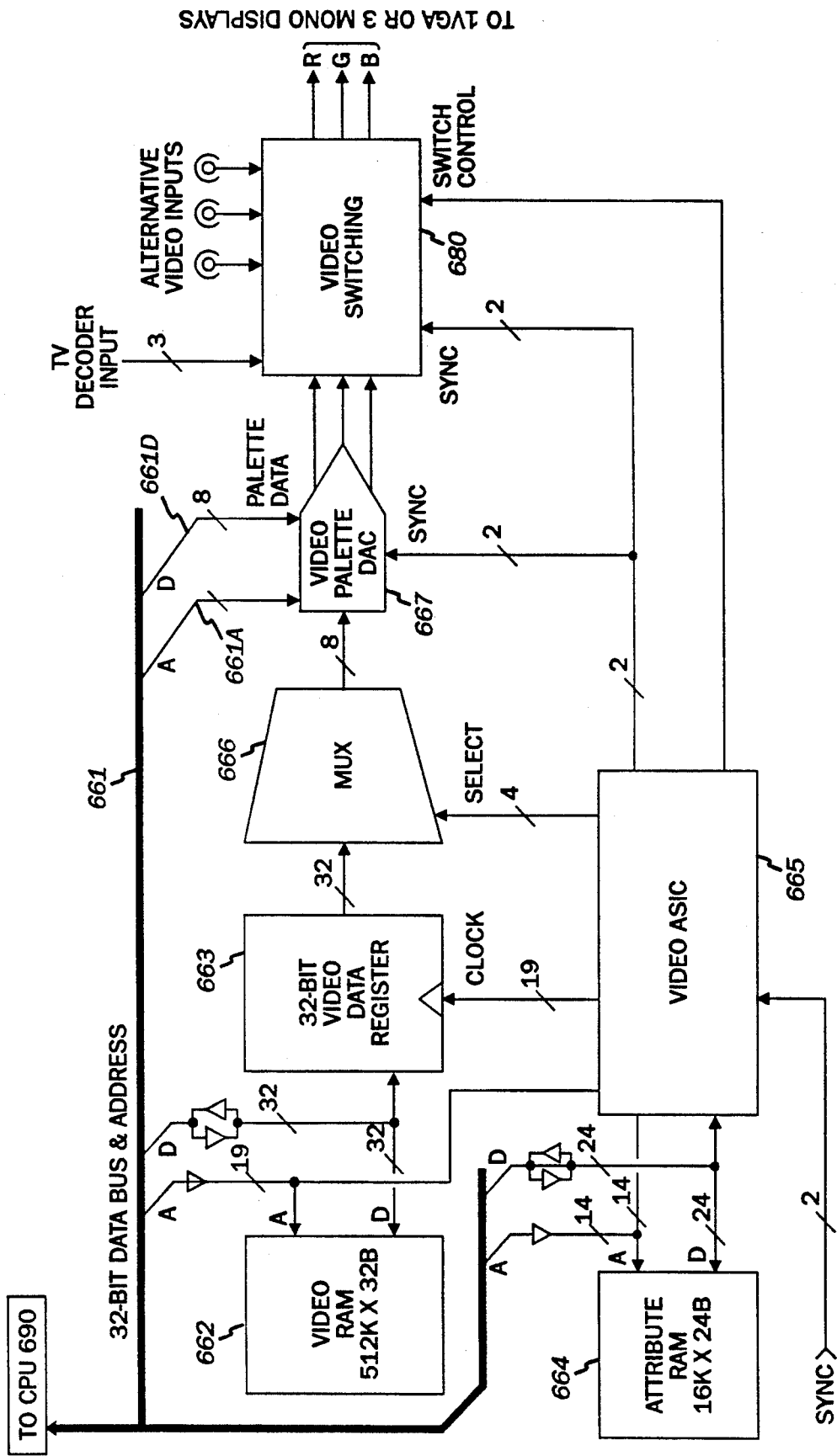
FIG. 28 is a block schematic diagram of the video output circuit of FIG. 27.

Referring to FIGS. 27 and 28, the decoder 316 preferably contains a number of identical video output circuits 660. Four are illustrated in FIG. 28. All video signals are preferably delivered to a single 60-pin connector 668 and conventional output cables may be attached to connector 668 to drive four or twelve video screens.

Each video output circuit 660 (only one is described) accepts bit-mapped pixel data from the CPU 690 and displays the pixels on associated video screens 317 (not shown in FIGS. 27 and 28). Functions such as panning, scrolling, blinking and insertion of live TV are all performed by the video output circuit 660. A single video output circuit 660 can provide signals to one VGA color video screens, or to three VGA scan rate monochrome video screens. When configured for three monochrome video screens, all three video screens may contain different information, with separate tiles and sync signals. However, limitations within the illustrated architecture of video output circuit 660 prevent use of the panning and scrolling features when configured for non genlocked monochrome video screens.

Referring to FIG. 28, the video RAM 662 is preferably configured as 512K words of 32 bits each. During the active video time (non-blanking), the video output circuit 660 reads pixel data from the video RAM 662 on a realtime basis. At VGA scan rates, the video RAM 662 must supply a 32-bit word to the video data register 663 every 120 ns.

The address bus 661 driving the video RAM 662 is multiplexed between the video ASIC 665 and the CPU 690. During active display time, the video ASIC 665 controls the address bus 661. During vertical blanking the CPU 690 has control over the address bus 661. The Packet Reception ASIC 622 provides an interrupt to the CPU 690 to notify it that vertical blanking has begun, and commence any required data transfers by the CPU 690.

The CPU 690 utilizes the time during vertical blanking to load new pixel data into the video RAM 662 via DMA transfer. When the video output circuit 660 is configured to drive a single color video screen, all the video data corresponds to the same video screen, and the CPU 690 may simply overwrite old pixel data with new data. However, when configured to drive three monochrome video screens, the pixel data contained in a single 32-bit word may relate to three independent screens. Therefore, the CPU 690 must first read the pixel data from the video RAM 662, modify the bits relating to the updated tile, and rewrite the pixel data into the video RAM 662.

Assuming a 120ns cycle time on both the video RAM 662 and Program and Data RAM 694, the CPU 690 can transfer approximately 6000 words during a single vertical retrace period (assuming negligible interrupt latency and DMA setup time). This is sufficient data to update approximately 188 cells on a single color video screen. Read and write transfers may be pipelined, so that the read and write data may not relate to the same cells on the screen. This reduces the number of cells that can be updated on a single monochrome screen during the retrace period to approximately 94. Even so, the data transfer bandwidth between the CPU's Program and Data RAM 694 and the video RAM 662 far exceeds the ability of CPU 690 to decode messages and format pixel data.

The video data register 663 receives a 32-bit word from the video RAM 662 approximately every 120 ns during active video time. The outputs from register 663 directly drive the pixel multiplexor 666. Alternatively, multiplexor 666 may be an integral part of register 663 with selection performed by tri-state control.

Panning and scrolling of display information is controlled by the video ASIC 665, and may be implemented by a combination of video RAM 662 address manipulation and multiplexor 666. Implied movement may be performed by reading the stored data and rewriting it in the memory in the new addresses (one pixel at a time) or by adjusting the address when reading stored data for display.

The video palette DAC 667 is standardly available and provides RGB output signals based on a programmable color lookup table. It contains a 256 element lookup table, where each entry contains an 8-bit value for each of the three color output signals. The table is programmed directly by the CPU 690 using data bus 661 and address bus 661A.

The video palette DAC 667 is capable of outputting the three analog video signals (RGB) at VGA pixel rates (approximately 32 MHz). The values for each output are determined by indexing the internal RAM array of pallet DDC 667, based upon the address supplied by the video data multiplexor 666. The three outputs can represent RGB signals for a single VGA color video screen, or can be used independently for three monochrome video screens. The video palette DAC 667 also can also be used to combine sync signals with the video outputs, thereby providing composite video, if desired.

The video switching circuit 680 allows the decoder 316 to feed alternative video input signals through to the video outputs from the decoder 316. This switching is under realtime program control. In addition, the Video Switching 680 provides a high speed video switch to select either the palette DAC 667 outputs or outputs from an optional TV decoder 670. Signals provided by the video ASIC 665 control the actuation of these video switches, based upon the TV signals selected, and the beam position on the video screen 317.

Independent attributes may be assigned for each cell on the video screen(s). Therefore an Attribute RAM 664 is included for storage of these attribute values. Typical attributes include blink, highlight, cursor, panning, scrolling, etc. As with the video RAM 662, the CPU 690 may update the Attribute RAM 664 during the vertical blanking interval by enabling its address A and data D drivers.

The video ASIC 665 reads the Attribute RAM 664 during active video time once for every horizontal cell location (approximately every 240 ns). The video ASIC 665 also coordinates the display of video information from the video RAM 662 and Attribute RAM 664. Once the CPU 690 has loaded the necessary data into RAMs 662 and 664, the video ASIC 665 will continuously display the stored information without the intervention of the CPU 690.

The video ASIC 665 controls (1) reading data from the video RAM 662, and clocking it into the video data register 663; (2) reading data from the Attribute RAM 664, and clocking it into its internal registers; (3) controlling the video multiplexor 666 selection of data input to the video DAC 667 (necessary for panning); (4) generating proper horizontal sync, vertical sync, and blanking signals for use by the video palette DAC 667 and video switching circuits 680; and (5) generating control signals for actuation of the video switching circuit 680 to display realtime television signals and stored display information. Video ASIC 665 also may be implemented by any number of circuits and structure so long as the described functions are performed, which is within the abilities of a person of ordinary skill in the art.

Referring to FIG. 27, the control bus interface 626 connects decoder 316 to a multi-point twisted-pair control bus 318. RS-422 or 485 drivers (or similar interface devices) are used to send and receive differential signals on control bus 318. The control bus interface 626 is interrupt-driven using industry-standard techniques.

The keyboard interface 682 provides a serial interface to a number of, for example, four, QWERTY type keyboards 319. Keyboard data is retrieved from the keyboard interface 682 via the data bus 661D once an interrupt has been received. Keyboard 319 is preferably operated in a block transfer, multidropped, polled mode. Keystrokes are not made available to the system until a block terminator is entered. At least two types of keyboards may be used: One with an internal LCD display and one without. The LCD display preferably supports two lines of data with forty characters each. The keyboard may be similar to a standard IBM keyboard with twelve function keys across the top.

Keyboards 319 are connected to the host CPU 425 through the control bus 318. The control bus 318 allows a maximum of 63 desk interface unit 321 per cable, or a theoretical maximum of 252 keyboards (assuming 4 keyboards are attached to each DIU 21). System response time is a function of the information content, the number of DIUs 321 per cable, and the transmission rate. A polling period of approximately 0.2 seconds can be achieved with 63 DIUs 321 at a 38.4 Kbaud rate. This means that an outstanding request on control bus 318 will be presented to the system in at most 0.2 seconds, even if all DIUs 321 on the same cable have outstanding requests.

Typed characters are displayed on a video screen without any perceptible delay. The polling cycle of 0.2 seconds is inadequate for this purpose. Therefore, the decoder 316 processes the keystrokes, buffers them and also immediately creates a display output in the selected location on the selected video screen 317. When the next poll occurs, the decoder 316 will not respond with the buffered characters unless a block terminator has been entered prior to the poll.

If there is an individual decoder 316 for each display monitor 317 rather than a DIU 321, keyboard and mouse commands are still communicated to all decoders by interconnecting them. This configuration is functionally identical to a DIU configuration, except that the ability to gen-lock must be externally messaged.

The mouse interface 684 provides a serial interface to, for example, four mice 319'. Mouse data is retrieved from the mouse interface 684 via the data bus 661D, once an interrupt has been received. Simply providing mouse 319' functionality to a trading desk can significantly raise the cost of a trading room. Without the present invention, the workstation must either be located at the trading desk or expensive cabling and signal amplifiers must be used to transport the mouse signal between the equipment room and the trading desk. Advantageously, according to the present invention, the encoder and decoder information distribution system performs most mouse signal processing locally at the desk and when appropriate communicates the result to the equipment room via the multidropped control bus 318. This design also reduces the processing load on the host CPU 425.

Mouse 319' functions are broadly classifiable as (1) cursor motion and/or field highlighting, (2) clicking, and (3) dragging. All mouse 319' actions except clicking are handled locally at the trader's desk. Mouse clicks are transmitted through the polled keyboard 319 to the host CPU 425, which then acts upon them.

Referring to FIG. 12, each video screen 317 has page-dependent default settings for cursor style and/or field highlighting for each tile 250. The mouse position on the screen is communicated instantly through the keyboard 319 to the decoder 316 which then temporarily overwrites the selected cells in the required manner. The cursor (not shown) is smoothly moved on a pixel-by-pixel basis. Overwritten cells 210 are buffered within the decoder 316 and are replaced when the cursor position is moved away. When required by the application generating the displayed page, the cursor may be replaced by automatic field highlighting without any required click input.

Clicking, the process of pressing and releasing a mouse button, or double clicking, the process of clicking a mouse button twice in rapid succession, indicates that the application generating the output display must take some computational action in response to a user request. Mouse clicks (and/or double clicks) are transmitted through the polled keyboard 319 to the host CPU 425. The host CPU 425 then executes the indicated action and the results (e.g., new tiles 250) are then transmitted through the encoder 312 to the appropriate video screen 317. The polling rate is sufficiently high that no perceptible delay is generated by this signaling methodology.

Dragging is the process of holding down a mouse button while moving the mouse. Most mouse applications do not drag the "contents" of the window. That is, the window and its contents remains stationary while a new temporary substitute marquee border is drawn and moved across the video screen. When the button is released the temporary substitute marquee border is removed and the contents of the window are redrawn at the new location on the screen. The contents of the window are not continually redrawn as it is dragged across the page to reduce the amount of CPU processing that would be required to constantly rewrite the video memory. Applications that redraw the contents while being dragged significantly load the CPU as evidenced by the inability of all but the fastest machines to keep up with rapid dragging. It is not practical to have a single host CPU machine process multiple composite pages of window-dragging simultaneously unless this border substitution methodology is employed.

The smallest part of the composite page 200 that may be dragged is a tile 250. The tile substitute marquee border may be moved to any location on the display screen; the tile 250 will be "snapped" to the nearest cell 210 boundary when redrawn.

When a mouse button is pressed, the "button down" command is sent to the host CPU 425; when it is released, the "button up" location of the mouse and selected tile 250 identifier are transmitted through the polled keyboard 319 to the host CPU 425 which acts upon them by (1) transmitting a Define Tile Location command byte to the appropriate decoder redefining the new location for only that video screen, and (2) refreshing the entire tile 250 to all decoders 316 presently displaying the tile 250. Symbolic signaling is preferably employed so that all subsequent updates to that composite page 200 will be transmitted only once, regardless of how many decoders 316 have had their tile locations moved.

Mouse processing is effectively decomposed into two parts (1) local processing of all high bandwidth video redrawing operations and (2) remote application processing followed by a one-time redrawing of the video screen. Local (i.e., distributed) handling of high bandwidth page drawing associated with mouse motion reduces the CPU load on the remote application generating the output display. This can be significant when the remote application is generating many interactive mouse tile changes.

Provision is also made for the host CPU 425 to respond to errors and other requests. Each message that goes out to a decoder 316 is sequentially numbered. When a given decoder 316 senses an out-of-sequence message number, it re-requests the missing messages by sending the number of the last message received to the host CPU 425 via the control bus 318. To save processing time, all keyboard 319 requests are concatenated and action is only taken after all keyboards 319 on the control bus have been polled at least once. In effect, this means that the host computer 425 will make one polling loop around all decoders 316 on the control bus before responding to an error request. If the Bit Error Rate is $10^{-9}$ at a throughput of 25 Mbit/sec, then on average there will be 0.025 error requests per second or 1 error retransmission request every 40 seconds.

In a preferred embodiment, the encoder 312 is capable of caching at least 500 composite pages 200 (100×30 characters per page) including cell attributes, and storing at least 4,000 tile names and have a memory base address set to any one of four locations using a Berg clip. The Host CPU 425 input/output should include a base address set to any one of four locations using a Berg clip and an interrupt (if required) may be set to any one of four locations using a Berg clip. The data throughput is at about 2.5 MB/sec (20 Mbit/sec) after protocol processing in the absence of any co-transmitted TV signals, and each co-transmitted full screen TV signal may not degrade the data throughput by more than 0.5 MB/sec (4 Mbits/sec). Codeword lengths for the video screen display ID code may be 21 bits (2,097,152 possibilities) and the tile information ID code may be 24 bits (16,777,216 possibilities). A preferred display screen 317 includes screen attributes of 100 horizontal cells and 30 vertical cells, each cell having 8 horizontal pixels and 16 vertical pixels, with each cell blinking at 4 rates of on/off; scrolling for 2 separate alphamosaic tiles of any size, up or down, with soft or hard scrolling, with 4 soft rates; panning for 4 separate alphamosaic tiles of any size, left or right, with 4 soft panning rates. Also, the character size may be single, double, triple, or quadruple height and width. Up to 8 different simultaneous realtime TV signals, having a total display area of not more than four video screens, each displayable at full, ¼ or ⅛ screen size may be supported. Each TV signal may be shifted horizontally to within 1 cell, but may not be vertically shifted (unless a frame store RAM is used in place of a picture store RAM 662 in the decoders).

Numerous alterations of the structure herein disclosed will suggest themselves to those skilled in the art. However it is to be understood that the embodiments herein disclosed are for purposes of illustration only and not to be construed as a limitation of the invention. All such modifications which do not depart from the spirit of the invention are intended to be included within the scope of the appended claims.

I claim:

1. A system for distributing signals containing display information, said system including an encoder for transmitting particular portions of display information, a plurality of decoders for receiving the display information and generating the particular portions of display information, and a transmission channel connecting the encoder to the plurality of decoders, wherein the system further comprises:

means for comparing received display information to previously received display information and for determining relative changes in display information, said means including a memory containing previously received display information and a comparator responsive to the memory and received display information so that the update data corresponds to the determined changes in display information; and is characterized in that the encoder comprises:

means for providing encoded update data for particular portions of display information to be positioned in a relevant video screen;

a signal generator having a first message stream followed by a second message stream, the first message stream including a plurality of first information identification codes corresponding to update data for each portion of display information and a plurality of display identification codes each corresponding to one of the plurality of decoders, each of the first information identification codes being associated with at least one display identification code thereby to form information identification code - display identification code sets indicative of the particular portions of display information each decoder is authorized to receive, the second message stream including associated sets of first information identification codes and the corresponding update data;

and wherein each decoder is further characterized by:

a memory device for storing transmitted display information capable of being displayed on a video screen;

means for associating the decoder with one of the display identification codes;

first means for recognizing the one display identification code in a first message stream and for storing in the memory device each first information identification code associated with the one recognized display identification code; and second means for recognizing a first information identification code in a second message stream corresponding to a stored first information identification code and for receiving and storing the update data associated with the recognized first information identification code, thereby to update the stored portion of display information in the memory device corresponding to the recognized first information identification code.

2. The apparatus of claim 1 wherein each decoder further comprises a video screen, wherein the associating means associates the video screen with the one display identification code, further comprising a decoder signal generator for generating a visual display on the video screen of the stored portion of display information.

3. The apparatus of claim 1 wherein the particular portions of display information include a first portion that further comprises television program information and a second portion that further comprises financial marker information, said first and second portions having unique first information identification codes.

4. The apparatus of claim 1 wherein the system distributes securely restricted display information signals, the encoder providing means is further characterized by:

means for providing update data corresponding to changes in particular portions of display information and a display coordinates for positioning the update data in a relevant location in the corresponding particular portion of display information;

wherein the encoder signal generator has a third message stream and a following fourth message stream, the third message stream including a plurality of first information identification codes corresponding to update data for a particular portion of display information, a plurality of display coordinates corresponding to positioning each update data in a relevant location for a particular portion of display information, and a plurality of the display identification codes each of the first information identification codes being associated with at least one display identification code and display coordinate thereby to form first information identification code - display identification code - display coordinate sets indicative of the relevant display location of the update data for particular portions of display information each decoder is authorized to receive, and the fourth message stream including associated sets of first information identification codes and the corresponding update data;

wherein each decoder first recognizing means further comprises means for storing any display coordinates for update data and any first information identification codes associated with the one recognized first display identification code in a third message stream; and wherein each decoder is further characterized by third means for recognizing a first information identification code in a fourth message stream corresponding to a stored first information identification code and for receiving and storing the update data associated with the recognized first information identification code in the memory device using the previously received display coordinates for that update data.

5. The apparatus of claim 4 further comprising means for selecting the display coordinates associated with each first information identification code, wherein each decoder first recognizing means further comprises means for storing the received update data associated with the recognized first information identification code using the selected display coordinates for that update data.

6. The apparatus of claim 1 wherein the system distributes securely restricted display information signals, the encoder providing means is further characterized by:

means for providing update data corresponding to changes in the particular portions of display information and display coordinates for positioning the update data in a relevant location in the corresponding particular portion of display information;

wherein the encoder signal generator has a third message stream and a fourth message stream, the third message stream including a plurality of the first information identification codes, a plurality of second information identification codes corresponding to update data for a particular portion of display information having a first information identification code, and a plurality of display coordinates corresponding to positioning each update data in a relevant location for the particular portion of display information, each of the second information identification codes being associated with one first information identification code thereby to form first information identification code - second information identification code - display coordinate sets indicative of the relevant display location of the update data for particular portions of display information each decoder video screen is authorized to receive, the fourth message stream including associated sets of the second information identification codes and the corresponding update data; and wherein each decoder is further characterized by:

third means for recognizing a first information identification code in a third message stream corresponding to a stored first information identification code and for storing the second information identification code and the display coordinates associated with the recognized first information identification code in the third message stream; and fourth means for recognizing a second information identification code in a fourth message stream corresponding to a stored second information identification code and for receiving the update data associated with the recognized second information identification code and storing the retrieved update data in the memory device using the previously received display coordinates for that update data.

7. The apparatus of claim 6 further comprising means for selecting the display coordinates associated with each said second information identification code wherein each decoder fourth recognizing means stores the received update data associated with the recognized second information identification code using the selected display coordinates for that update data.

8. The apparatus of claim 4 wherein the encoder signal generator further has a fifth message stream including a plurality of the first information identification codes, a plurality of second information identification codes corresponding to update data for particular portions of display information having a first information identification code, and a plurality of display coordinates corresponding to positioning each update data in a relevant location of a particular portion of display information, each of the second information identification codes being associated with one first information identification code thereby to form first information identification code - second information identification code - display coordinate sets indicative of the relevant display location of the update data for each particular portion of display information each decoder video screen is authorized to receive;

wherein each decoder is further characterized by:

fourth means for recognizing a first information identification code in a fifth message stream corresponding to a stored first information identification code and for storing the second information identification code and the display coordinates associated with the recognized first information identification code in the fifth message stream, and wherein each decoder third recognizing means further comprises means for recognizing a first information identification code in the fourth message stream corresponding to a stored second information identification code and for receiving and storing the update data associated with the recognized first information identification code in the memory device using the display coordinates associated with the corresponding stored second information identification code.

9. The apparatus of claim 8 wherein the encoder signal generator has a sixth message stream including associated sets of the second information identification codes and the corresponding update data, and wherein each decoder is further characterized by fifth means for recognizing a second information identification code in a sixth message stream corresponding to a stored second information identification code and for receiving the update data associated with the recognized second information identification code and storing the received update data in the memory device using the previously received display coordinates for that update data.

10. The apparatus of claim 9 further comprising means for selecting the display coordinates associated with each said second information identification code wherein each decoder fifth recognizing means stores the received update data associated with the recognized second information identification code using the selected display coordinates for that update data.

11. The apparatus of claim 10 wherein the encoder signal generator further comprises a seventh message stream including a plurality of the information identification codes corresponding to previously stored first and second information identification codes and a plurality of display coordinates corresponding to positioning each update data in a relevant location for a particular portion of display information, one of the information identification codes and one of the display coordinates being associated thereby to form information identification code - display coordinate sets indicative of the relevant display location of the update data for each said stored information identification code.

12. The apparatus of claim 4 wherein each decoder further comprises a plurality of video screens and the third message stream forms second information identification code - display coordinate - display identification code sets indicative of the relevant display location of the said particular portion of display information each video screen is authorized to receive and display, and wherein for each decoder:

the associating means associates each of the plurality of video screens with one of the display identification codes, and the first, second and third recognizing means separately recognize those first information identification codes and second information identification codes associated with each one display identification code, and separately store first and second information identification codes, update data and display coordinates for each of the plurality of video screens.

13. The apparatus of claim 8 wherein the restricted signals comprise video signals.

14. A system for distributing securely signals containing restricted display information, said system including an encoder for transmitting particular portions of display information, a plurality of decoders for receiving the display information and generating the particular portions of display information, and a transmission channel connecting the encoder to the plurality of decoders, characterized in that the encoder comprises:

means for comparing display information to previously received display information and for determining changes in display information;

means for providing update data corresponding to the determined changes in a particular portion of the display information and display coordinates for positioning the update data in a relevant display location for the particular portion of display information;

a signal generator having a first message stream and a second message stream, the first message stream including a plurality of information identification codes corresponding to update data for each portion of display information, a plurality of display coordinates corresponding to positioning each update data in the relevant display location for the portion of display information, and a plurality of display identification codes each corresponding to one of the plurality of decoders, each of the information identification codes being associated with at least one display identification code and display coordinates thereby to form information identification code - display identification code - display coordinate sets indicative of the relevant display location of the update data for a particular portion of display information each decoder video screen is authorized to receive, the second message stream including associated sets of information identification codes and the corresponding update data; and wherein each decoder is further characterized by:

a memory device for storing the transmitted display information capable of being displayed on a video screen;

means for associating the decoder with one of the display identification codes;

first means for recognizing the one display identification code in a first message stream and for storing in the memory device each information identification code and display coordinate associated with the one recognized display identification code; and second means for recognizing an information identification code in a second message stream corresponding to a stored information identification code and for receiving and storing the update data associated with the recognized information identification code in the memory using the previously received display coordinates for that update data, thereby to update the stored portion of display information.

15. The apparatus claim 14 wherein each decoder further comprises a video screen, wherein the associating means associates the video screen with the one display identification code, further comprising a decoder signal generator for generating a visual display of the stored portion of display information on the video screen.

16. The apparatus of claim 14 further comprising means for selecting the display coordinates associated with the information identification code for each update data, wherein each decoder first recognizing means further comprises means for storing the received update data corresponding to the recognized information identification code using the selected display coordinates.

17. The apparatus of claim 14 wherein the display coordinates associated with each display identification code provide for positioning the display information of the associated information identification code in different relative locations at different decoders.

18. The apparatus of claim 17 wherein each portion of display information associated with the same information identification code is updated by one second message stream.

19. A system for distributing securely signals containing restricted display information, said system including an encoder for transmitting particular portions of display information, a plurality of decoders for receiving the display information and generating the particular portions of display information, and a transmission channel connecting the encoder to the plurality of decoders, characterized in that the encoder comprises:

means for comparing display information to previously received display information and for determining changes in display information;

means for providing update data corresponding to the determined changes in a particular portion of the display information and display coordinates for positioning the update data in a relevant display location for the particular portion of display information;

a signal generator having a first message stream, a second message stream, and a third message stream, the first message stream including a plurality of first information identification codes corresponding to each portion of display information and a plurality of display identification codes each corresponding to one of the plurality of decoders, each of the first information identification codes being associated with at least one display identification code thereby to form first information identification code - display identification code sets indicative of the relevant display location of each of the particular portions of display information each decoder is authorized to receive, the second message stream including the plurality of first identification codes, a plurality of second information identification codes corresponding to update data for a particular portion of display information, and a plurality of display coordinates corresponding to positioning each said update data in a relevant display location for a particular portion of display information, each of the second information identification codes being associated with one information identification code and one display coordinate thereby to form first information identification code - second information identification code - display coordinate sets indicative of the relevant display location of the update data for each particular portion of display information each decoder is authorized to receive, the third message stream including associated sets of the second information identification codes and the corresponding update data; and wherein each decoder is further characterized by:

a memory device for storing the transmitted display information capable of being displayed on a video screen;

means for associating the decoder with one of the display identification codes;

first means for recognizing the one display identification code in a first message stream and for storing in the memory device each first information identification code associated with the one recognized display identification code;

second means for recognizing a first information identification code in a second message stream corresponding to a stored first information identification code and for storing the second information identification code and the display coordinates associated with the recognized first information identification code;

third means for recognizing a second information identification code in a third message stream and for receiving the update data associated with the recognized second information identification code and storing the received update data in the memory device using the previously received display coordinates for that update data, thereby to update the stored portion of display information.

20. The apparatus of claim 19 wherein each decoder further comprises a video screen, wherein the associating means associates the video screen with the one display identification code, further comprising a decoder signal generator for generating a visual display of the stored portion of display information on the video screen.

21. The apparatus of claim 19 further comprising means for selecting the display coordinates associated with the second information identification code for each update data wherein the decoder third recognizing means stores the update data corresponding to the recognized second information identification code in the third message stream using the selected display coordinates.

22. The apparatus of claim 19 wherein the encoder first signal generator has a fourth message stream including a plurality of the second information identification codes, a plurality of display coordinates corresponding to positioning each update data in a relevant display location of the particular portion of display information, and a plurality of the display identification codes, each of the second information identification codes being associated with at least one display identification code and display coordinate thereby to form second information identification code - display identification code - display coordinate sets indicative of the relevant display location of the update data for a particular portion of display information each decoder is authorized to receive;

wherein each decoder first recognizing means further comprises means for storing any display coordinates and any second information identification codes associated with the one recognized display identification code in a fourth message stream, and wherein each decoder is further characterized by:

fourth means for recognizing a second information identification code in a third message stream corresponding to a stored second information identification code and for receiving and storing the update data associated with the recognized second information identification code in the memory using the previously received display coordinates for that update data.

23. The apparatus of claim 19 wherein each portion of display information associated with the same second information identification code is updated by the same one third message stream.

24. The apparatus of claim 22 wherein the second message streams of the signal generator further include associated sets of first information identification codes and second information identification codes without display coordinate information, wherein the decoder second recognizing means stores the second information identification code associated with a recognized first information identification code.

25. A method for distributing signals containing display information in a system including an encoder for transmitting particular portions of display information, a plurality of decoders for receiving the particular portions of display information and a transmission channel connecting the encoder to the plurality of decoders, characterized in that the method comprises the steps of:

providing encoded update data for particular portions of display information to be positioned in a relevant display location for the particular portion of display information including the steps of, for each portion of display information, comparing received display information to previously received display information and determining relative changes in display information so that the encoded update data corresponds to the determined changes in display information;

generating a first message stream including a plurality of first information identification codes corresponding to update data for particular portions of display information and a plurality of display identification codes each corresponding to one of the plurality of decoders, each of the first information identification codes being associated with at least one display identification code thereby to form information identification code - display identification code sets indicative of the particular portions of display information each decoder is authorized to receive, generating a second message stream following the first message stream including associated sets of first information identification codes and the corresponding update data;

associating each decoder with one of the unique display identification codes; and, for each decoder, recognizing the one display identification code in a first message stream and storing in a memory device of the decoder each first information identification code associated with the one recognized display identification code; and recognizing a first information identification code in a second message stream corresponding to a stored first information identification code, receiving and storing the update data in the second message stream associated with the recognized first information identification code, thereby to update the stored portion of display information in the memory.

26. The method of claim 25 further comprising providing the decoder with a video screen, wherein the associating step associates the one display identification with the video screen, and generating a visual display of the stored portion of display information on the video screen.

27. The method of claim 25 wherein the particular portions of display information include a first portion that further comprises television program information and a second portion that further comprises financial market information, the method further comprising providing said first portion with a first unique first identification code and providing the second portion with a second unique first information identification code.

28. The method of claim 25 wherein the system distributes securely, restricted display information signals, wherein the step of providing encoded update data for each portion of display information having a first information identification code further comprises:

comparing, for each portion of display information, the portion of display information to a previously received portion of display information, determining relative changes in the portion of display information and providing update data corresponding to the changed display information and display coordinates for positioning the update data in a relevant display location for updating the particular portion of display information;

generating a third message stream-including a plurality of the first information identification codes, a plurality of display coordinates corresponding to displaying each update data in a relevant display location for a particular portion of display information, and a plurality of display identification codes each corresponding to one of the plurality of decoders, each of the first information identification codes being associated with at least one display identification code and display coordinate thereby to form first information identification code - display identification code - display coordinate sets indicative of the relevant display location of the update data for each particular portion of display information each decoder is authorized to receive; and recognizing the one first display identification code in a third message stream and storing in the memory device any display coordinates for update data associated with the one recognized first display identification code in a third message stream.

29. The method of claim 28 further comprising selecting the display coordinates associated with each first information identification code, and storing the received update data associated with a recognized first information identification code in a second message stream using the selected display coordinates for that update data.

30. The method of claim 25 wherein the system distributes securely restricted display information signals, wherein the step of providing encoded update data for each portion of display information having a first information identification code further comprises comparing, for each portion of display information, the portion of display information to a previously received portion of display information, determining relative changes in the portion of display information and providing update data corresponding to the changed display information and display coordinates for positioning the update data in a-relevant display location for updating the particular portion of display information displayed; the method further comprising:

generating a third message stream including a plurality of the first information identification codes, a plurality of second information identification codes corresponding to update data for a particular portion of display information, and a plurality of display coordinates corresponding to displaying each update data in a relevant display location for a particular portion of display information, each of the second information identification codes being associated with one first information identification code thereby to form first information identification code - second information identification code - display coordinate sets indicative of the relevant display location of the update data for each particular portion of display information each decoder is authorized to receive;

generating a fourth message stream including associated sets of the second information identification codes and the corresponding update data; and, for each decoder, recognizing a first information identification code in a third message stream corresponding to a stored first information identification code, storing the second information identification code and the display coordinates associated with the recognized first information identification code in the memory; and recognizing a second information identification code in a fourth message stream corresponding to a stored second information identification code, receiving and storing the update data associated with the recognized second information identification code in the memory device using the previously received display coordinates for that update data.

31. The method of claim 28 further comprising: generating a fourth message stream including a plurality of the first information identification codes, a plurality of the second information identification codes, and a plurality of display coordinates corresponding to displaying each update data in a relevant display location of each portion of display information, each of the second information identification codes being associated with one first information identification code thereby to form first information identification code - second information identification code - display coordinate sets indicative of the relevant display location of the update data for each particular portion of display information each decoder is authorized to receive; and, for each decoder, recognizing a first information identification code in a fourth message stream corresponding to a stored first information identification code and storing the second information identification code and the display coordinates associated with the recognized first information identification code in the fourth message stream in the memory.

32. The method of claim 28 wherein the display coordinates associated with each first information identification code provide for positioning the particular portion of display information in different relative display locations at different decoder memory devices.

33. The method of claim 30 wherein each portion of display information associated with the same second information identification code is updated by the same one fourth message stream.

34. A method for distributing securely signals containing restricted display information in a system including an encoder for transmitting particular portions of display information, a plurality of decoders for receiving the particular portions of display information, and a transmission channel connecting the encoder to the plurality of decoders, characterized in that the method comprises the steps of:

comparing, for each portion of display information, received display information to previously received display information, determining relative changes in display information and providing update data corresponding to the changed display information and display coordinates for positioning the update data in a relevant display location for updating the particular portion of display information;

generating a first message stream including a plurality of information identification codes corresponding to update data for each portion of display information, a plurality of display coordinates corresponding to positioning each update data in the relevant display location for the portion of display information, and a plurality of display identification codes each corresponding to one of the plurality of decoders, each of the information identification codes being associated with at least one display identification code and display coordinates thereby to form information identification code - display identification code - display coordinate sets indicative of the relevant display location of the update data for a particular portion of display information each decoder is authorized to receive;

generating a second message stream including associated sets of information identification codes and the corresponding update data;

receiving the first and second message streams at each decoder and, for each decoder, associating the decoder with one of the display identification codes;

recognizing the one display identification code in a first message stream and storing in a memory device of the decoder each information identification code and display coordinate associated with the one recognized display identification code; and recognizing an information identification code in a second message stream corresponding to a stored information identification code, receiving and storing the update data associated with the recognized information identification code in the memory device using the previously received display coordinates for that update data, thereby to update the stored portion of display information.

35. The method of claim 34 further comprising:

providing the decoder with a video screen wherein the associating step associates the one display identification code with the video screen; and generating a visual display of the stored portion of display information on the video screen.

36. The method of claim 34 further comprising selecting the display coordinates associated with the information identification code for each update data, and storing the received update data corresponding to the one recognized information identification code using the selected display coordinates.

37. The method of claim 35 wherein providing the display coordinates associated with each display identification code provides for displaying the display information of the associated information identification code in different relative display locations on different video screens.

38. The method of claim 34 wherein each portion of display information associated with the same information identification code is updated by the same one second message stream.

39. A method for distributing securely signals containing restricted display information in a system including an encoder for transmitting particular portions of display information, a plurality of decoders for receiving the particular portions of display information, and a transmission channel connecting the encoder to the plurality of decoders, characterized in that the method comprises the steps of:

comparing, for each portion of display information, received display information to previously received display information, determining relative changes in display information, and providing update data corresponding to the changed display information and display coordinates for positioning the update data in a relevant display location for updating the particular portion of the display information displayed;

generating a first message stream including a plurality of first information identification codes corresponding to each portion of display information and a plurality of display identification codes each corresponding to one of the plurality of decoders, each of the first information identification codes being associated with at least one display identification code thereby to form first information identification code - display identification code sets indicative of the relevant display location of each of the particular portions of display information each decoder is authorized to receive;

generating a second message stream including the plurality of first identification codes, a plurality of second information identification codes corresponding to update data for a particular portion of display information, and a plurality of display coordinates corresponding to positioning each said update data in a relevant display location for a particular portion of display information, each of the second information identification codes being associated with one information identification code and one display coordinate thereby to form first information identification code - second information identification code - display coordinate sets indicative of the relevant display location of the update data for each particular portion of display information each decoder is authorized to receive;

generating a third message stream including associated sets of the second information identification codes and the corresponding update data;

receiving the first, second and third message streams at each decoder and, for each decoder, associating the decoder with one of the display identification codes;

recognizing the one display identification code in a first message stream and storing in a memory device of the decoder each first information identification code associated with the one recognized display identification code;

recognizing a first information identification code in a second message stream corresponding to a stored first information identification code and storing the second information identification code and the display coordinates associated with the recognized first information identification code in the memory device;

recognizing a second information identification code in a third message stream, receiving the update data associated with the recognized second information identification code, and storing the received update data in the memory using the previously received display coordinates for that update data, thereby to update the stored portion of display information.

40. The method of claim 39 further comprising:

providing the decoder with a video screen wherein the associating step associates the one identification code with the video screen; and generating a visual display of the stored portion of display information on the video screen.

41. The method of claim 39 further comprising selecting the display coordinates associated with the second information identification code for each update data wherein the recognizing step stores the received update data in response to recognizing the associated second information identification code in the third message stream using the selected display coordinates.

42. The method of claim 39 further comprising:

generating a fourth message stream including a plurality of the second information identification codes, a plurality of display coordinates corresponding to positioning each update data in a relevant display location of the portion of display information, and a plurality of the display identification codes, each of the second information identification codes being associated with at least one display identification code and display coordinate thereby to form second information identification code - display identification code - display coordinate sets indicative of the relevant display location of the update data for a particular portion of display information each decoder is authorized to receive;

wherein the receiving step further comprises receiving the fourth message stream at each decoder and, for each decoder, recognizing the one recognized display identification code in a fourth message stream and storing any display coordinates and any second information identification codes associated with the one recognized display identification code.

43. The method of claim 39 wherein each portion of display information associated with the same second information identification code is updated by the same one third message stream.

44. A system for distributing signals containing display information including financial market information and realtime television program information signals comprising:

a transmitter including
means for providing a first signal corresponding to received financial market information;
means for receiving television program information signals and information for transmitting the television program information signals in a time period corresponding to a picture frame of television program information signals;
a multiplexor for receiving the television program information signals and the first signals and for providing multiplexed signals having a plurality of transmission lines of a predetermined line time and a time length corresponding to the time period and containing first signals and television program information signals during the same transmission line time, wherein at least one of said transmission lines includes an active video portion of a field transmission line and first signals in the active video portion;
a plurality of receivers for receiving the multiplexed signals including financial marker information and television program information signals wherein each receiver further comprises:
a demultiplexor for receiving the multiplexed signals and separating the first signals and television program information signals;
a memory for storing the received first signals whereby the memory contains the financial market information capable of being displayed on a video screen;
a receiver signal generator for providing the television program information signals for display; and
a transmission channel connecting the transmitter to the plurality of receivers.

45. The apparatus of claim 44 wherein each receiver further comprises:
a video screen;
a second receiver signal generator for displaying the contents of the memory on the video screen; and
a switch for selectively displaying the television program information signals and the memory contents so that the financial market information and television program information signals are visually displayed on the same video screen.

46. The apparatus of claim 45 wherein the system distributes securely restricted display information signals wherein the transmitter receiving and providing means is further characterized by:
means for converting the received financial market information into particular portions of display information; and
a transmitter signal generator providing the first signals including a first message stream and a second message stream,
the first message stream including a plurality of information identification codes corresponding to each portion of display information and to each television program information signal, and a plurality of display identification codes each corresponding to one of the plurality of receiver video screens, each of the information identification codes being associated with at least one display identification code thereby to form information identification code - display identification code sets indicative of the particular portions of display information and television program information signals each video screen is authorized to receive and display,
the second message stream including information identification codes for the television program information signals and for the portions of display information to be transmitted in the time period and the portion of display information and the television program information signals to be transmitted in the time period;
and wherein each receiver is further characterized by:
means for associating each receiver video screen with one of the display identification codes;
first means for recognizing the one display identification code in a first message stream and for storing an information identification code associated with the one recognized display identification code; and
second means for recognizing an information identification code in a second message stream corresponding to a stored information identification code and for receiving the portion of the multiplexed signals associated with the recognized information identification code.

47. The apparatus of claim 46 wherein the second recognizing means receives the portion of the multiplexed signals corresponding to a portion of display information for storage in the memory in response to recognizing an information identification code for that portion of display information that the associated video screen is authorized to display.

48. The apparatus of claim 46 wherein the second recognizing means receives the portion of the multiplexed signals corresponding to the television program information signals for display on the associated screen in response to recognizing an information identification code for television program information signals that the video screen is authorized to display.

49. The apparatus of claim 46 wherein the transmitter converting means is further characterized by:

means for comparing received financial market information to previously received financial market information and for determining changes in financial market information;

means for providing update data and display coordinates for positioning the update data in a relevant display location on a video screen, the update and display coordinates corresponding to the determined changes in financial market information, wherein the plurality of information identification codes correspond to update data for a portion of display information and television program information signals.

50. The apparatus of claim 45 wherein the system distributes securely restricted display information signals, the transmitter receiving and providing means is further characterized by:

means for converting the received financial market information into particular portions of display information;

means for comparing received portions of display information to previously received portions of display information and for determining changes in such portions of display information; means for providing update data and display coordinates for positioning the update data in a relevant display location of the portion of display information on a video screen, the update data and display coordinates corresponding to the determined changes in the portion of display information; and a transmitter signal generator having a first message stream and a second message stream, the first message stream including a plurality of information identification codes corresponding to each portion of display information and to each television program information signal, a plurality of display coordinates corresponding to each relevant display location of update data for a portion of display information on a video screen, and a plurality of display identification codes each corresponding to one of the plurality of receiver video screens, each of the information identification codes being associated with at least one display identification code thereby to form information identification code-display identification code-display coordinate sets indicative of the display location of update data for a particular portion of display information each video screen is authorized to receive and display, and to form information identification code-display identification code sets indicative of the particular television program information signals each video screen is authorized to receive and display, the second message stream including associated sets of information identification codes for the television program information signals and for the update data of portions of display information to be transmitted in the time period and the corresponding television program information signals and update data transmitted in the time period;

and wherein each receiver is further characterized by:

means for associating each video screen with one of the display identification codes;

first means for recognizing the one display identification code in a first message stream and for storing each information identification code and any display coordinates for update data for a portion of display information associated with the one recognized display identification code; and second means for recognizing an information identification code in a second message stream corresponding to a stored information identification code and for receiving the portion of the multiplexed signals associated with the recognized information identification code.

51. The apparatus of claim 50 wherein each receiver memory further comprises means for storing the portion of the received first signals corresponding to the update data using the previously received associated display coordinates for that update data.

52. The apparatus of claim 50 further comprising means for selecting the display coordinates associated with the information identification code for each update data, wherein each receiver memory further comprises means for storing the portion of the received first signals corresponding to the update data for the recognized information identification code using the selected display coordinates for that update data.

53. The apparatus of claim 45 wherein the system distributes securely restricted display information signals, the transmitter receiving and providing means is further characterized by:

means for converting the received financial market information into particular portions of display information;

means for comparing received portions of display information to previously received portions of display information and for determining changes in such portions of display information;

means for providing update data and display coordinates for positioning the update data in a relevant display location on a video screen, the update data and display coordinates corresponding to the determined changes in the portion of display information; and a transmitter signal generator having a first message stream, a second message stream, and a third message stream, the first message stream including a plurality of first information identification codes corresponding to each portion of display information and to each television program information signal and a plurality of display identification codes each corresponding to one of the plurality of video screens, each of the first information identification codes being associated with at least one display identification code thereby to form first information identification code-display identification code sets indicative of the display location of the particular portions of update data and television program information signals each video screen is authorized to receive and display, the second message stream including the plurality of first identification codes corresponding to each portion of display information, a plurality of second information identification codes corresponding to update data for a particular portion of display information having a first information identification code, and a plurality of display coordinates corresponding to each relevant display location of update data for a portion of display information on a display screen, each of the second information identification codes being associated with one first information identification code thereby to form first information identification code-second information identification code-display coordinate sets indicative of the relevant display location of update data for each particular portion of display information each video display is authorized to receive and display, the third message stream including associated sets of the first information identification codes for the television program information signals and the corresponding television program information signals transmitted in the time period, and associated sets of the second information identification codes for the update data to be transmitted in the time period and the corresponding update data, and wherein each receiver is further characterized by:
means for associating each video screen with one of the display identification codes;

first means for recognizing the one display identification code in a first message stream and for storing each first information identification code associated with the one display identification code;

second means for recognizing a first information identification code in a second message stream corresponding to a stored first information identification code for update data and for storing the second information identification code and the display coordinates associated with the recognized first information identification code; and third means for recognizing a second information identification code in a third message stream and for receiving the portion of the multiplexed signals associated with the recognized second information identification code.

54. The apparatus of claim 53 wherein each receiver further comprises fourth means for recognizing a first information identification code in a third message stream corresponding to television program information signals and for receiving the portion of the multiplexed signals associated with the said recognized first information identification code.

55. The apparatus of claim 53 wherein each receiver memory further comprises means for storing the received first signals corresponding to update data in a third message stream using the previously stored associated display coordinates.

56. The apparatus of claim 53 further comprising means for selecting the relative visual display location of financial market information and television program information signals to be displayed on its video screen, each receiver memory further comprising means for storing the received first signals corresponding to the update data for the recognized second information identification code using the associated selected display coordinates.

57. The apparatus of claim 56 wherein the transmitter provides a second message stream to provide the selected display coordinates for the selected display location of the portion of display information.

58. The apparatus of claim 44 wherein the transmitter receiving means further comprises:
means for providing the display information as digital signals, the transmitter further comprises a first circuit for adding parity bits to the digital signals according to a selected error detection and correction code, thereby outputting codewords;

a first interleaving memory buffer for receiving a first number n of codewords along a first axis and outputting the buffer contents along a second axis that is rotated to the first axis, thereby forming the first signals, and wherein each receiver further comprises:
a second interleaving memory buffer for receiving the first signals along the second axis and outputting the buffer contents as n codewords along the first axis; and an error detection and correction circuit and for removing the parity bits according to the selected error detection and correction code, thereby reconstructing digital signals corresponding to the input to the transmitter first circuit.

59. The apparatus of claim 58 wherein the transmitter first circuit the receiver and error detection and correction circuit provide for detecting two errors and correcting one error.

60. The apparatus of claim 58 wherein the number of codewords n in the interleaving memory buffer varies in response to the amount of television program information signals to be transmitted in each time period.

61. The apparatus of claim 44 wherein the television program information signals are digital signals.

62. The apparatus of claim 44 wherein the television means receiving means further comprises means for time compressing the television program information signals.

63. A method for distributing signals containing display information including financial market information and realtime television program information signals comprising:
receiving financial market information for visual display from a first source and providing a first signal corresponding to the received financial market information;

receiving television program information signals and information for transmitting the television program information signals in a time period corresponding to a picture frame of television program information signals from a second source;

multiplexing the television program information signals and the first signals and providing multiplexed signals having a plurality of transmission lines of a predetermined line time and a time length corresponding to the time period and containing first signals and television program information signals during the same transmission line time wherein at least one of the transmission lines includes an active video portion of a field transmission line and first signals in said active video portion;

transmitting the multiplexed signals to a plurality of receivers and, for each receiver,
demultiplexing the multiplexed signals and separating the first signals and television program information signals; and
storing the received first signals in a memory device which contains the financial market information capable of being displayed on a video screen.

64. The method of claim 63 further comprising selectively displaying the television program information signals and the memory contents on a video screen so that the stored financial market information and received television program information signals are visually displayed on the same video screen.

65. The method of claim 64 wherein the method distributes securely restricted display information signals wherein receiving the financial market information and providing the first signals further comprises converting the received financial market information into particular portions of display information; and wherein multiplexing the television program information and first signals further comprise;

generating a first message stream including a plurality of information identification codes corresponding to each portion of display information and to each television program information signal, and a plurality of display identification codes each corresponding to one of the plurality of receiver video screens, each of the information identification codes being associated with at least one display identification code thereby to form information identification code - display identification code sets indicative of the particular portions of display information and television program information signals each video screen is authorized to receive and display, and generating second message stream including information identification codes for the television signals and for the portions of display information to be transmitted in the time period and the corresponding television program information signals and portions of display information to be transmitted in the time period;

whereby the first signal comprises the first message streams and the non-television program information signal portions of the second message streams and, for each receiver, associating each receiver video screen with one of the display identification codes;

recognizing the one display identification code in a first message stream and storing an information identification code associated with the one recognized display identification code in a memory device of the receiver; and recognizing an information identification code in a second message stream corresponding to a stored information identification code and receiving the portion of the multiplexed signals associated with the recognized information identification code.

66. The method of claim 65 wherein receiving a portion of the multiplexed signals receives the portion of display information for storage in the memory in response to recognizing an information identification code for that portion of display information that the receiver video screen is authorized to display.

67. The method of claim 65 wherein receiving a portion of the multiplexed signals receives the television program information signal for display on the receiver video screen in response to recognizing an information identification code for that television program information signal that the receiver video screen is authorized to display.

68. The method of claim 65 wherein the converting step is further characterized by:

comparing, for each portion of display information, received financial market information to previously received financial market information and determining relative changes in financial market information providing update data corresponding to changed display information and display coordinates for positioning the update data in a relevant display location for updating the display of the particular portion of display information on a video screen, and providing the plurality of update data with information identification codes corresponding to the particular portion of display information.

69. The method of claim 64 wherein the method distributes securely restricted display information signals, and wherein receiving the financial market information and providing the first signals further comprise:

converting the received financial market information into particular portions of display information;

comparing, for each particular portion of display information, received portions of display information to previously received portions of display information, determining relative changes in such portions of display information providing update data corresponding to changed display information and display coordinates for positioning the update data in a relevant display location for updating the display of the particular portion of display information on a video screen, and providing update data with information identification codes corresponding to the particular portions of display information; wherein multiplexing the television program information and first signals further comprises:

generating a first message stream including a plurality of information identification codes corresponding to each portion of display information and to each television program information signal, a plurality of display coordinates corresponding to each relevant display location of update data for a portion of display information on a video screen, and a plurality of display identification codes each corresponding to one of the plurality of receiver video screens, each of the information identification codes being associated with at least one display identification code thereby to form information identification code - display identification code - display coordinate sets indicative of the display location of update data for a particular portion of display information each video screen is authorized to receive and display, and to form information identification code - display identification code sets indicative of the particular television program information signals each video screen is authorized to receive and display;

generating a second message stream including associated sets of information identification codes for the television program information signals and for the update data of portions of display information to be transmitted in the time period and the corresponding television program information signals and update data transmitted in the time period;

whereby the first signal comprises the first message streams and the non-television program information signal portion of the second message stream, and, for each receiver, associating each video screen with one of the display identification codes;

recognizing the one display identification code in a first message stream and for storing each information identification code and any display coordinates for update data for a portion of display information associated with the one recognized display identification code in a memory device; and recognizing an information identification code in a second message stream corresponding to a stored information identification code, and receiving the portion of the multiplexed signals in the second message stream associated with the recognized information identification code.

70. The of claim 69 further comprising selecting the display coordinates associated with the information identification code for each update data, and storing the portion of the received first signals corresponding to the update data for the recognized information identification code in the memory device using the selected display coordinates for that update data.

71. The method of claim 70 wherein the method distributes securely restricted display information signals wherein receiving the financial market information and providing the first signals further comprise:

converting the received financial market information into particular portions of display information, comparing, for each particular portion of display information, received portions of display information to previously received portions of display information and determining relative changes in such portions of display information providing update data corresponding to changed financial market information and display coordinates for positioning the update data in a relevant display location for updating the display of the particular portion of display information on a video screen, and providing the update data with information identification codes corresponding to the particular portions of display information, wherein multiplexing the television program information and first signals further comprises generating a first message stream, including a plurality of first information identification codes corresponding to each portion of display information and to each television program information signal and a plurality of display identification codes each corresponding to one of the plurality of video screens, each of the first information identification codes being associated with at least one display identification code thereby to form first information identification code - display identification code sets indicative of the display location of the particular portions of display information and television signals each video screen is authorized to receive and display, generating second message stream including the plurality of first identification codes corresponding to each portion of display information, a plurality of second information identification codes corresponding to update data for a particular portion of display information having a first information identification code, and a plurality of display coordinates corresponding to each relevant display location of update data for a portion of display information on a display screen, each of the second information identification codes being associated with one first information identification code thereby to form first information identification code - second information identification code - display coordinate sets indicative of the relevant display location of update data for each particular portion of display information each video display is authorized to receive and display, and generating a third message stream including associated sets of the first information identification codes for the television program information signals and the corresponding television program information signals transmitted in the time period, and associated sets of the second information identification codes for the update data to be transmitted in the time period and the corresponding update data, wherein the first signals comprise the non-television program information signal portion of the first, second and third message streams and, for each receiver, associating each video screen with one of the display identification codes;

recognizing the one display identification code in a first message stream and storing each first information identification code associated with the one display identification code in the memory device;

recognizing a first information identification code in a second message stream corresponding to a stored first information identification code for update data and storing the second information identification code and the display coordinates associated with the recognized first information identification code in the memory device; and recognizing a second information identification code in a third message stream and receiving the portion of the multiplexed signals in the third message stream associated with the recognized second information identification code.

72. The method of claim 71 further comprising, for each receiver, recognizing a first information identification code in a third message stream corresponding to television program information signals and receiving the television program information signal associated with the recognized first information identification code.

73. The method of claim 71 further comprising selecting the relative visual display location and size of financial market information and television program information signals to be displayed on a given receiver video screen and storing the received first signals corresponding to the update date for the recognized second information identification code in the memory device using the associated selected display coordinates for display on the given receiver.

74. The method of claim 63 wherein the transmitting step further comprises:

providing the display information as digital signals;

adding parity bits to the digital signals according to a selected error detection and correction code, thereby outputting codewords;

interleaving codewords in a memory buffer by inputting a first number n of codewords along a first axis and outputting the memory buffer contents along a second axis that is rotated to the first axis, thereby forming the first signals, and for each receiver:

interleaving the first signals in a memory buffer for inputting the first signals along the second axis and outputting the memory buffer contents as n codewords along the first axis; and removing the parity bits according to the selected error detection and correction code, thereby reconstructing digital signals corresponding to the provided digital signals.

75. The method of claim 74 further comprising selecting an error detection and correction code for detecting two errors and correcting one error in each codeword.

76. The method of claim 74 wherein the number of codewords n in the interleaving memory buffer varies in response to the amount of television program information signals to be transmitted in each time period.

77. The apparatus of claim 76 wherein the number n is inversely related to the amount of television program information signals.

78. The method of claim 75 wherein the transmitting step further comprises modulating the output of the first interleaving memory buffer to a modulated digital signal, thereby forming the first signals, and for each receiver, demodulating the received first signals to a digital signal corresponding to the output of the first interleaving memory buffer.

79. The method of transmitting display information including alphanumeric characters suitable for display on a pixel-based video screen comprising the steps of: defining the pixel-based display area as a plurality of cells arranged in rows and columns, each cell having a plurality of pixels arranged in rows and columns, each cell having a preselected location relative to an origin, and each pixel in each cell having a preselected location relative to a cell origin;
  selecting the cell dimensions to correspond to the dimensions of a normal-sized alphanumeric character of display information;
  providing each alphanumeric character to be displayed with a unique byte of data representing that character;
  providing the display information in digital form so that there is one or more bits of data for each pixel;
  processing the digital display information to identify each display cell containing an alphanumeric character and replacing the bits of data for each pixel in said identified display cell with the byte of data corresponding to the identified alphanumeric character; and
  transmitting the processed digital display information so that one byte of data per cell is transmitted for each identified cell containing an alphanumeric character and one or more digital signals per pixel are transmitted for each cell not containing an alphanumeric character.

80. The method of claim 79 wherein the one or more bits per pixel are transmitted either pixel row by pixel row or pixel column by pixel column in each cell.

81. The method of claim 79 wherein the transmitting step further comprises transmitting the display information one cell at a time.

82. The method of claim 81 wherein transmitting the display information one cell at a time further comprises transmitting the display information either cell row by cell row or cell column by cell column.

83. The method of claim 79 further comprising run length encoding the display information to be transmitted for contiguous cells having the same alphanumeric character and transmitting run length encoded signals for the same byte of data in said contiguous cells.

84. The method of claim 80 further comprising run length encoding the display information to be transmitted for contiguous pixels having the same display information and transmitting run length encoded signals for the same bits of data in said contiguous pixels.

85. The method of claim 79 wherein processing the display information further comprises identifying the portion of the display information that has changed since the display information was last received, and wherein transmitting display information further comprises transmitting a selected portion of the display information in the form of a tile comprising a selected number of contiguous rows and columns of cells, an offset from the origin, and at least the changed display information.

86. The method of claim 85 wherein transmitting a tile of display information further comprises successively transmitting the display information for the cells in the tile, one cell at a time, either cell row by cell row or cell column by cell column, using cell wrapping so that the successively transmitted cells are capable of being stored in a memory relative to the tile offset and the selected number of tile rows and columns.

87. The method of claim 86 further comprising receiving the transmitted signals at a receiver, processing the received signals to convert the one byte of data for cells having one byte per cell into multiple bytes of data per cell corresponding to the pixel representation of the character, and storing the received and any converted signals in a memory device.

88. The method of claim 87 further comprising mapping the transmitted tile of display information onto a display tile having a second selected number of rows and columns of cells and a second offset in the memory of the receiver so that the transmitted tile of display information not falling within the second selected rows and columns of the display tile are not stored in the memory.

89. The method of claim 79 further comprising receiving the transmitted signals at a receiver, storing the transmitted display information in a memory device at the receiver and displaying the stored contents of the memory device on a video screen associated with the receiver.

90. The method of claim 89 wherein processing the display information further comprises identifying the portion of the display information that has changed since the display information was last received, transmitting display information further comprises transmitting a selected portion of the display information in the form of a tile comprising a selected number of contiguous rows and columns of cells relative to the origin and including at least the changed display information, and wherein storing the transmitted display information further comprises writing the transmitted cells of display information over the contents of the memory so that displaying the contents of the overwritten memory displays the changed and unchanged display information.

91. The method of claim 90 wherein displaying the contents of the memory further comprises displaying a portion of the contents of the memory as a display tile with implied motion.

92. The method of claim 91 further comprising adjusting the address of the contents of the portion of the memory to imply the movement in the display tile.

93. The method of claim 92 wherein adjusting the address further comprises changing the memory address of the contents of the memory corresponding to the transmitted tile in response to receiving update data for the display.

94. The method of claim 92 wherein adjusting the address further comprises adjusting the display location of the contents of the memory as the memory contents are being displayed.

95. The method of claim 79 wherein defining the display area further comprises providing on the order of one hundred cell columns and thirty cell rows.

96. The method of claim 79 further comprising providing each cell with sixteen pixel rows and eight pixel columns.

97. Apparatus for transmitting display information including alphanumeric characters suitable for display on a pixel-based video screen comprising:
- a pixel-based display area organized as a plurality of cells arranged in rows and columns, wherein each cell includes a plurality of pixels arranged in rows and columns and has a preselected location relative to an origin, and each pixel in each cell has a preselected location relative to a cell origin, the cell dimensions corresponding to the dimensions of a normal-sized alphanumeric character of display information;
- means for providing each alphanumeric character to be displayed with a unique byte of data representing that character;
- means for providing the display information in digital form so that there is one or more bits of data for each pixel;
- means for processing the digital display information to identify each display cell containing an alphanumeric character and replacing the bits of data for each pixel in said identified display cell with the byte of data corresponding to the identified alphanumeric character; and
- means for transmitting the processed digital display information so that one byte of data per cell is transmitted for each identified cell containing an alphanumeric character and one or more digital signals per pixel are transmitted for each cell not containing an alphanumeric character.

98. The apparatus of claim 97 wherein the transmitting means transmits the display information one cell at a time.

99. The apparatus of claim 98 wherein the transmitting means transmits the display information either cell row by cell row or cell column by cell column.

100. The apparatus of claim 97 further comprising means for run length encoding the display information to be transmitted for contiguous cells having the same alphanumeric character wherein the transmitting means transmits run length encoded signals for the same byte of data in said contiguous cells.

101. The method of claim 100 wherein the run length encoding means run length encodes the display information to be transmitted for contiguous pixels having the same display information, wherein the transmitting means transmits run length encoded signals for the same bits of data in said contiguous pixels.

102. The apparatus of claim 97 wherein the processing means further comprises means for identifying the portion of the display information that has changed relative to previously received display information, and wherein the transmitting means transmits a selected portion of the display information in the form of a tile comprising a selected number of contiguous rows and columns of cells for displaying at least the changed display information, and an offset from the origin for positioning the tile in the proper relative location for updating the portion of display information.

103. The apparatus of claim 97 further comprising means for storing the transmitted display information in a memory device at a receiver and means for displaying the stored contents of the memory device on a video screen associated with the receiver.

104. The apparatus of claim 103 wherein the processing means further comprises means for identifying the portion of the display information that has changed relative to previously received information, and wherein the transmitting means transmits a selected portion of the display information in the form of a tile comprising a selected number of contiguous rows and columns of cells relative to the origin and including at least the changed display information, and wherein the storing means stores the transmitted display information by writing the transmitted cells of display information over the contents of the memory relative to the origin so that the contents of the overwritten memory contains the changed and unchanged display information.

105. The apparatus of claim 104 wherein the displaying means displays a portion of the contents of the memory as a display tile on the video screen with implied motion.

106. The apparatus of claim 105 further comprising means for adjusting the address of the contents of the portion of the memory to imply the movement in the display tile.

107. The apparatus of claim 106 wherein the adjusting means changes the memory address of the contents of the memory corresponding to the transmitted tile in response to storing update data in the memory.

108. The apparatus of claim 106 wherein the adjusting means adjusts the display location of the contents of the memory as the memory contents are being displayed.

109. The apparatus of claim 97 wherein the display area further comprises on the order of one hundred cell columns and thirty cell rows.

110. The apparatus of claim 97 wherein the display area further comprises each cell having sixteen pixel rows and eight pixel columns.

111. Apparatus for identifying changes in successive frames of video signals for updating an image display of the video signals comprising:
- means for separating the video signals into successive frames of display information, each frame having a vertical sync pulse and a plurality of horizontal sync pulses;
- means for providing each frame of display information as a plurality of pixels organized in a plurality of cells, each cell having a plurality of pixels;
- a first memory containing a first pixel map corresponding to the pixels of the image display; and
- a comparator for comparing the pixels of one frame of display information to the corresponding pixels of the preceding frame of display information and the first pixel map, one cell at a time, the output of the comparator indicating when the corresponding pixels of the one frame are the same as the pixels in the preceeding frame and different from the pixels in the first pixel map; and
- means for determining whether a cell contains pixel change data based on the indicated changed pixels of the cell.

112. The apparatus of claim 111 further comprising:
- a circuit for providing the pixel data for the cells of the one frame determined to have pixel change data for updating the corresponding pixels of the image display; and
- means for updating the first pixel map with the pixels data so that the first pixel map corresponds to the updated image display.

113. The apparatus of claim 111 further comprising a second memory for storing the pixels of the one frame of display information for use as the pixels of the preceding frame for comparison with the next frame of display information.

114. The apparatus of claim 111 wherein the providing means further comprises a converter for converting analog video signals to digital video signals.

115. The apparatus of claim 114 wherein the converter comprises:
 a first converter for converting the analog signals to m-bit digital values at a first sampling rate; and
 a second comparator for comparing the m-bit digital values to a plurality of mapping thresholds and converting the digital values to n-bit pixels, where m is not equal to n.

116. The apparatus of claim 115 wherein the converter further comprises a phase lock circuit for providing a clock signal phase locked to the pixel frequency and for sampling at the midpoint of each pixel, thereby to minimize aliasing of a frame of display information.

117. The apparatus of claim 111 wherein the video signal further comprises a plurality of discrete video signals and the providing means further comprises means for providing each discrete video signal as a plurality of pixels having corresponding horizontal and vertical sync pulse; further comprising:
 a switch for selecting one of said plurality of discrete video signals for processing one frame of display information at a time; and
 a second memory for storing the plurality of pixels of the preceding selected frame of display information for each of the discrete video signals, wherein said first memory further comprises one pixel map for each frame of display information for each discrete video signal that is displayed.

118. The apparatus of claim 117 further comprising means for operating the switch to select one frame from each of said plurality of discrete video signals before selecting a second frame from any one discrete video signal.

119. The apparatus of claim 118 wherein the plurality of discrete video signals further comprises three signals of a composite color video signal, wherein the providing means provides synchronized horizontal and vertical sync pulses for said three signals.

120. The apparatus of claim 111 wherein the comparator compares one pixel of the one frame to the corresponding one pixels of the preceding one frame and the first pixel map at a time.

121. The apparatus of claim 111 wherein the determining means determines whether a cell contains pixel change data based on the sum of the magnitudes of the change of intensity of each pixel in the cell.

122. The apparatus of claim 112 wherein the determining means determines whether a cell contains pixel change data based on the cumulative weighted sum of the absolute value of the indicated changes of intensity of each pixel in the cell since the corresponding pixels of the image display were last updated, further comprising means for indicating that the cell contains pixel change data when the cumulative weighted sum of each cell exceeds a predetermined count threshold.

123. The apparatus of claim 121 wherein the determining means further comprises:
 a first adder for summing the weighted count of the intensity change for each pixel in a given cell of the first frame that is the same as the corresponding pixel in the second frame and different from the corresponding pixel in the first pixel map;
 a cell change RAM for maintaining a cumulative count of the weighted count of the changed pixels for each cell of a frame display information;
 a second adder for summing the count of the first adder and the cumulative count of the cell change RAM for the given cell and storing the sum as the cumulative count; and
 a second comparator for comparing the second adder sum to a predetermined count threshold and indicating that the given cell contains pixel change data when the second adder sum is above the predetermined count threshold.

124. The apparatus of claim 123 further comprising:
 means for transmitting the pixel change data of the given one cell to update the corresponding cell of the image display in response to the second adder sum being above the predetermined count threshold;
 means for updating the first pixel map with the pixel change data of the first frame in response to transmitting the pixel change data of the given one cell to update the image display; and
 means for resetting to zero the cumulative count of the cell change RAM corresponding to the given one cell in response to transmitting the pixel change data of the given one cell to update the image display.

125. The apparatus of claim 124 further comprising means for adjusting the predetermined count threshold in response to the number of transmitted cells of pixel data to update the display so that the threshold is higher during more frequent transmissions and lower during less frequent transmissions.

126. The apparatus of claim 124 wherein the second comparator further comprises:
 a memory log for identifying each cell indicated to contain pixel change data, and wherein the transmitted means transmits the pixel change data for each cell identified in the memory log to update the display image following comparing all cells of a selected frame.

127. The apparatus of claim 123 wherein the pixels in each cell are compared one pixel at a time.

128. The apparatus of claim 111 further comprising:
 means for counting the weighted number of pixels in a given cell of the first frame that have changed relative to the corresponding pixels of the first pixel map; and
 means for determining when the counted weighted number exceeds a predetermined count threshold, thereby indicating that the given cell contains pixel change data.

129. The apparatus of claim 128 further comprising means for updating the first pixel map with the pixel change data of each cell of the first frame having determined pixel change data.

130. A method for identifying changes in successive frames of video signals for updating an image display of the video signals comprising:
 (a) separating the video signals into successive frames of display information, each frame having a vertical sync pulse and a plurality of horizontal sync pulses;
 (b) providing each frame of display information as a plurality of cells, each cell having a plurality of pixels;
 (c) creating and maintaining a first pixel map corresponding to the pixels of the image display;

(d) comparing the pixels of one frame of display information to the corresponding pixels of the preceding frame of display information and the first pixel map one cell at a time;

(e) indicating changes in the display information when the corresponding pixels of the one frame and the preceding frame are the same and are different from the corresponding pixels in the first pixel map; and (f) determining whether a cell contains pixel change data based on the indicated changed pixels of the cell.

131. The method of claim 130 further comprising:

(g) providing an output video signal containing the indicated different pixels of each cell having pixel change data for updating the corresponding pixels of the image display; and (h) updating the first pixel map with the indicated different pixels of each cell having pixel change data so that the first pixel map corresponds to the updated image display.

132. The method of claim 130 further comprising storing the pixels corresponding to the one frame of display information as the preceding frame for use as the preceding frame for comparing the next frame of display information in step (d).

133. The method of claim 130 wherein step (b) further comprises determining when the video signals are analog signals and converting analog video signals to digital video signals.

134. The method of claim 133 wherein converting analog video signals to digital further comprises converting the analog signals to an m-bit digital values at a first sampling rate and mapping the m-bit digital values to n-bit pixels, where m is different than n.

135. The method of claim 134 wherein step (b) further comprises providing a clock signal phase locked at the pixel frequency and for sampling at the midpoint of each pixel, thereby to minimize aliasing of a frame of display information.

136. The method of claim 135 wherein providing a phase locked clock signal further comprises adjusting the time of occurrence of the horizontal sync pulse to maintain the correct sampling rate and phase.

137. The method of claim 130 wherein the video signals further comprises a plurality of discrete video signals and further comprising separately processing each video signal by steps (a) and (b), selecting one frame of pixel data for one said discrete video signal and applying steps (c), (d) (e) and (f) to the one selected frame, and thereafter selecting another frame of pixel data from among the discrete video signals, one frame of pixel data at a time, and applying steps (c), (d), (e) and (f) to each selected said other frame.

138. The method of claim 137 further comprising selecting one frame from each of said plurality of discrete video signals before selecting a second frame from any one discrete video signal.

139. The method of claim 138 wherein the plurality of discrete video signals further comprises three signals for a composite color video signal wherein step (a) provides synchronized horizontal and vertical sync pulses for said three signals.

140. The method of claim 137 wherein step (b) further comprises, for each discrete video signal:
determining when the video signals are analog video signals;
converting the analog video signals into digital video signals at a first sampling rate; and
phase locking the sampling frequency of the pixel data and phase sampling at the midpoint of pixel, thereby to minimize aliasing of the frame of display information.

141. The method of claim 130 wherein step (d) further comprises comparing one pixel at a time.

142. The method of claim 130 wherein step (f) further comprises:

(g) maintaining a cell change counter for each cell of a frame of display information, and, for each cell,
(i) comparing the pixels of one cell of one frame of display information to the corresponding pixels in the preceding frame and the first pixel map;
(ii) identifying the weighted number of changed pixels in said one cell;
(iii) summing the weighted number of changed pixels in said one cell with the contents of the cell change counter corresponding to said one cell and storing the weighted sum in said cell change counter;
(iv) comparing the weighted sum to a predetermined count threshold; and
(v) determining that the one cell contains pixel change data corresponding to update information in response to the weighted sum exceeding the predetermined count threshold.

143. The method of claim 142 wherein step (g) further comprises:
updating the first pixel map with each cell of the one frame determined to contain pixel change data; and
transmitting the pixel data for each cell determined to contain pixel change data of the one frame to update the image display.

144. The method of claim 143 wherein step (g) further comprises adjusting the predetermined count threshold in response to the number of transmitted cells of pixel data so that the count threshold is higher during more frequent transmissions and lower during less frequent transmissions.

145. The method of claim 142 further comprising:
creating a record identifying each cell indicated to contain pixel change data, and, following processing of the cells of a frame;
transmitting the pixels for each cell of the one frame identified in the created record to update the display image;
storing the pixels of each identified cell of the one frame in each corresponding pixel locations in the first pixel map;
storing the pixels corresponding to the one frame of display information as the pixels for the preceding frame of display information; and
clearing the contents of the cell change counter for each identified cell.

146. The method of claim 142 wherein the pixels in each cell are compared one pixel at a time.

147. The method of claim 145 wherein the pixels in each cell are compared one pixel at a time.

148. The method of claim 130 wherein steps (e) and (f) further comprise:
determining the weighted number of pixels of each cell that have changed relative to the corresponding pixels of the first pixel map; and
determining that a cell has pixel change data when the determined number of changed pixels exceeds a predetermined count threshold.

149. The method of claim 148 further comprising:
updating the first pixel map for each cell having pixel change data and transmitting the pixels of each cell having pixel change data to update the image display.

150. The method of claim 130 wherein step (f) further comprises determining whether a cell contains pixel change data based on the sum of the magnitude of the intensity change of each pixel in the cell.

* * * * *

UNITED STATES PATENT AND TRADEMARK OFFICE
CERTIFICATE OF CORRECTION

PATENT NO.: 5,321,750

DATED: June 14, 1994

INVENTOR(S): Nadan

It is certified that error appears in the above-identified patent and that said Letters Patent is hereby corrected as shown below:

Column 8, line 41, after "then" delete ".";
Column 13, line 10, after "which" delete "35";
Column 24, line 24, after "and" delete "35";
Column 25, line 29, delete "$RK_N$" and insert --$RK_R$--;
Column 32, line 63, after "byte" insert --4--;
Column 39, line 31, after "In" delete "10";
Column 42, line 7, delete "0n" and insert --On--;
Column 50, line 25, delete "nominallye." and insert --nominally--;
Column 52, line 67, after "a" delete "5";
Column 62, line 57, delete ".plurality" and insert --plurality--.

Signed and Sealed this

Twelfth Day of January, 1999

Attest:

*Attesting Officer*      Acting Commissioner of Patents and Trademarks